United States Patent
Clinch et al.

(10) Patent No.: US 7,156,599 B2
(45) Date of Patent: Jan. 2, 2007

(54) CAGE NUT ASSEMBLY HAVING STAND-OFFS

(75) Inventors: James Patrick Clinch, Sterling Heights, MI (US); Paul Douglas Purdy, Holly, MI (US)

(73) Assignee: Textron Inc., Providence, RI (US)

( * ) Notice: Subject to any disclaimer, the term of this patent is extended or adjusted under 35 U.S.C. 154(b) by 121 days.

(21) Appl. No.: 10/875,031

(22) Filed: Jun. 22, 2004

(65) Prior Publication Data

US 2004/0228700 A1 Nov. 18, 2004

Related U.S. Application Data

(63) Continuation-in-part of application No. 10/619,340, filed on Jul. 14, 2003, now Pat. No. 6,979,158.

(60) Provisional application No. 60/396,268, filed on Jul. 16, 2002.

(51) Int. Cl.
*F16B 39/284* (2006.01)

(52) U.S. Cl. ........................ 411/111; 411/112; 411/110; 411/85

(58) Field of Classification Search ................ 411/110, 411/111, 112, 84, 85
See application file for complete search history.

(56) References Cited

U.S. PATENT DOCUMENTS

| | | | |
|---|---|---|---|
| 1,760,834 A | 5/1930 | Carr | |
| 2,234,557 A | 3/1941 | Hungerford | |
| 2,255,650 A | 9/1941 | Burke | |
| 2,258,342 A | 10/1941 | Tinnerman | |
| 2,303,148 A | 11/1942 | Tinnerman | |
| 2,390,752 A * | 12/1945 | Tinnerman | 411/112 |
| 2,409,209 A | 10/1946 | Johnson | |
| 2,495,037 A | 1/1950 | Tinnerman | |
| 2,567,864 A | 9/1951 | Becker | |
| 2,649,883 A | 9/1953 | Sharp | |
| 2,695,046 A | 11/1954 | Tinnermann, III | |
| 2,716,434 A | 8/1955 | Crowther | |
| 2,861,618 A | 11/1958 | Tinnerman | |
| 2,867,258 A | 1/1959 | Flora et al. | |
| 2,867,259 A | 1/1959 | Barren | |
| 2,875,805 A | 3/1959 | Flora | |
| 3,004,638 A | 10/1961 | Eaton | |
| 3,025,897 A | 3/1962 | Gieleghem | |
| 3,123,120 A | 3/1964 | Grimm et al. | |
| 3,177,916 A | 4/1965 | Rosan | |
| 3,219,790 A | 11/1965 | Johnson | |
| 3,236,143 A | 2/1966 | Wing | |
| 3,255,798 A | 6/1966 | Anderson et al. | |
| 3,314,465 A | 4/1967 | Bien | |

(Continued)

FOREIGN PATENT DOCUMENTS

DE      1055718      4/1959

(Continued)

*Primary Examiner*—Katherine Mitchell
(74) *Attorney, Agent, or Firm*—Trexler, Bushnell, Giangiorgi, Blackstone & Marr, Ltd

(57) ABSTRACT

A cage nut assembly includes a nut and a cage wrapped therearound. The nut and/or the cage are provided with a number of stand-offs. The stand-offs reduce the amount of bearing surface interface between the cage and the nut thus reducing the possibility that the two parts will stick to each other after a bath is applied to the mating surface, and thus to the cage nut assembly, as the cage is welded to the mating surface. The stand-offs can be configured such that the cage nut assembly can move through the bath in a horizontal position, an upside down position, or a sideways position, substantially without the cage and nut sticking to one another.

20 Claims, 31 Drawing Sheets

U.S. PATENT DOCUMENTS

| | | | |
|---|---|---|---|
| 3,451,455 A | 6/1969 | Parkin |
| 3,556,570 A | 1/1971 | Cosenza |
| 3,670,796 A | 6/1972 | Grimm |
| 3,695,324 A | 10/1972 | Gulistan |
| 3,765,078 A | 10/1973 | Gulistan |
| 3,783,922 A | 1/1974 | Petrus |
| 3,785,421 A | 1/1974 | Launay |
| 3,797,358 A | 3/1974 | Allender |
| 3,948,142 A | 4/1976 | McKay et al. |
| 4,015,650 A | 4/1977 | Anderson |
| 4,036,692 A | 7/1977 | Walton |
| 4,146,074 A | 3/1979 | Kowalski |
| 4,170,424 A | 10/1979 | Boehm |
| 4,186,787 A | 2/1980 | Hussain |
| 4,193,435 A | 3/1980 | Charles et al. |
| 4,263,831 A | 4/1981 | Smith |
| 4,557,650 A | 12/1985 | Molina |
| 4,732,518 A | 3/1988 | Toosky |
| 4,741,654 A | 5/1988 | Lovisek |
| 4,762,451 A | 8/1988 | Collins |
| 4,790,701 A * | 12/1988 | Baubles ............... 411/85 |
| 4,793,757 A | 12/1988 | Peterson |
| 4,830,557 A | 5/1989 | Harris et al. |
| 4,875,817 A | 10/1989 | Suzumura et al. |
| 4,900,209 A | 2/1990 | Reynolds |
| 5,028,189 A | 7/1991 | Harley |
| 5,066,180 A | 11/1991 | Lang et al. |
| 5,074,727 A | 12/1991 | Wentzel |
| 5,096,349 A | 3/1992 | Landy et al. |
| 5,096,350 A | 3/1992 | Peterson |
| 5,137,406 A | 8/1992 | Cosenza |
| 5,245,743 A | 9/1993 | Landy et al. |
| 5,380,136 A | 1/1995 | Copple et al. |
| 5,405,228 A | 4/1995 | Reid et al. |
| 5,468,104 A | 11/1995 | Reid et al. |
| 5,533,850 A | 7/1996 | Ishihara et al. |
| 5,558,369 A | 9/1996 | Cornea et al. |
| 5,628,598 A | 5/1997 | Hofle |
| 5,630,686 A | 5/1997 | Billmann |
| 5,639,113 A | 6/1997 | Goss et al. |
| 5,704,747 A | 1/1998 | Hutter, III et al. |
| 5,746,561 A | 5/1998 | Nygren, Jr. et al. |
| 5,797,581 A | 8/1998 | Sherman |
| 5,893,694 A | 4/1999 | Wilusz et al. |
| 5,919,016 A | 7/1999 | Smith et al. |
| 6,077,010 A | 6/2000 | Reid et al. |
| 6,139,237 A | 10/2000 | Nagayama |
| 6,146,071 A | 11/2000 | Norkus et al. |
| 6,183,180 B1 | 2/2001 | Copple et al. |
| 6,254,325 B1 | 7/2001 | Kun |
| 6,499,923 B1 * | 12/2002 | LeVey ............... 411/172 |
| 6,746,193 B1 | 6/2004 | Drake |
| 2002/0135517 A1 | 9/2002 | Imahigashi |
| 2003/0129041 A1 | 7/2003 | Mitts et al. |
| 2003/0147715 A1 | 8/2003 | Curley, Jr. et al. |
| 2004/0005205 A1 | 1/2004 | Yake et al. |

FOREIGN PATENT DOCUMENTS

| | | |
|---|---|---|
| DE | 3445514 | 6/1986 |
| DE | 19533138 | 11/1996 |
| FR | 2871535 * | 6/2004 |
| GB | 687110 | 2/1953 |
| JP | 8114213 A | 5/1996 |
| WO | WO13042557 | 5/2003 |

* cited by examiner

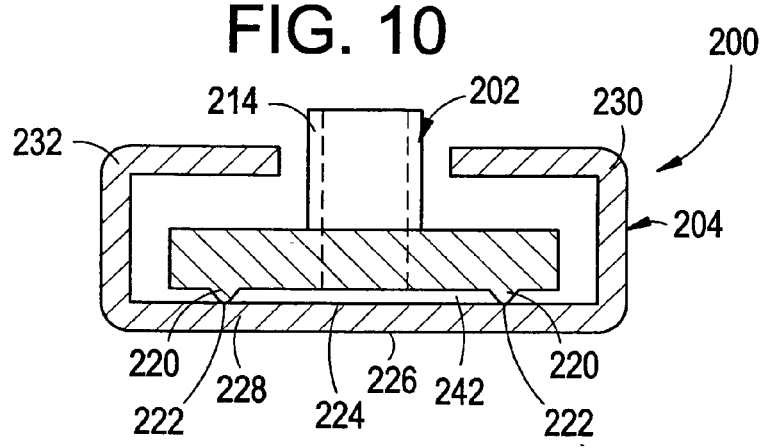
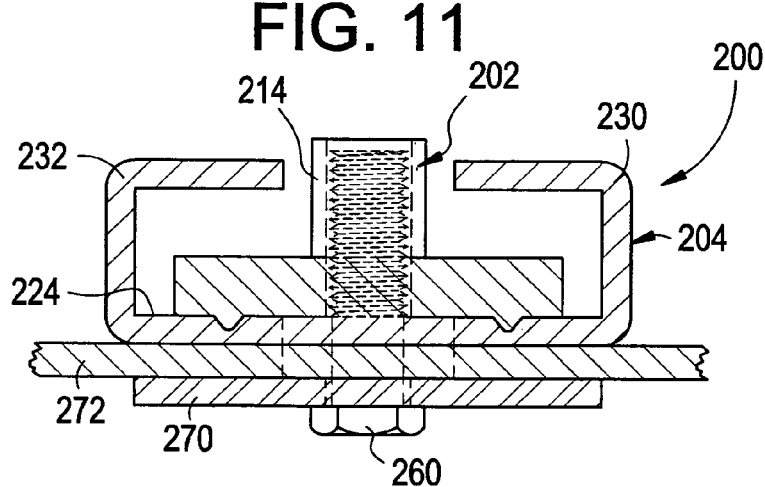
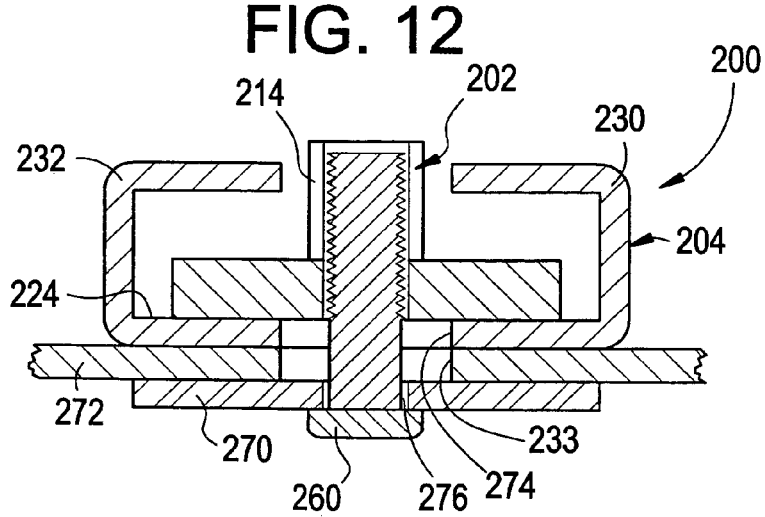

CAGE NUT ASSEMBLY HAVING STAND-OFFS

CROSS-REFERENCE

This patent application is a Continuation-in-Part of application Ser. No. 10/619,340, filed Jul. 14, 2003, and entitled "Cage Nut Assembly Having A Stand-Off Nut", now U.S. Pat. No. 6,979,158 which, in turn, claims the benefit of domestic priority of U.S. Provisional Application Ser. No. 60/396,268, filed Jul. 16, 2002, and entitled "Cage Nut Assembly Having A Stand-Off Nut".

BACKGROUND OF THE INVENTION

The present invention relates to a cage nut assembly.

Cage nut assemblies are well known in the art and provide a useful function in that they are able to hold a threaded nut at locations in a frame that are difficult or in some cases impossible to reach with a tool. Cage nut assemblies are used in vehicles for seat attachments, radiator attachments, chassis to drive train attachments, and for any other nut application that requires the nut to have a float/adjustability feature along at least one of the "X", "Y" and "Z" axes in order to accommodate tolerance variations and enable engagement thereof by a male threaded fastener.

Problems have arisen in conjunction with prior art cage nut assemblies. One problem occurs after the cages of the cage nut assemblies are welded to a mating surface, such as an automobile frame. After the cages are welded to the automobile frame, the frames are sent through a bath that adds a corrosion or paint coating thereto, such as an e-coat or ELPO bath. In cage nut assemblies where the underside of the nut is capable of sitting flat against a portion of the cage, the nut and cage may become fused or stuck together when the bath is applied as the cage nut assembly moves through the bath in a horizontal position, thus inhibiting or removing the intended float/adjustability feature of the nut within the cage.

Two separate United States patents have acknowledged this problem and have attempted to provide cage nut assemblies which solve the problem. U.S. Pat. No. 5,096,350 discusses the use of any item attached to either the cage or the nut, or to a third part positioned between the nut and the cage, that flattens out when the nut is torqued into place. This item allows for the stand-off needed during the bath and provides for a solid joint when the nut is torqued into place. These flattenable projections either on the cage or the nut, or the addition of a third part with the flattenable projections thereon, provide high manufacturing costs to the cage nut assembly.

U.S. Pat. No. 5,630,686 discusses the use of plastic rings staked at the top of a nut extrusion that hold the nut up off of the cage floor or mating panel, thus removing the possibility that the bath will allow the parts to stick together. The plastic rings are flexible enough to allow a solid joint to take place when the nut is lowered to interface with the cage floor or mating panel when the nut is torqued down. This patent requires the plastic rings in order to perform the desired function. The addition of the plastic rings to the cage nut assembly is expensive and the rings sometimes disengage from the assembly when the nut is torqued into place thus causing a buzz, squeak rattle ("BSR") issue with customers.

These two prior art United States patents are only designed to work when the cage nut assembly runs through baths in the horizontal position, and the underside of the nut is sitting on the cage floor. However, many times, cage nut assemblies are required to run through baths in sideways or upside down positions, such that the sides or top of the nut is capable of resting flat against a flat surface portion of the cage, thus allowing for the nut and cage to become stuck together, thereby inhibiting the intended float/adjustability of the nut within the cage. These two prior art United States patents do not address the issue of when the cage nut assembly is upside down or on its side when running through the bath, that the other sides of the nut could stick to either the walls of the cage or to the ceiling of the cage.

Thus, there is a need for a cage nut assembly which does not allow the nut to become stuck to the cage during the application of a bath and which overcomes the disadvantages of the aforementioned United States patents which have attempted to solve this same problem.

OBJECTS AND SUMMARY

A primary object of an embodiment of the present invention is to provide a cage nut assembly which reduces the possibility of the nut sticking to the cage when a bath that adds a corrosion or paint coating is applied thereto.

An object of an embodiment of the present invention is to provide a cage nut assembly which reduces the possibility of the nut sticking to the cage when the cage nut assembly runs through the bath in a horizontal position.

Another object of an embodiment of the present invention is to provide a cage nut assembly which reduces the possibility of the nut sticking to the cage when the cage nut assembly runs through the bath upside down.

Yet another object of an embodiment of the present invention is to provide a cage nut assembly which reduces the possibility of the nut sticking to the cage when the cage nut assembly runs through the bath on its side.

Another object of an embodiment of the present invention is to provide a cage nut assembly that has strong joints between the nuts and the cages after the nuts are torqued into place.

Yet another object of an embodiment of the present invention is to provide stand-off features on the nut which will reduce the amount of bearing surface interface between the cage and nut, before the nuts are torqued down.

Still another object of an embodiment of the present invention is to provide stand-off features on the cage which will reduce the amount of bearing surface interface between the cage and nut, before the nuts are torqued down.

Another object of an embodiment of the present invention is to provide a cage nut assembly where the nut is allowed to float in at least one direction within the cage after a coating of the mating surface, which the cage is attached to.

Still another object of an embodiment of the present invention is to provide a cage nut assembly which requires less manufacturing costs in comparison to cage nut assemblies of the prior art.

An object of an embodiment of the present invention is to provide a cage nut assembly having a nut which is made of a harder material than a cage thereof such that the nut can push into the material of the cage, causing it to flow out of the way to allow the nut to embed itself into the cage.

Briefly, and in accordance with the foregoing, the present invention provides a cage nut assembly having a nut and a cage wrapped therearound. The nut and/or the cage are provided with a number of stand-offs. The stand-offs reduce the amount of bearing surface interface between the cage and the nut thus reducing the possibility that the two parts will stick to each other after a bath is applied to the mating surface, and thus to the cage nut assembly, as the cage is welded to the mating surface. The stand-offs can be configured such that the cage nut assembly can move through the bath in a horizontal position, an upside down position, or a sideways position, substantially without the cage and nut sticking to one another.

BRIEF DESCRIPTION OF THE DRAWINGS

The organization and manner of the structure and operation of the invention, together with further objects and advantages thereof, may best be understood by reference to the following description taken in connection with the accompanying drawings wherein like reference numerals identify like elements in which:

FIG. 10 is a cross-sectional side elevational view of the cage nut assembly of the second embodiment of the invention taken along line 10—10 of FIG. 9, prior to the nut being torqued into place and prior to the cage nut assembly going through a bath in a horizontal position;

FIG. 11 is a cross-sectional side elevational view of the cage nut assembly of the second embodiment of the invention taken along line 10—10 of FIG. 9, after the nut is torqued into place, with the nut securing a structural member and a seat attachment member to the cage nut assembly;

FIG. 12 is a cross-sectional side elevational view of the cage nut assembly of the second embodiment of the invention taken along line 12—12 of FIG. 9, after the nut is torqued into place, with the nut securing a structural member and a seat attachment member to the cage nut assembly;

DETAILED DESCRIPTION OF THE ILLUSTRATED EMBODIMENT

Figure 1:
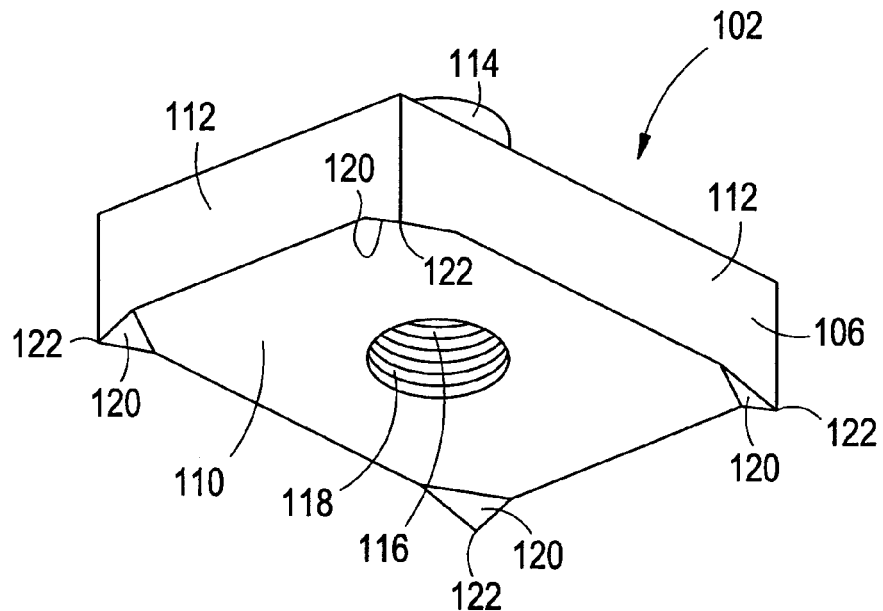
FIG. 1 is a perspective view of a nut of a first embodiment of the invention.

While this invention may be susceptible to embodiment in different forms, there is shown in the drawings and will be described herein in detail, specific embodiments with the understanding that the present disclosure is to be considered an exemplification of the principles of the invention, and is not intended to limit the invention to that as illustrated.

A first embodiment of the cage nut assembly 100 is shown in FIGS. 1–6. A second embodiment of the cage nut assembly 200 is shown in FIGS. 7–12. A third embodiment of the cage nut assembly 300 is shown in FIGS. 13–17. A fourth embodiment of the cage nut assembly 400 is shown in FIGS. 18–23. A fifth embodiment of the cage nut assembly 500 is shown in FIGS. 24–30. A sixth embodiment of the cage nut assembly 600 is shown in FIGS. 31–37. A seventh embodiment of the cage nut assembly 700 is shown in FIGS. 38–43. An eighth embodiment of the cage nut assembly 800 is shown in FIGS. 44–49. A ninth embodiment of the cage nut assembly 900 is shown in FIGS. 50–55. A tenth embodiment of the cage nut assembly 1000 is shown in FIGS. 56—63. An eleventh embodiment of the cage nut assembly 1100 is shown in FIGS. 64–68. Like elements are denoted with like reference numerals with the first embodiment being in the one hundreds, the second embodiment being in the two hundreds, the third embodiment being in the three hundreds, the fourth embodiment being in the four hundreds, the fifth embodiment being in the five hundreds, the sixth embodiment being in the six hundreds; the seventh embodiment being in the seven hundreds; the eighth embodiment being in the eight hundreds, the ninth embodiment being in the nine hundreds, the tenth embodiment being in the ten hundreds, and the eleventh embodiment being in the eleven hundreds.

Attention is directed to a first embodiment of a cage nut assembly 100 of the present invention, which is best illustrated in FIGS. 1–6. The cage nut assembly 100 includes a nut 102 and a cage 104.

The nut 102 is best illustrated in FIG. 1 and includes a rectangular plate 106 having a generally planar upper surface 108, a generally planar lower surface 110 and sidewalls 112 which connect the upper and lower surfaces 108, 110. The nut 102 also includes a cylindrical member 114 which extends outwardly from the upper surface 108 of the nut 102. The cylindrical member 114 is preferably in the form of a right circular cylinder. An aperture 116 extends through the nut member 102 from the plate 106 into the cylindrical member 114. The aperture 116 may be closed at the lower surface 110 of the plate 106 or it may extend all the way through the plate 106. The aperture 116 defines an aperture wall 118 which is preferably threaded and is capable of receiving a bolt or screw 160 to be attached thereto.

The nut 102 also preferably includes four stand-offs 120 which extend outwardly from the lower surface 110 of the nut 102. Each stand-off 120 extends outwardly from one of the four corners of the lower surface 110 of the nut 102. Each stand-off 120 is also preferably in the form of a protrusion in the form of a tetrahedron such that each of the stand-offs 120 extends generally to a pointed portion 122 thereof. Of course, the stand-offs 120 may be in forms other than of a tetrahedron, such as dimples, ribs, or any other type of stand-off structure, so long as the stand-offs allow for reduced surface to surface contact between the nut 102 and the cage 104 prior to the torqueing of the nut 102.

The nut 102 may be formed by cold forming, stamping, or staking a nut member into a plate member. The nut 102 may then be heat treated, if desired, depending on the hardness of the material of the nut 102.

The cage 104 is used for encaging the nut 102. Prior to encaging the nut 102, the cage 104 has generally planar upper and lower surfaces 124, 126. The cage 104 includes a base portion 128 and bendable first and second arm portions 130, 132 extending from opposite ends of the base portion 128. The first and second arm portions 130, 132 are preferably integrally formed with the base portion 128.

Figure 6:
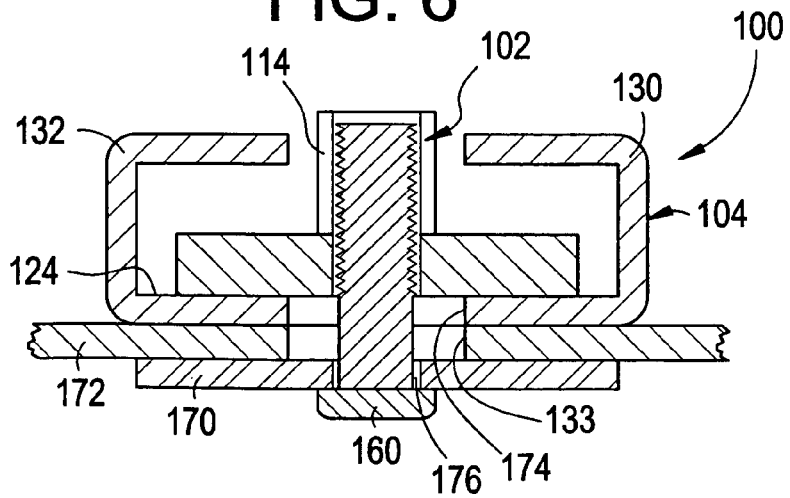
FIG. 6 is a cross-sectional side elevational view of the cage nut assembly of the first embodiment of the invention taken along line 6—6 of FIG. 3, after the nut is torqued into place, with the nut securing a structural member and a seat attachment member to the cage nut assembly.

An aperture 133, see FIG. 6, is provided through the base portion 128 of the cage 104 and the first and second arm portions 130, 132 have generally semicircular cutouts 134, 136 at their free ends 138, 140.

The cage 104 is formed of material which is softer than the material of the nut 102.

Figure 2:
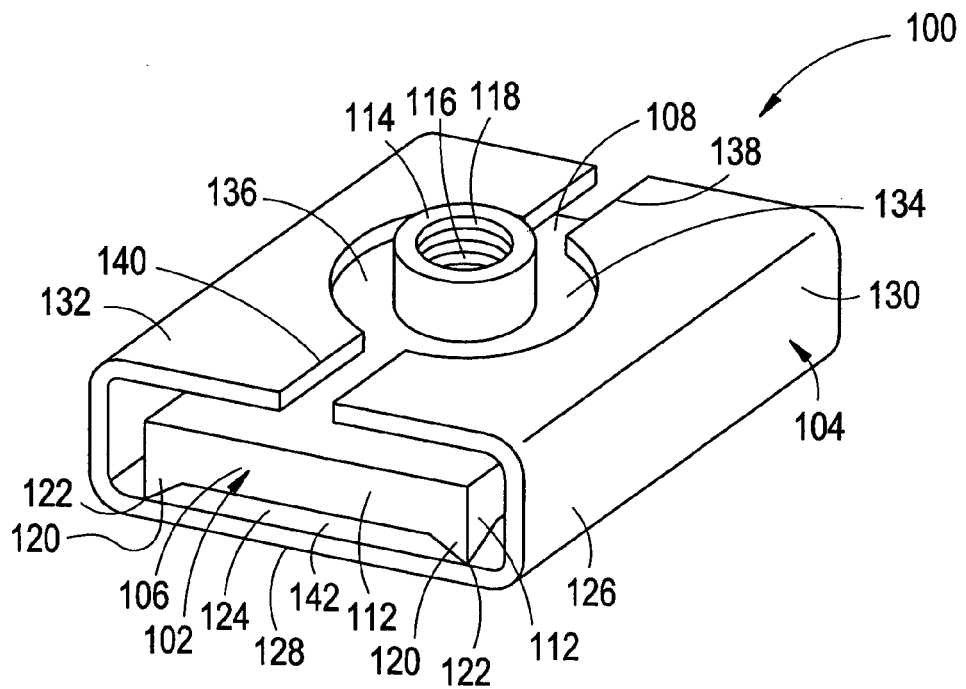
FIG. 2 is a perspective view of a cage nut assembly of the first embodiment of the invention.
Figure 3:
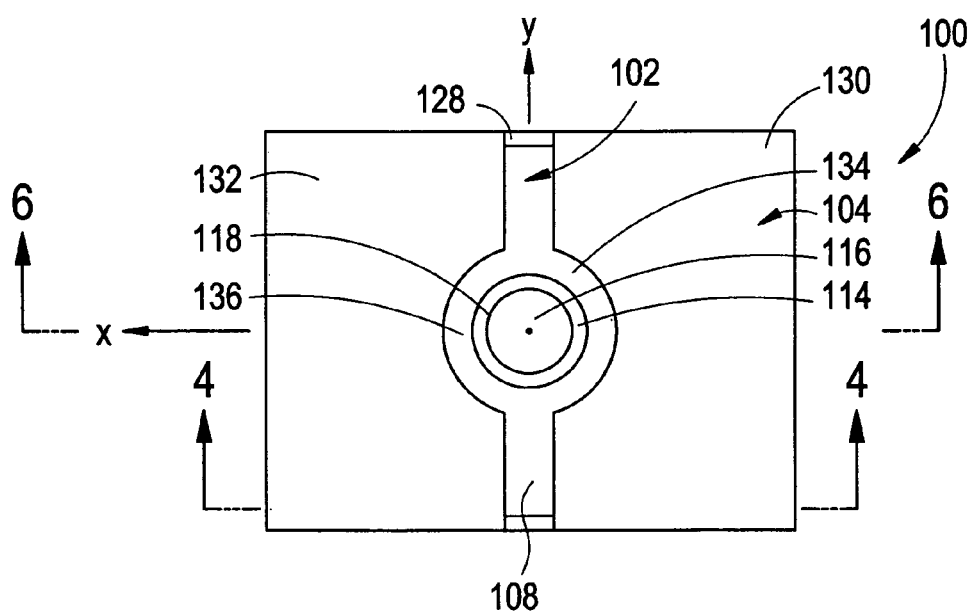
FIG. 3 is a top plan view of the cage nut assembly of the first embodiment of the invention.
Figure 4:
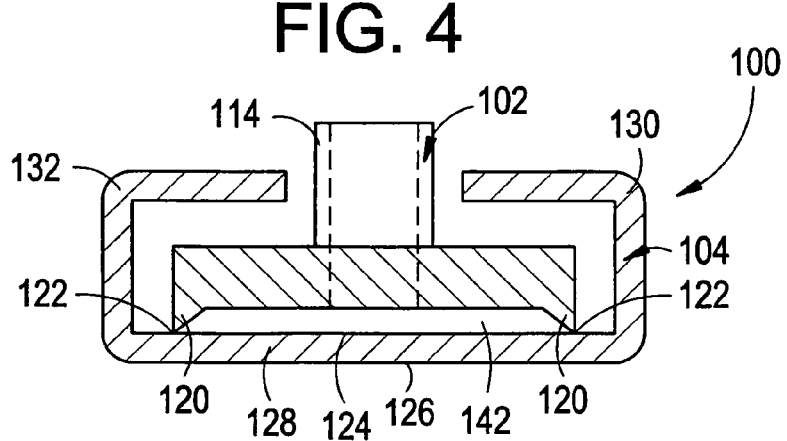
FIG. 4 is a cross-sectional side elevational view of the cage nut assembly of the first embodiment of the invention taken along line 4—4 of FIG. 3, prior to the nut being torqued into place and prior to the cage nut assembly going through a bath in a horizontal position.

In operation, and as best illustrated in FIGS. 2–4, the nut 102 is positioned on the upper surface 124 of the base portion 128 such that the points 122 of the stand-offs 120 are the only parts of the nut 102 which are in contact with the upper surface 124 of the base portion 128. Thus, a gap 142 is provided between the upper surface 124 of the base portion 128 of the cage 104 and the lower surface 110 of the nut 102.

Each of the arm portions 130, 132 is then bent around one of the sidewalls 112 of the nut 102 and above the upper surface 108 of the nut 102. The free ends 138, 140 of the arm portions 130, 132 are typically spaced apart and the semicircular cutouts 134, 136 are in alignment with one another. The aperture 133 preferably has a diameter which is greater than or equal to a diameter of the semicircular cutouts 134, 136. The cylindrical member 114 of the nut 102 extends through the semicircular cutouts 134, 136. Thus, the cage 104 effectively encages the nut 102 to form the cage nut assembly 100, which is best illustrated in FIGS. 2–4. The cage 104 is sized so that the nut 102 has a limited range of movement in at least one dimension, and preferably in two dimensions, for example the "X" and "Y" axes as illustrated in FIG. 3.

Figure 5:
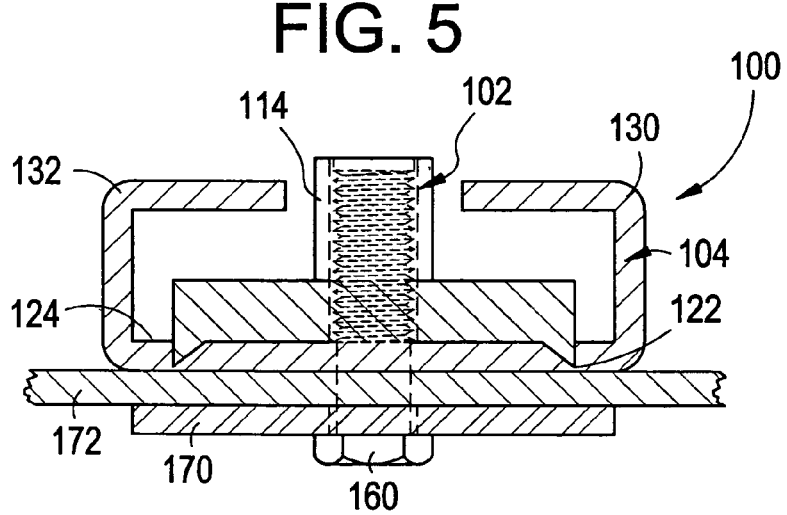
FIG. 5 is a cross-sectional side elevational view of the cage nut assembly of the first embodiment of the invention taken along line 4—4 of FIG. 3, after the nut is torqued into place, with the nut securing a structural member and a seat attachment member to the cage nut assembly.

The lower surface 126 of the base portion 128 of the cage 104 is then welded to a mating surface or structural member 172, such as an automobile frame, see FIGS. 5 and 6. The structural member 172 has an aperture 174 therethrough which is in alignment with the aperture 133 of the cage 104. The aperture 174 preferably has a diameter which is greater than or equal to the diameter of the aperture 133. The structural member 172 and the cage 104 are then typically sent through a bath that is meant to add a corrosion or paint coating to the structural member 172, such as an e-coat or ELPO bath. The stand-offs 120 keep the lower surface 110 of the nut 102 from sitting flat on the upper surface 124 of the base portion 128 of the cage 104, thus reducing the amount of bearing surface interface between the cage 104 and the nut 102, thus reducing the possibility that the cage 104 and the nut 102 will stick or adhere to each other after coating or welding is complete.

The nut 102 is engaged by a male threaded fastener 160 in the form of a bolt or screw which is torqued into place within the cage 104. The fastener 160 extends through an aperture 176 of a member 170, positioned against the structural member 172, through the aperture 174 of the structural member 172, through the aperture 133 of the cage 104, and into the aperture 116 of the nut 102. The fastener 160 engages the aperture wall 118 of the aperture 116. The cage 104 prevents the nut 102 from turning to permit full engagement of the male fastener (not shown). The stand-offs 120, being formed of a material which is harder than the material of the cage 104, push into the material of the cage 104. This causes the material of the cage 104 to flow out of the way such that the stand-offs 120 embed into the softer material of the cage 104 without deforming the stand-offs 120 to a flattened condition, as best illustrated in FIGS. 5 and 6. It should be noted that in practice the male fastener 160 is engaged with nut 102 to attain the condition as illustrated in FIGS. 5 and 6. The gap 142 between the upper surface 124 of the base portion 128 of the cage 104 and the lower surface 110 of the nut 102, as illustrated in FIGS. 2 and 4, is entirely removed, or is minimal, after the torqueing of the nut 102 such that a solid joint between the male fastener 160 and the nut 102 and the cage 104 is attained. Whether the gap 142 is entirely removed or is minimal after the torqueing of the nut 102 is a function of the hardness of the cage 104 relative to the hardness of the nut 102 as well as a function of how tight the male fastener 160 is engaged with the nut 102.

Attention is directed to a second embodiment of a cage nut assembly 200 of the present invention, which is best illustrated in FIGS. 7–12. The cage nut assembly 200 includes a nut 202 and a cage 204.

Figure 7:
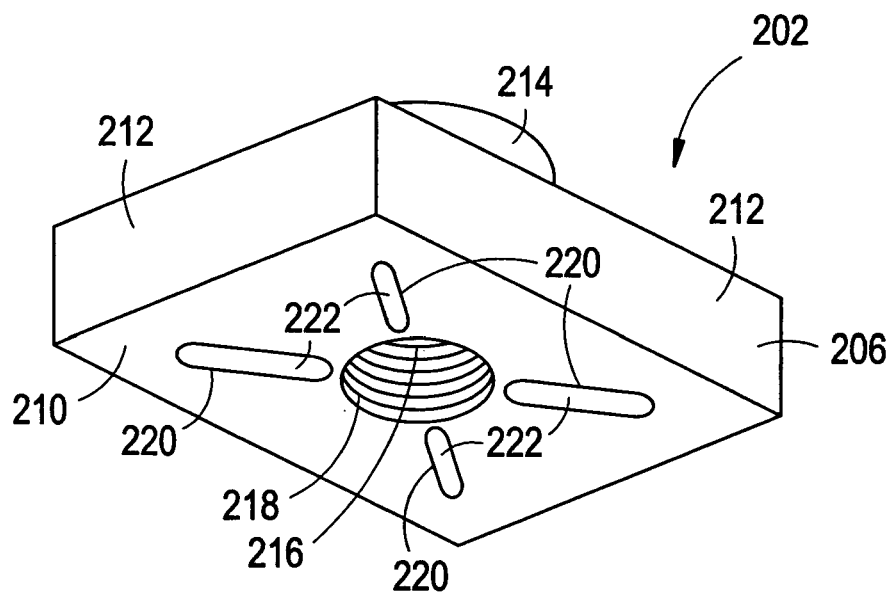
FIG. 7 is a perspective view of a nut of a second embodiment of the invention.

The nut 202 is best illustrated in FIG. 7 and includes a rectangular plate 206 having a generally planar upper surface 208, a generally planar lower surface 210 and sidewalls 212 which connect the upper and lower surfaces 208, 210. The nut 202 also includes a cylindrical member 214 which extends outwardly from the upper surface 208 of the nut 202. The cylindrical member 214 is preferably in the form of a right circular cylinder. An aperture 216 extends through the nut member 202 from the plate 206 into the cylindrical member 214. The aperture 216 may be closed at the lower surface 210 of the plate 206 or it may extend all the way through the plate 206. The aperture 216 defines an aperture wall 218 which is preferably threaded and is capable of receiving a bolt or screw 260 to be attached thereto.

The nut 202 also preferably includes four stand-offs 220 which extend outwardly from the lower surface 210 of the nut 202. Each stand-off 220 extends a portion of a distance between the aperture 216 and one of the four corners of the lower surface 210 of the nut 202. Each stand-off 220 is also preferably in the form of a protrusion in the form of a rounded bead. Of course, the stand-offs 220 may be in forms other than of rounded beads, such as dimples, ribs, or any other type of stand-off structure, so long as the stand-offs allow for reduced surface to surface contact between the nut 202 and the cage 204 prior to the torqueing of the nut 202.

The nut 202 may be formed by cold forming, stamping, or staking a nut member into a plate member. The nut 202 may then be heat treated, if desired, depending on the hardness of the material of the nut 202.

The cage 204 is used for encaging the nut 202. Prior to encaging the nut 202, the cage 204 has generally planar upper and lower surfaces 224, 226. The cage 204 includes a base portion 228 and bendable first and second arm portions 230, 232 extending from opposite ends of the base portion 228. The first and second arm portions 230, 232 are preferably integrally formed with the base portion 228.

An aperture 233, see FIG. 12, is provided through the base portion 228 of the cage 204 and the first and second arm portions 230, 232 have generally semicircular cutouts 234, 236 at their free ends 238, 240.

The cage 204 is formed of material which is softer than the material of the nut 202.

Figure 8:
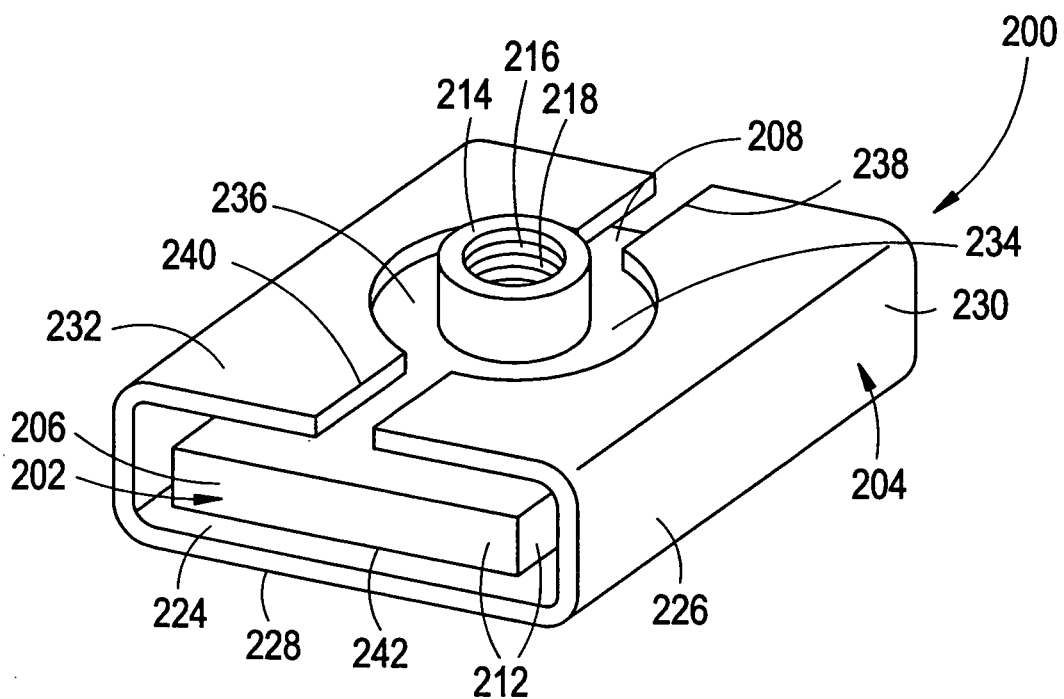
FIG. 8 is a perspective view of a cage nut assembly of the second embodiment of the invention.
Figure 9:
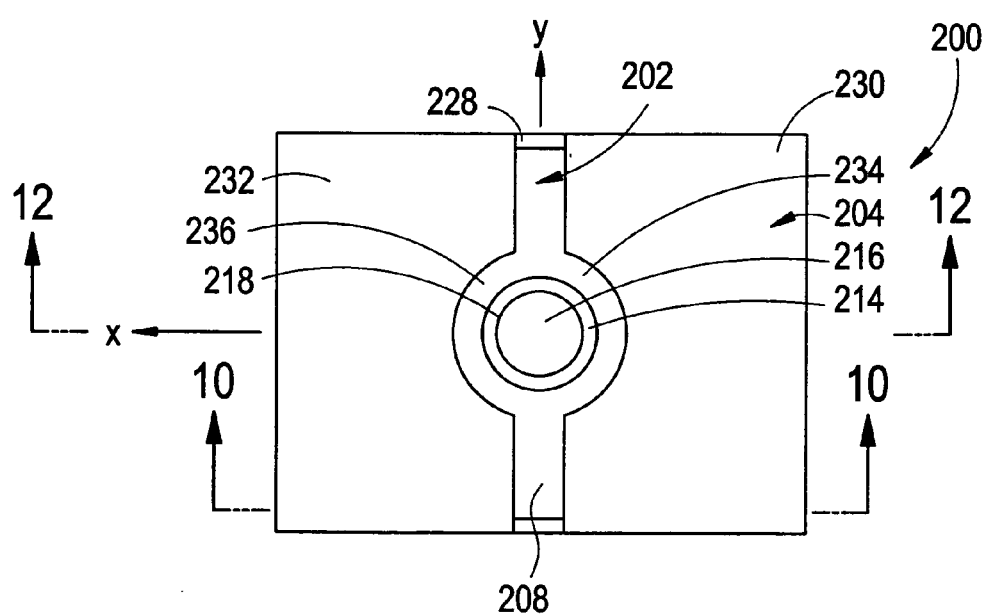
FIG. 9 is a top plan view of the cage nut assembly of the second embodiment of the invention.

In operation, and as best illustrated in FIGS. 8–10, the nut 202 is positioned on the upper surface 224 of the base portion 228 such that the stand-offs 220 at point or line 222 are the only parts of the nut 202 which are in contact with the upper surface 224 of the base portion 228. Thus, a gap 242 is provided between the upper surface 224 of the base portion 228 of the cage 204 and the lower surface 210 of the nut 202.

Each of the arm portions 230, 232 is then bent around one of the sidewalls 212 of the nut 202 and above the upper surface 208 of the nut 202. The free ends 238, 240 of the arm portions 230, 232 are typically spaced apart and the semicircular cutouts 234, 236 are in alignment with one another. The aperture 233 preferably has a diameter which is greater than or equal to a diameter of the semicircular cutouts 234, 236. The cylindrical member 214 of the nut 202 extends through the semicircular cutouts 234, 236. Thus, the cage 204 effectively encages the nut 202 to form the cage nut assembly 200, as best illustrated in FIGS. 8–10. The cage 204 is sized so that the nut 202 has a limited range of movement in at least one dimension, and preferably in two dimensions, for example the "X" and "Y" axes as illustrated in FIG. 9.

The lower surface 226 of the base portion 228 of the cage 204 is then welded to a mating surface or structural member 272, such as an automobile frame, see FIGS. 11 and 12. The structural member 272 has an aperture 274 therethrough which is in alignment with the aperture 233 of the cage 204. The aperture 274 preferably has a diameter which is greater than or equal to the diameter of the aperture 233. The structural member 272 and the cage 204 are then typically sent through a bath that is meant to add a corrosion or paint coating to the structural member 272, such as an e-coat or ELPO bath. The stand-offs 220 keep the lower surface 210 of the nut 202 from sitting flat on the upper surface 224 of the base portion 228 of the cage 204, thus reducing the amount of bearing surface interface between the cage 204 and the nut 202, thus reducing the possibility that the cage 204 and the nut 202 will stick to each other after coating is complete.

The nut 202 is engaged by a male threaded fastener 260 in the form of a bolt or screw which is torqued into place within the cage 204. The fastener 260 extends through an aperture 276 of a member 270, positioned against the structural member 272, through the aperture 274 of the structural member 272, through the aperture 233 of the cage 204, and into the aperture 216 of the nut 202. The fastener 260 engages the aperture wall 218 of the aperture 216. The cage 204 prevents the nut 102 from turning to permit full engagement of the male fastener 260. The stand-offs 220, being formed of a material which is harder than the material of the cage 204, push into the material of the cage 204. This causes the material of the cage 204 to flow out of the way such that the stand-offs 220 embed into the softer material of the cage 204 without deforming the stand-offs 220 to a flattened condition, as best illustrated in FIGS. 11 and 12. It should be noted that in practice the male fastener 260 is engaged with nut 202 to attain the condition as illustrated in FIGS. 11 and 12. The gap 242 between the upper surface 224 of the base portion 228 of the cage 204 and the lower surface 210 of the nut 202, as illustrated in FIGS. 8 and 10, is entirely removed, or is minimal, after the torqueing of the nut 202 such that a solid joint between the fastener 260 and the nut 202 and the cage 204 is attained. Whether the gap 242 is entirely removed or is minimal after the torqueing of the nut 202 is a function of the hardness of the cage 204 relative to the hardness of the nut 202 as well as a function of how tight the male fastener 260 is engaged with the nut 202.

The cage nut assemblies 100, 200 thus allow for strong joints between the nuts 102, 202 and the cages 104, 204 after the nuts 102, 202 are torqued into place. The cage nut assemblies 100, 200 also require less manufacturing costs in comparison to the cage nut assemblies of the prior art.

The cage nut assemblies 100, 200 also thus provide an effective measure for reducing the possibility of the nuts 102, 202 sticking to the cages 104, 204 when the cage nut assemblies 100, 200 run through the bath in the horizontal position, as illustrated in FIGS. 2 and 7, respectively. The cage nut assemblies 100, 200, however, do not reduce the possibility of the nuts 102, 202 sticking to the cages 104, 204 when the cage nut assemblies 100, 200 run through the bath either upside down or on its side. The cage nut assemblies 300, 400, 500, 600, 700, 800, 900, 1000, 1100 are directed to these problems as will be discussed hereinbelow.

Attention is directed to a third embodiment of a cage nut assembly 300 of the present invention, which is best illustrated in FIGS. 13–17. The cage nut assembly 300 includes a nut 302 and a cage 304.

Figure 13:
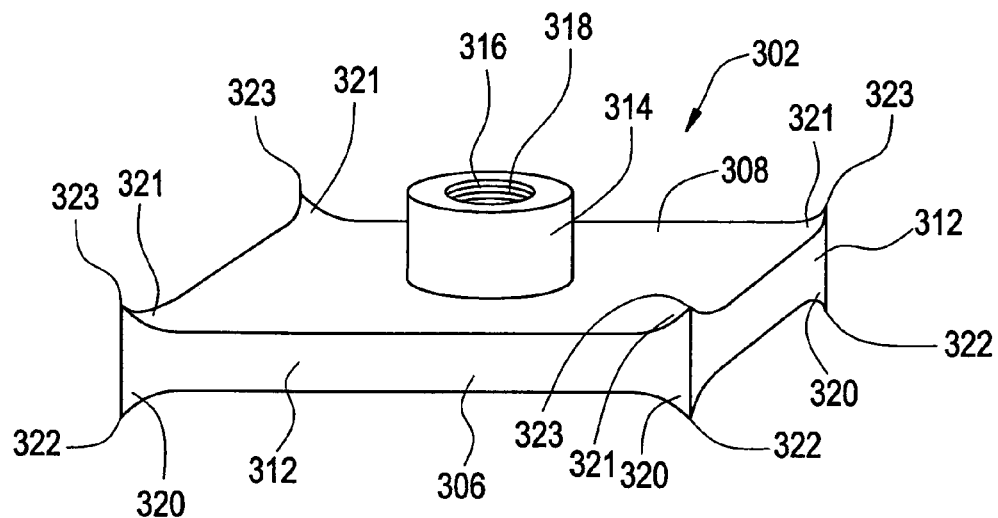
FIG. 13 is a perspective view of a nut of a third embodiment of the invention.

The nut 302 is best illustrated in FIG. 13 and includes a rectangular plate 306 having a generally planar upper surface 308, a generally planar lower surface 310 and sidewalls 312 which connect the upper and lower surfaces 308, 310. The nut 302 also includes a cylindrical member 314 which extends outwardly from the upper surface 308 of the nut 302. The cylindrical member 314 is preferably in the form of a right circular cylinder. An aperture 316 extends through the nut member 302 from the plate 306 into the cylindrical member 314. The aperture 316 may be closed at the lower surface 310 of the plate 306 or it may extend all the way through the plate 306. The aperture 316 defines an aperture wall 318 which is preferably threaded and is capable of receiving a bolt or screw (not shown) to be attached thereto.

The nut 302 preferably includes four stand-offs 320 which extend outwardly from the lower surface 310 of the nut 302. Each stand-off 320 extends outwardly from one of the four corners of the lower surface 310 of the nut 302. Each stand-off 320 is also preferably in the form of a protrusion in the form of a tetrahedron such that each of the stand-offs 320 extends generally to a pointed portion 322 thereof. Of course, the stand-offs 320 may be in forms other than of a tetrahedron, such as dimples, ribs, or any other type of stand-off structure, so long as the stand-offs allow for reduced surface to surface contact between the nut 302 and the cage 304 prior to the torqueing of the nut 302.

The nut 302 preferably includes four stand-offs 321 which extend outwardly from the upper surface 308 of the nut 302. Each stand-off 321 extends outwardly from one of the four corners of the upper surface 308 of the nut 302. Each stand-off 321 is also preferably in the form of a protrusion in the form of a tetrahedron such that each of the stand-offs 321 extends generally to a pointed portion 323 thereof. Of course, the stand-offs 321 may be in forms other than of a tetrahedron, such as dimples, ribs, or any other type of stand-off structure, so long as the stand-offs allow for reduced surface to surface contact between the nut 302 and the cage 304 prior to the torqueing of the nut 302.

The nut 302 may be formed by cold forming, stamping, or staking a nut member into a plate member. The nut 302 may then be heat treated, if desired, depending on the hardness of the material of the nut 302.

The cage 304 is used for encaging the nut 302. Prior to encaging the nut 302, the cage 304 has generally planar upper and lower surfaces 324, 326. The cage 304 includes a base portion 328 and bendable first and second arm portions 330, 332 extending from opposite ends of the base portion 328. The first and second arm portions 330, 332 are preferably integrally formed with the base portion 328.

An aperture (not shown) is provided through the base portion 328 of the cage 304 and the first and second arm portions 330, 332 have generally semicircular cutouts 334, 336 at their free ends 338, 340.

The cage 304 is preferably formed of material which is softer than the material of the nut 302.

In operation, and as best illustrated in FIGS. 14–17, the nut 302 is positioned on the upper surface 324 of the base portion 328 such that the points 322 of the stand-offs 320 are the only parts of the nut 302 which are in contact with the upper surface 324 of the base portion 328. Thus, a gap 342 is provided between the upper surface 324 of the base portion 328 of the cage 304 and the lower surface 310 of the nut 302.

Figure 14:
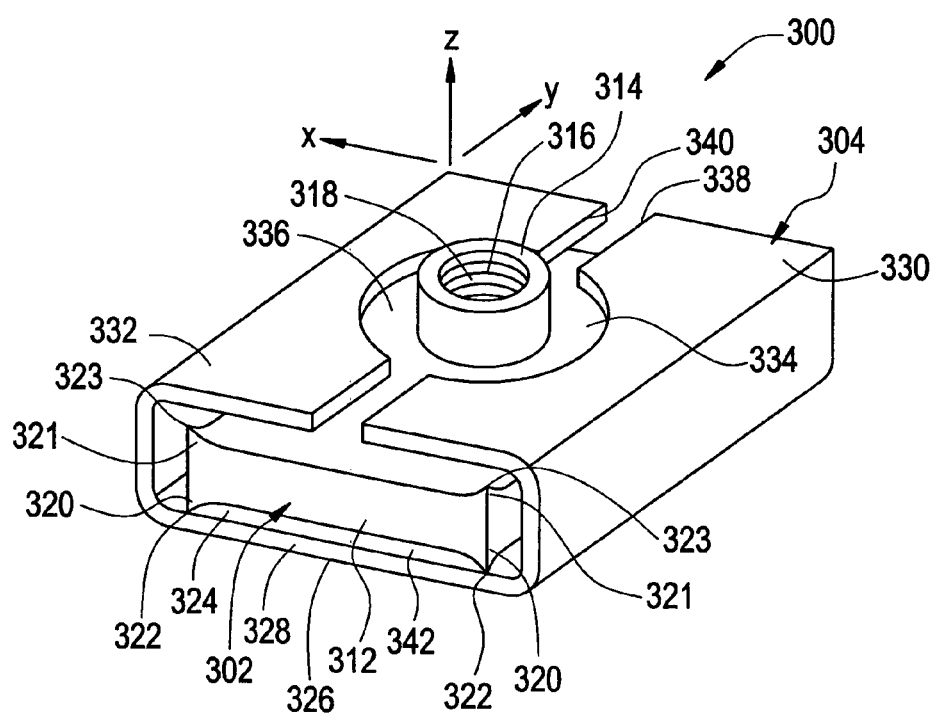
FIG. 14 is a perspective view of a cage nut assembly of the third embodiment of the invention.
Figure 15:
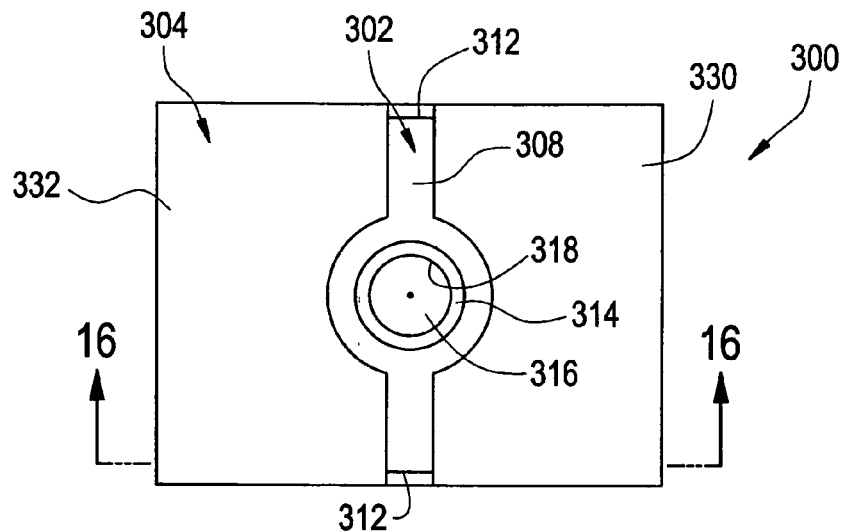
FIG. 15 is a top plan view of the cage nut assembly of the third embodiment of the invention.
Figure 16:
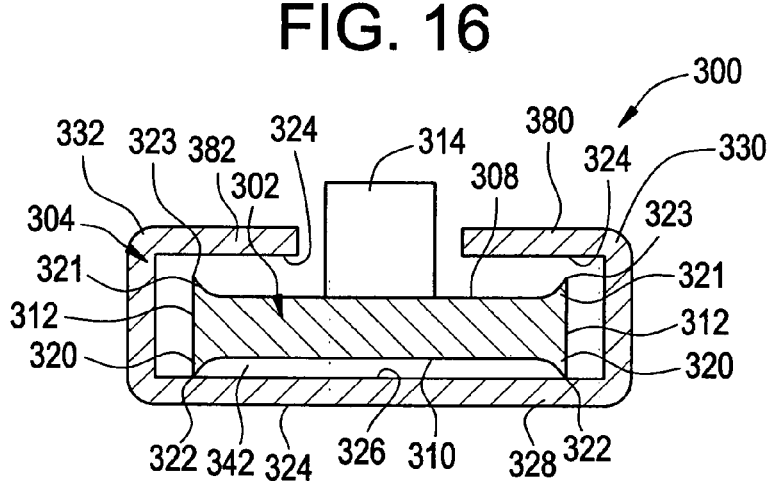
FIG. 16 is a cross-sectional side elevational view of the cage nut assembly of the third embodiment of the invention taken along line 16—16 of FIG. 15, prior to the nut being torqued into place and prior to the cage nut assembly going through a bath in the horizontal position.
Figure 17:
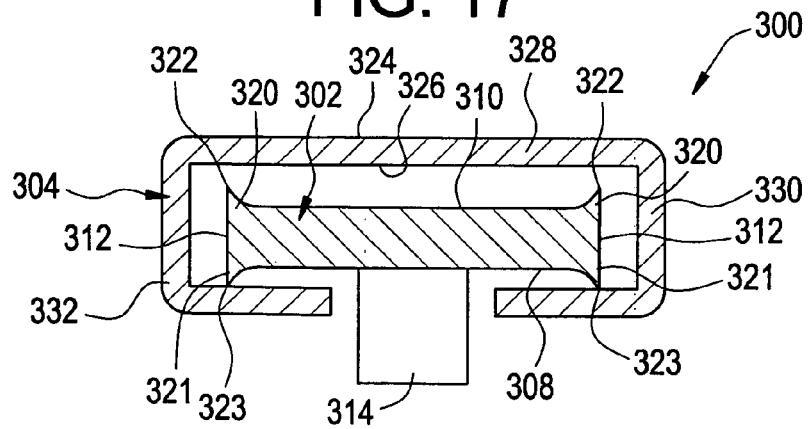
FIG. 17 is a cross-sectional side elevational view of the cage nut assembly of the third embodiment of the invention prior to the nut being torqued into place and prior to the cage nut assembly going through a bath in an upside down position.

Each of the arm portions 330, 332 is then bent around one of the sidewalls 312 of the nut 302 and above the upper surface 308 of the nut 302. The free ends 338, 340 of the arm portions 330, 332 are typically spaced apart and the semicircular cutouts 334, 336 are in alignment with one another. The aperture provided through the base portion 328 preferably has a diameter which is greater than or equal to a diameter of the semicircular cutouts 334, 336. The cylindrical member 314 of the nut 302 extends through the semicircular cutouts 334, 336. Thus, the cage 304 effectively encages the nut 302 to form the cage nut assembly 300, which is best illustrated in FIGS. 14–17. The cage 304 is sized so that the nut 302 has a limited range of movement in at least one dimension, and preferably in three dimensions, for example the "X", "Y" and "Z" axes as illustrated in FIG. 14.

The lower surface 326 of the base portion 328 of the cage 304 is then welded to a mating surface or structural member (not shown), such as an automobile frame. The structural member has an aperture (not shown) therethrough which is in alignment with the aperture provided through the base portion 328 of the cage 304. The aperture of the structural member preferably has a diameter which is greater than or equal to the diameter of the aperture provided through the base portion 328. The structural member and the cage 304 are then typically sent through a bath that is meant to add a corrosion or paint coating to the structural member, such as an e-coat or ELPO bath. When the cage 304 is sent through the bath in a horizontal position, FIG. 16, the stand-offs 320 keep the lower surface 310 of the nut 302 from sitting flat on the upper surface 324 of the base portion 328 of the cage 304, thus reducing the amount of bearing surface interface between the cage 304 and the nut 302, thus reducing the possibility that the cage 304 and the nut 302 will stick or adhere to each other after coating or welding is complete. When the cage 304 is sent through the bath in an upside down position, FIG. 17, the stand-offs 321 keep the upper surface 308 of the nut 302 from sitting flat on the upper surface 324 of the portions 380, 382 of the arm portions 330, 332 which are bent above the upper surface 308 of the nut 302, thus reducing the amount of bearing surface interface between the cage 304 and the nut 302, thus reducing the possibility that the cage 304 and the nut 302 will stick or adhere to each other after coating or welding is complete.

The nut 302 is then secured to the cage 304 in the same manner as described herein with regard to the nut 102 being secured to the cage 104 in the first embodiment of the invention and as illustrated in FIGS. 5 and 6 and, therefore, will not be described or illustrated herein again for brevity purposes.

Thus, the cage nut assembly 300 effectively reduces the possibility of the nut 302 sticking to the cage 304 when the cage nut assembly 300 is sent through a bath in either the horizontal position or in an upside-down position.

Attention is directed to a fourth embodiment of a cage nut assembly 400 of the present invention, which is best illustrated in FIGS. 18–23. The cage nut assembly 400 includes a nut 402 and a cage 404.

Figure 18:
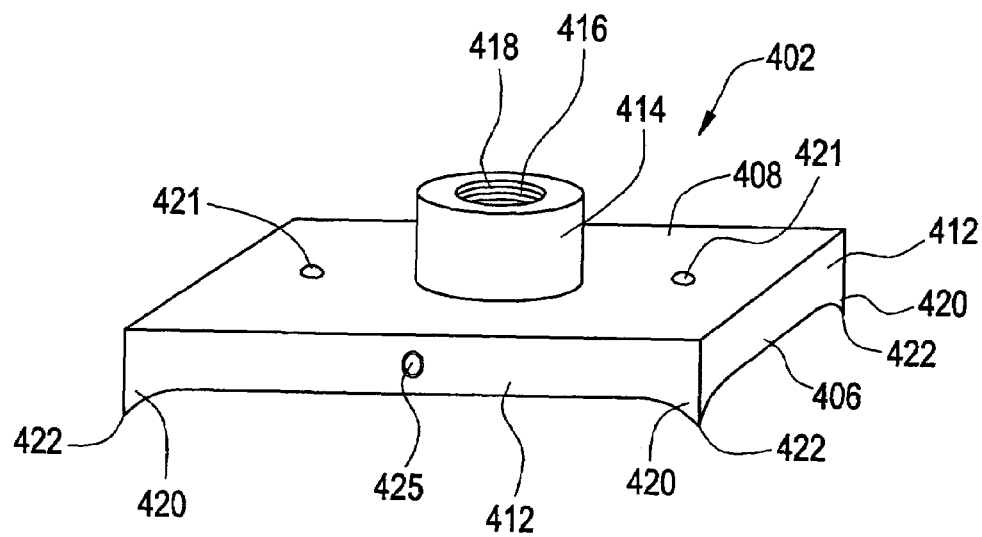
FIG. 18 is a perspective view of a nut of a fourth embodiment of the invention.

The nut 402 is best illustrated in FIG. 18 and includes a rectangular plate 406 having a generally planar upper surface 408, a generally planar lower surface 410 and sidewalls 412 which connect the upper and lower surfaces 408, 410. The nut 402 also includes a cylindrical member 414 which extends outwardly from the upper surface 408 of the nut 402. The cylindrical member 414 is preferably in the form of a right circular cylinder. An aperture 416 extends through the nut member 402 from the plate 406 into the cylindrical member 414. The aperture 416 may be closed at the lower surface 410 of the plate 406 or it may extend all the way through the plate 406. The aperture 416 defines an aperture wall 418 which is preferably threaded and is capable of receiving a bolt or screw (not shown) to be attached thereto.

The nut 402 preferably includes four stand-offs 420 which extend outwardly from the lower surface 410 of the nut 402. Each stand-off 420 extends outwardly from one of the four corners of the lower surface 410 of the nut 402. Each stand-off 420 is also preferably in the form of a protrusion in the form of a tetrahedron such that each of the stand-offs 420 extends generally to a pointed portion 422 thereof. Of course, the stand-offs 420 may be in forms other than of a tetrahedron, such as dimples, ribs, or any other type of stand-off structure, so long as the stand-offs allow for reduced surface to surface contact between the nut 402 and the cage 404 prior to the torqueing of the nut 402.

The nut 402 preferably includes stand-offs 421 which extend outwardly from the upper surface 408 of the nut 402. Each stand-off 421 is also preferably in the form of a protrusion in the form of a rounded dimple. Of course, the stand-offs 421 may be in forms other than rounded dimples, such as rounded beads, ribs, or any other type of stand-off structure, so long as the stand-offs allow for reduced surface to surface contact between the nut 402 and the cage 404 prior to the torqueing of the nut 402. The nut 402 should have at least one stand-off 421 on the upper surface 408, preferably two stand-offs 421 on the upper surface 408, and possibly more than two stand-offs 421 on the upper surface 408, depending on the desired construction and operation of the cage nut assembly 400.

The nut 402 preferably includes a stand-off 425 which extends outwardly from at least one of the sidewalls 412. Each stand-off 425 is also preferably in the form of a protrusion in the form of a rounded dimple. Of course, the stand-offs 425 may be in forms other than dimples, such as rounded beads, ribs, or any other type of stand-off structure, so long as the stand-offs allow for reduced surface to surface contact between the nut 402 and the cage 404 prior to the torqueing of the nut 402. The nut 402 should have a stand-off 425 on at least one of the sidewalls 412, preferably on two sidewalls 412, and possibly on three or four of the sidewalls 412, depending on the desired construction and operation of the cage nut assembly 400. Of course, more than one stand-off 425 could also be provided on any particular sidewall 412 if desired.

The nut 402 may be formed by cold forming, stamping, or staking a nut member into a plate member. The nut 402 may then be heat treated, if desired, depending on the hardness of the material of the nut 402.

The cage 402 is used for encaging the nut 402. Prior to encaging the nut 402, the cage 404 has generally planar upper and lower surfaces 424, 426. The cage 404 includes a base portion 428 and bendable first and second arm portions 430, 432 extending from opposite ends of the base portion 428. The first and second arm portions 430, 432 are preferably integrally formed with the base portion 428.

An aperture (not shown) is provided through the base portion 428 of the cage 404 and the first and second arm portions 430, 432 have generally semicircular cutouts 434, 436 at their free ends 438, 440.

The cage 404 is preferably formed of material which is softer than the material of the nut 402.

In operation, and as best illustrated in FIGS. 19–23, the nut 402 is positioned on the upper surface 424 of the base portion 428 such that the points 422 of the stand-offs 420 are the only parts of the nut 402 which are in contact with the upper surface 424 of the base portion 428. Thus, a gap 442 is provided between the upper surface 424 of the base portion 428 of the cage 404 and the lower surface 410 of the nut 402.

Figure 19:
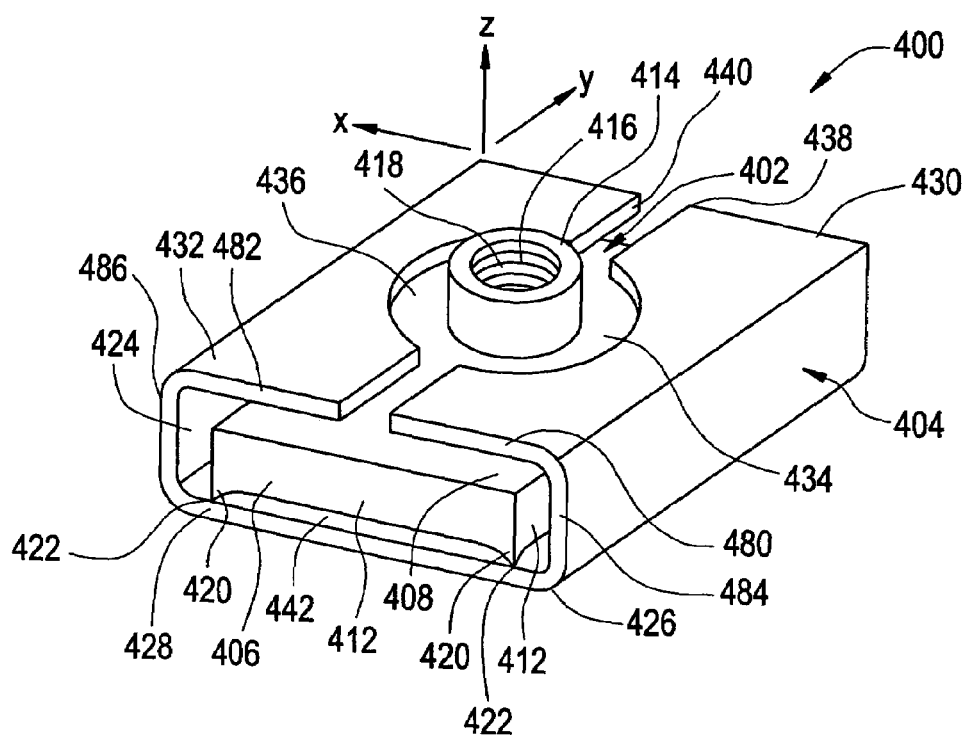
FIG. 19 is a perspective view of a cage nut assembly of the fourth embodiment of the invention.
Figure 20:
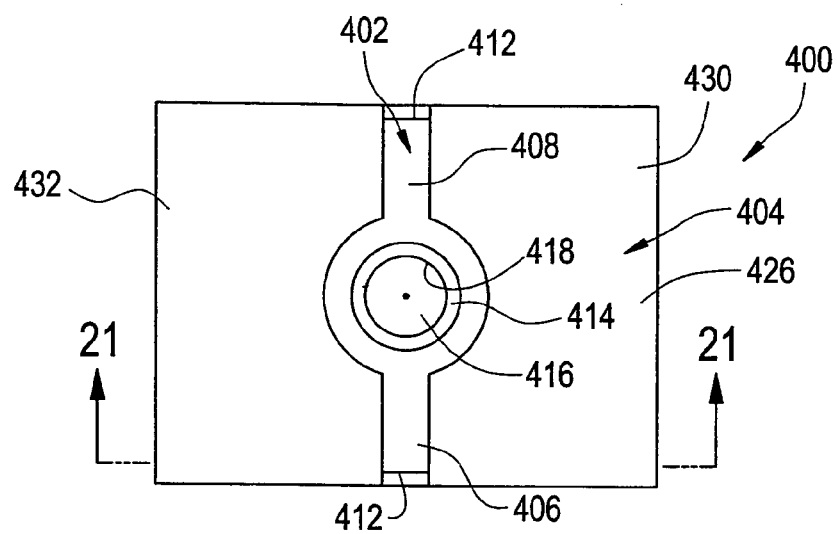
FIG. 20 is a top plan view of the cage nut assembly of the fourth embodiment of the invention.
Figure 21:
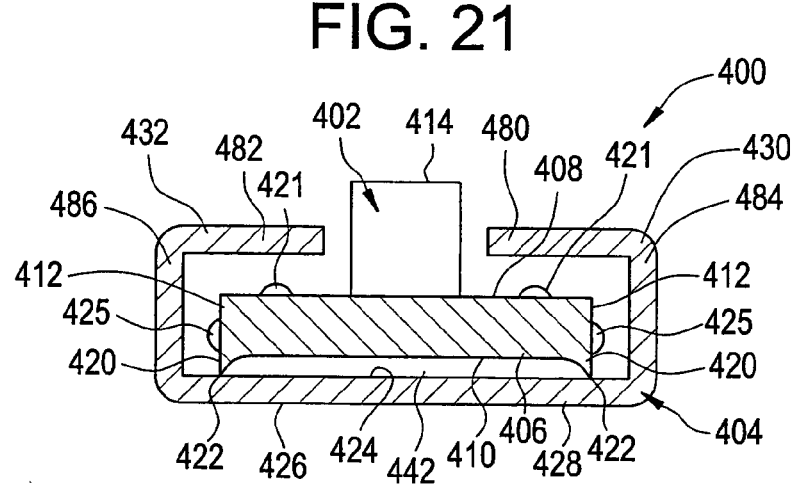
FIG. 21 is a cross-sectional side elevational view of the cage nut assembly of the fourth embodiment of the invention taken along line 21—21 of FIG. 20, prior to the nut being torqued into place and prior to the cage nut assembly going through a bath in the horizontal position.
Figure 22:
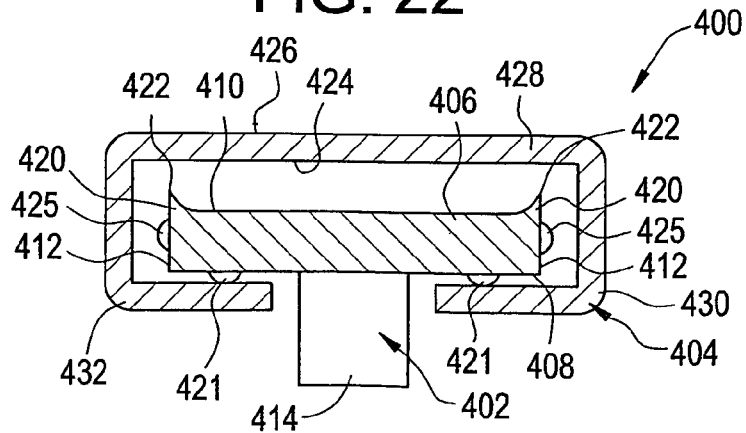
FIG. 22 is a cross-sectional side elevational view of the cage nut assembly of the fourth embodiment of the invention prior to the nut being torqued into place and prior to the cage nut assembly going through a bath in an upside down position.
Figure 23:
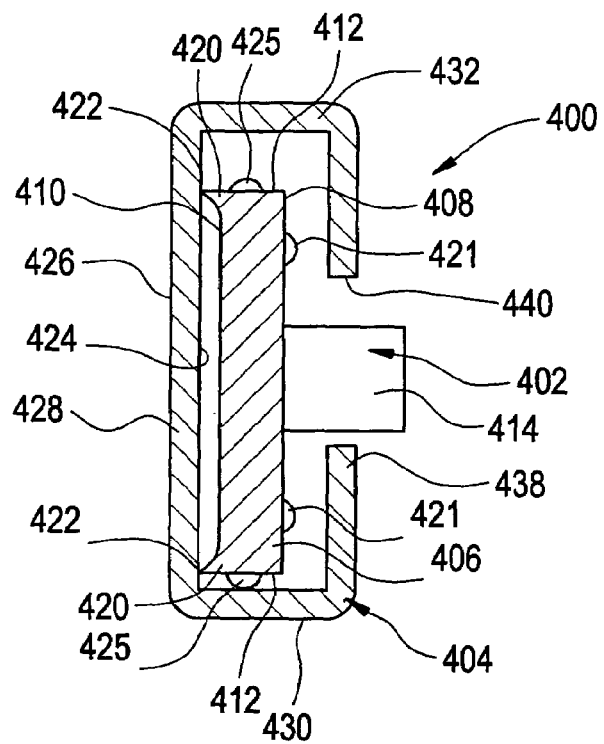
FIG. 23 is a cross-sectional side elevational view of the cage nut assembly of the fourth embodiment of the invention prior to the nut being torqued into place and prior to the cage nut assembly going through a bath in a sideways position.

Each of the arm portions 430, 432 is then bent around one of the sidewalls 412 of the nut 402 and above the upper surface 408 of the nut 402. The free ends 438, 440 of the arm portions 430, 432 are typically spaced apart and the semicircular cutouts 434, 436 are in alignment with one another. The aperture provided through the base portion 428 has a diameter which is greater than or equal to a diameter of the semicircular cutouts 434, 436. The cylindrical member 414 of the nut 402 extends through the semicircular cutouts 434, 436. Thus, the cage 404 effectively encages the nut 402 to form the cage nut assembly 400, which is best illustrated in FIGS. 19–23. The cage 404 is sized so that the nut 402 has a limited range of movement in at least one dimension, and preferably in three dimensions, for example the "X", "Y" and "Z" axes as illustrated in FIG. 19.

The lower surface 426 of the base portion 428 of the cage 404 is then welded to a mating surface or structural member (not shown), such as an automobile frame. The structural member has an aperture (not shown) therethrough which is in alignment with the aperture provided through the base portion 428 of the cage 404. The aperture of the structural member preferably has a diameter which is greater than or equal to the diameter of the aperture provided through the base portion 428 of the cage 404. The structural member and the cage 404 are then typically sent through a bath that is meant to add a corrosion or paint coating to the structural member, such as an e-coat or ELPO bath. When the cage 404 is sent through the bath in a horizontal position, FIG. 21, the stand-offs 420 keep the lower surface 410 of the nut 402 from sitting flat on the upper surface 424 of the base portion 428 of the cage 404, thus reducing the amount of bearing surface interface between the cage 404 and the nut 402, thus reducing the possibility that the cage 404 and the nut 402 will stick or adhere to each other after coating or welding is complete. When the cage 404 is sent through the bath in an upside down position, FIG. 22, the stand-offs 421 keep the upper surface 408 of the nut 402 from sitting flat on the upper surface 424 of the portions 480, 482 of the arm portions 430, 432 which are bent over the upper surface 408 of the nut 402, thus reducing the amount of bearing surface interface between the cage 404 and the nut 402, thus reducing the possibility that the cage 404 and the nut 402 will stick or adhere to each other after coating or welding is complete. When the cage 404 is sent through the bath in a sideways position, FIG. 23, the stand-offs 425 keep the sidewalls 412 of the nut 402 from sitting flat on the upper surface 424 of the portions 484, 486 of the arm portions 430, 432 which are bent over the sidewalls 412 of the nut 402, thus reducing the amount of bearing surface interface between the cage 404 and the nut 402, thus reducing the possibility that the cage 404 and the nut 402 will stick or adhere to each other after coating or welding is complete.

The nut 402 is then secured to the cage 404 in generally the same manner as described herein with regard to the nut 102 being secured to the cage 104 in the first embodiment of the invention and as illustrated in FIGS. 5 and 6 and, therefore, will not be described or illustrated herein again for brevity purposes.

Thus, the cage nut assembly 400 effectively reduces the possibility of the nut 402 sticking to the cage 404 when the cage nut assembly 400 is sent through a bath in the horizontal position, an upside down position, or a sideways position.

Attention is now directed to the fifth embodiment of a cage nut assembly 500 of the present invention, which is best illustrated in FIGS. 24–30. The cage nut assembly 500 includes a nut 502 and a cage 504.

Figure 24:
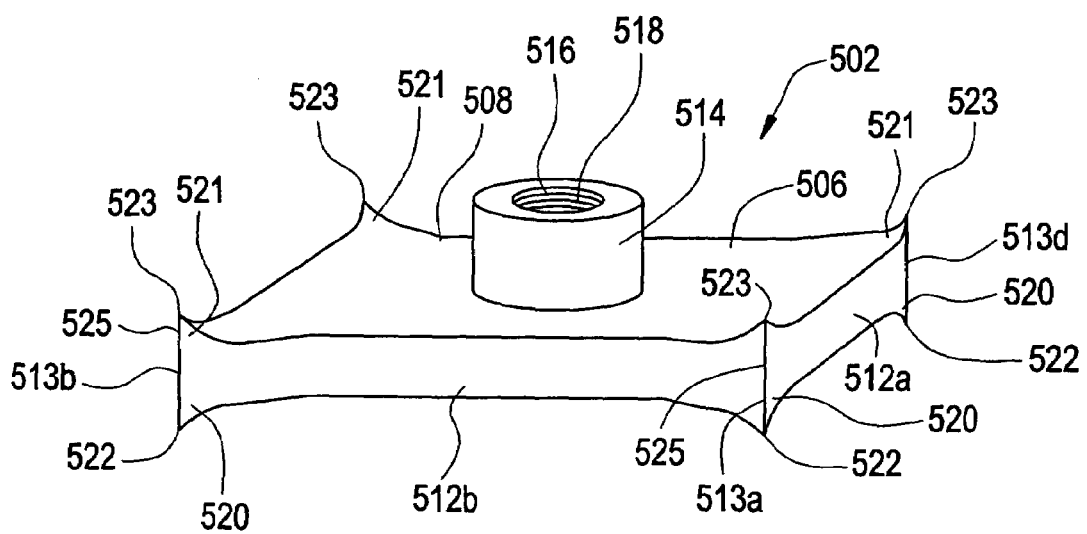
FIG. 24 is a perspective view of a nut of a fifth embodiment of the invention.
Figure 25:
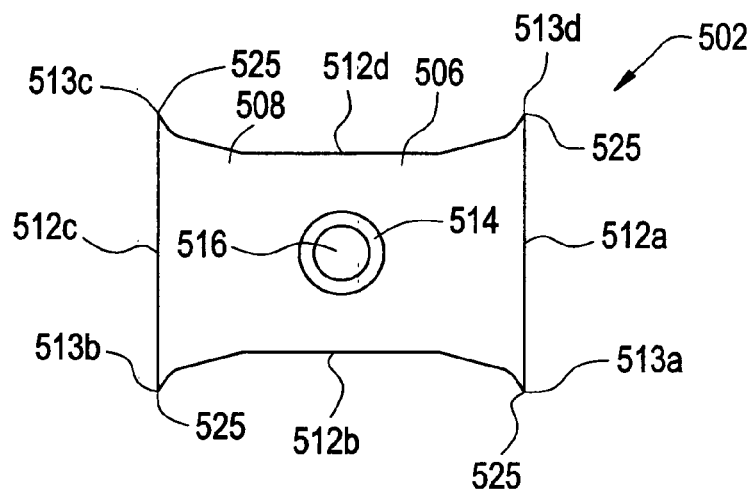
FIG. 25 is a top plan view of the nut of the fifth embodiment of the invention.

The nut 502 is best illustrated in FIGS. 24 and 25 and includes a plate 506 having a generally planar upper surface 508, a generally planar lower surface 510 and four sidewalls 512a, 512b, 512c, 512d which connect the upper and lower surfaces 508, 510. Sidewall 512a is connected to sidewall 512b at edge 513a; sidewall 512b is connected to sidewall 512c at edge 513b; sidewall 512c is connected to sidewall 512d at edge 513c; and sidewall 512d is connected to sidewall 512a at edge 513d. Sidewalls 512a, 512c are opposite one another and are generally planar. Sidewalls 512b, 512d are opposite one another, but extend inwardly toward one another and toward a cylindrical member 514 which extends outwardly from the upper surface 508 of the nut 502, such that the nut 502 appears to have a bow-tie configuration when viewed from above, see FIG. 25.

The cylindrical member 514 is preferably in the form of a right circular cylinder. An aperture 516 extends through the nut member 502 from the plate 506 into the cylindrical member 514. The aperture 516 may be closed at the lower surface 510 of the plate 506 or it may extend all the way through the plate 506. The aperture 516 defines an aperture wall 518 which is preferably threaded and is capable of receiving a bolt or screw (not shown) to be attached thereto.

The nut 502 preferably includes four stand-offs 520 which extend outwardly from the lower surface 510 of the nut 502. Each stand-off 520 extends outwardly from one of the four corners of the lower surface 510 of the nut 502 which are provided at a lower end of the edges 513a, 513b, 513c, 513d. Each stand-off 520 extends generally to a pointed portion 522 thereof. Of course, the stand-offs 520 may take on any form, so long as the stand-offs allow for reduced surface to surface contact between the nut 502 and the cage 504 prior to the torqueing of the nut 502.

The nut 502 preferably includes four stand-offs 521 which extend outwardly from the upper surface 508 of the nut 502. Each stand-off 521 extends outwardly from one of the four corners of the upper surface 508 of the nut 502 which are provided at an upper end of the edges 513a, 513b, 513c, 513d. Each stand-off 521 extends generally to a pointed portion 523 thereof. Of course, the stand-offs 521 may take on any form, so long as the stand-offs allow for reduced surface to surface contact between the nut 502 and the cage 504 prior to the torqueing of the nut 502.

Because the sidewalls 512b, 512d extend inwardly toward one another and toward the cylindrical member 514, the edges 513a, 513b, 513c, 513d act as stand-offs 525 on the nut 502 which allow for reduced surface to surface contact between the nut 502 and the cage 504 prior to the torqueing of the nut 502.

The nut 502 may be formed by cold forming, stamping, or staking a nut member into a plate member. The nut 502 may then be heat treated, if desired, depending on the hardness of the material of the nut 502.

The cage 504 is used for encaging the nut 502. Prior to encaging the nut 502, the cage 504 has generally planar upper and lower surfaces 524, 526. The cage 504 includes a base portion 528 and bendable first and second arm portions 530, 532 extending from opposite ends of the base portion 528. The first and second arm portions 530, 532 are preferably integrally formed with the base portion 528.

An aperture (not shown) is provided through the base portion 528 of the cage 504 and the first and second arm portions 530, 532 have generally semicircular cutouts 534, 536 at their free ends 538, 540.

The cage 504 is preferably formed of material which is softer than the material of the nut 502.

In operation, and as best illustrated in FIGS. 26–30, the nut 502 is positioned on the upper surface 524 of the base portion 528 such that the points 522 of the stand-offs 520 are the only parts of the nut 502 which are in contact with the upper surface 524 of the base portion 528. Thus, a gap 542 is provided between the upper surface 524 of the base portion 528 of the cage 504 and the lower surface 510 of the nut 502.

Figure 26:
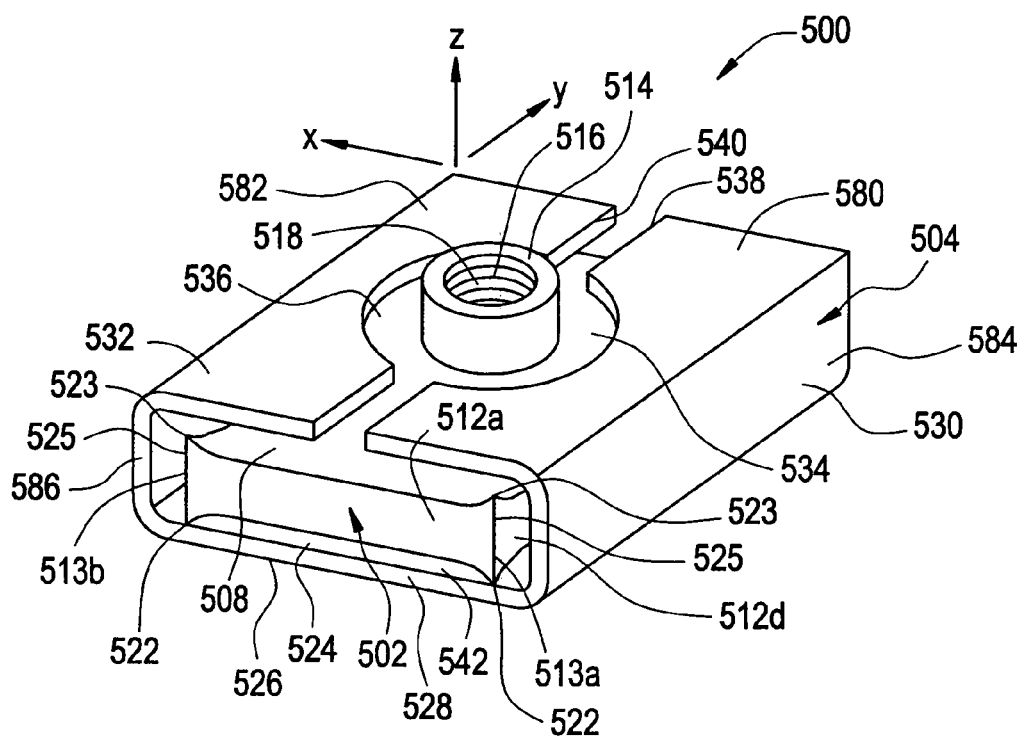
FIG. 26 is a perspective view of a cage nut assembly of the fifth embodiment of the invention.
Figure 27:
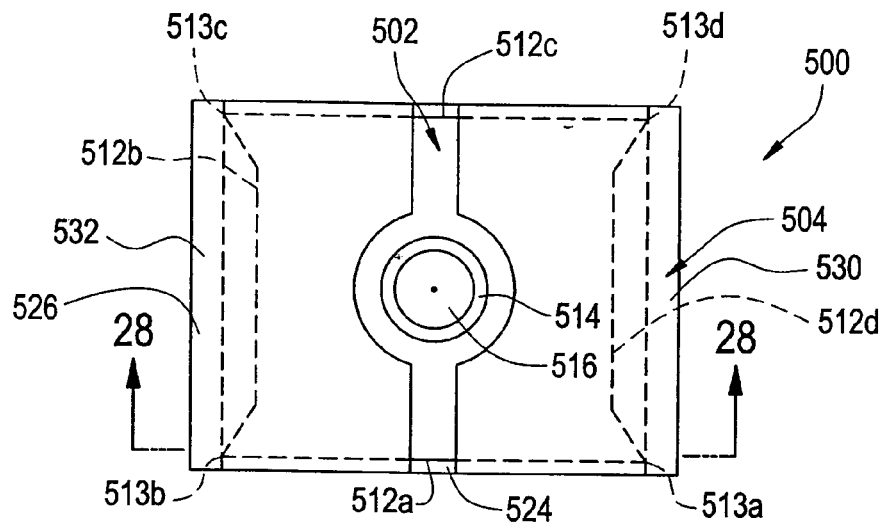
FIG. 27 is a top plan view of the cage nut assembly of the fifth embodiment of the invention.
Figure 28:
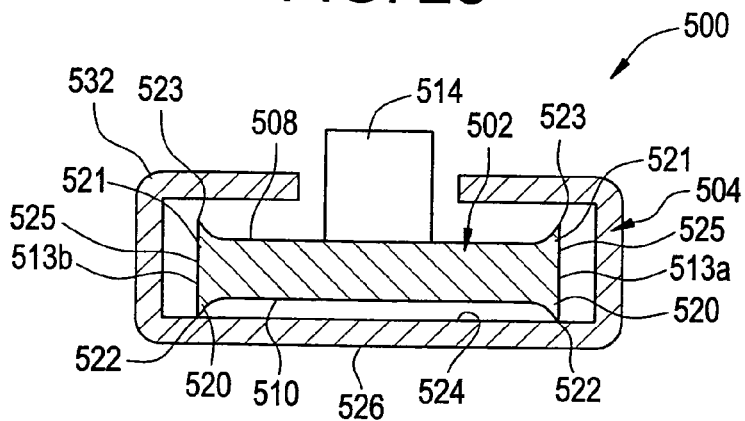
FIG. 28 is a cross-sectional side elevational view of the cage nut assembly of the fifth embodiment of the invention taken along line 28—28 of FIG. 27, prior to the nut being torqued into place and prior to the cage nut assembly going through a bath in the horizontal position.
Figure 29:
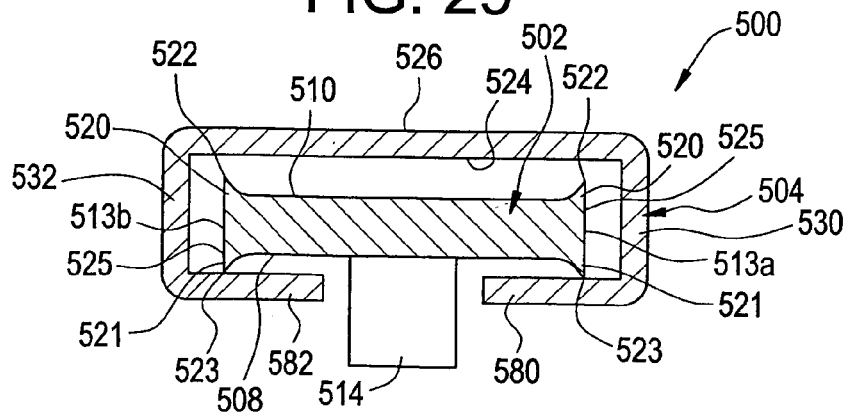
FIG. 29 is a cross-sectional side elevational view of the cage nut assembly of the fifth embodiment of the invention prior to the nut being torqued into place and prior to the cage nut assembly going through a bath in an upside down position.
Figure 30:
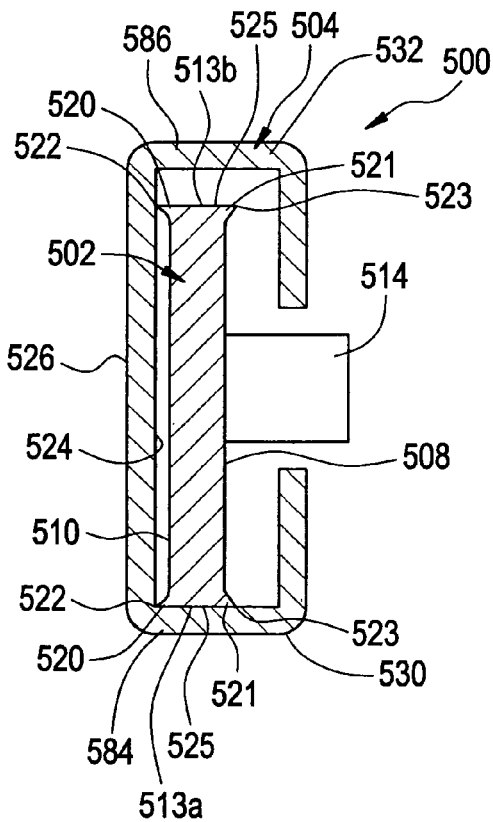
FIG. 30 is a cross-sectional side elevational view of the cage nut assembly of the fifth embodiment of the invention prior to the nut being torqued into place and prior to the cage nut assembly going through a bath in a sideways position.

The arm portion 530 is then bent around the sidewall 512d and above the upper surface 508 of the nut 502, and the arm portion 532 is then bent around the sidewall 512b and above the upper surface 508 of the nut 502. The free ends 538, 540 of the arm portions 530, 532 are typically spaced apart and the semicircular cutouts 534, 536 are in alignment with one another. The aperture provided through the base portion 528 preferably has a diameter which is greater than or equal to a diameter of the semicircular cutouts 534, 536. The cylindrical member 514 of the nut 502 extends through the semicircular cutouts 534, 536. Thus, the cage 504 effectively encages the nut 502 to form the cage nut assembly 500, which is best illustrated in FIGS. 26–30. The cage 504 is sized so that the nut 502 has a limited range of movement in at least one direction, and preferably in three dimensions, for example the "X", "Y" and "Z" axes as illustrated in FIG. 26.

The lower surface 526 of the base portion 528 of the cage 504 is then welded to a mating surface or structural member (not shown), such as an automobile frame. The structural member has an aperture (not shown) therethrough which is in alignment with the aperture provided through the base portion 528 of the cage 504. The aperture of the structural member preferably has a diameter which is greater than or equal to the diameter of the aperture provided through the base portion 528. The structural member and the cage 504 are then typically sent through a bath that is meant to add a corrosion or paint coating to the structural member, such as an e-coat or ELPO bath. When the cage 504 is sent through the bath in a horizontal position, FIG. 28, the stand-offs 520 keep the lower surface 510 of the nut 502 from sitting flat on the upper surface 524 of the base portion 528 of the cage 504, thus reducing the amount of bearing surface interface between the cage 504 and the nut 502, thus reducing the possibility that the cage 504 and the nut 502 will stick or adhere to each other after coating or welding is complete. When the cage 504 is sent through the bath in an upside down position, FIG. 29, the stand-offs 521 keep the upper surface 508 of the nut 502 from sitting flat on the upper surface 524 of the portions 580, 582 of the arm portions 530, 532 which are bent above the upper surface 508 of the nut 502, thus reducing the amount of bearing surface interface between the cage 504 and the nut 502, thus reducing the possibility that the cage 504 and the nut 502 will stick or adhere to each other after coating or welding is complete. When the cage 504 is sent through the bath in a sideways position, FIGS. 27 and 30, the stand-offs 525 keep the sidewalls 512d, 512b from sitting flat on the upper surface 524 of the portions 584, 586 of the arm portions 530, 532 which are bent over the sidewalls 512 of the nut 502, thus reducing the amount of bearing surface interface between the cage 504 and the nut 502, thus reducing the possibility that the cage 504 and the nut 502 will stick or adhere to each other after coating or welding is complete.

The nut 502 is then secured to the cage 504 in generally the same manner as described herein with regard to the nut 102 being secured to the cage 104 in the first embodiment of the invention and as illustrated in FIGS. 5 and 6 and, therefore, will not be described or illustrated herein again for brevity purposes.

Thus, the cage nut assembly 500 effectively reduces the possibility of the nut 502 sticking to the cage 504 when the cage nut assembly 500 is sent through a bath in the horizontal position, an upside down position, or a sideways position.

Attention is now directed to the sixth embodiment of a cage nut assembly 600 of the present invention, which is best illustrated in FIGS. 31–37. The cage nut assembly 600 includes a nut 602 and a cage 604.

Figure 31:
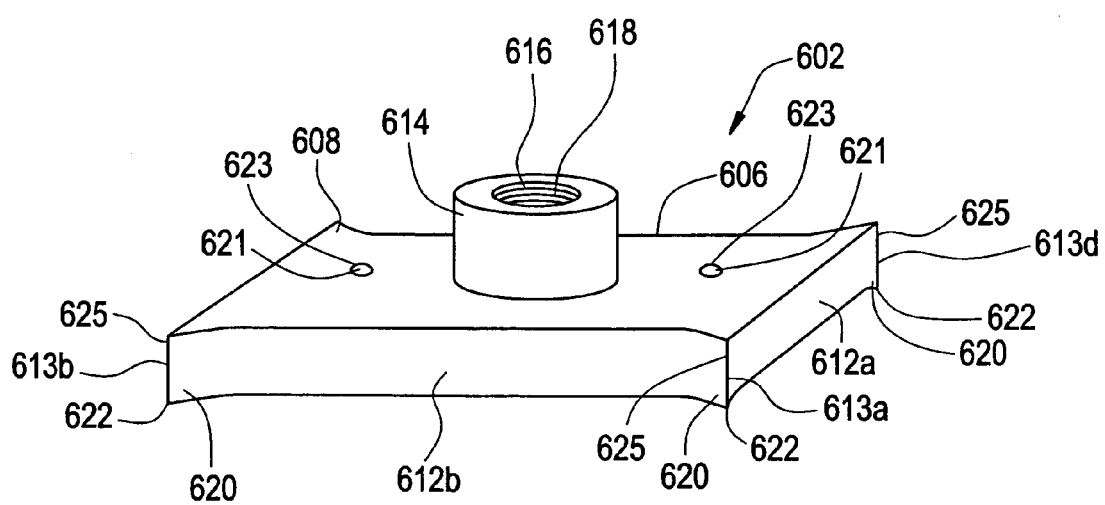
FIG. 31 is a perspective view of a nut of a sixth embodiment of the invention.
Figure 32:
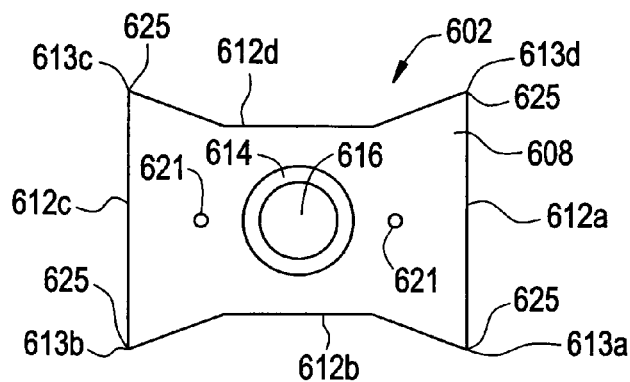
FIG. 32 is a top plan view of the nut of the sixth embodiment of the invention.

The nut 602 is best illustrated in FIGS. 31–32 and includes a plate 606 having a generally planar upper surface 608, a generally planar lower surface 610 and four sidewalls 612a, 612b, 612c, 612d which connect the upper and lower surfaces 608, 610. Sidewall 612a is connected to sidewall 612b at edge 613a; sidewall 612b is connected to sidewall 612c at edge 613b; sidewall 612c is connected to sidewall 612d at edge 613c; and sidewall 612d is connected to sidewall 612a at edge 613d. Sidewalls 612a, 612c are opposite one another and are generally planar. Sidewalls 612b, 612d are opposite one another, but extend inwardly toward one another and toward a cylindrical member 614 which extends outwardly from the upper surface 608 of the nut 602, such that the nut 602 appears to have a bow-tie configuration when viewed from above, see FIG. 32.

The cylindrical member 614 is preferably in the form of a right circular cylinder. An aperture 616 extends through the nut member 602 from the plate 606 into the cylindrical member 614. The aperture 616 may be closed at the lower surface 610 of the plate 606 or it may extend all the way through the plate 606. The aperture 616 defines an aperture wall 618 which is preferably threaded and is capable of receiving a bolt or screw (not shown) to be attached thereto.

The nut 602 preferably includes four stand-offs 620 which extend outwardly from the lower surface 610 of the nut 602. Each stand-off 620 extends outwardly from one of the four corners of the lower surface 610 of the nut 602 which are provided at a lower end of the edges 613a, 613b, 613c, 613d. Each stand-off 620 extends generally to a pointed portion 622 thereof. Of course, the stand-offs 620 may take on any form, so long as the stand-offs allow for reduced surface to surface contact between the nut 602 and the cage 604 prior to the torqueing of the nut 602.

The nut 602 preferably includes stand-offs 621 which extend outwardly from the upper surface 608 of the nut 602. Each stand-off 621 is also preferably in the form of a protrusion in the form of a rounded dimple. Of course, the stand-offs 621 may be in forms other than dimples, such as rounded beads, ribs, or any other type of stand-off structure, so long as the stand-offs allow for reduced surface to surface contact between the nut 602 and the cage 604 prior to the torqueing of the nut 602. The nut 602 should have at least one stand-off 621 on the upper surface 608, preferably two stand-offs 621 on the upper surface 608, and possibly more than two stand-offs 621 on the upper surface 608, depending on the desired construction and operation of the cage nut assembly 600.

Because the sidewalls 612b, 612d extend inwardly toward one another and toward the cylindrical member 614, the edges 613a, 613b, 613c, 613d act as stand-offs 625 on the nut 602 which allow for reduced surface to surface contact between the nut 602 and the cage 604 prior to the torqueing of the nut 602.

The nut 602 may be formed by cold forming, stamping, or staking a nut member into a plate member. The nut 602 may then be heat treated, if desired, depending on the hardness of the material of the nut 602.

The cage 604 is used for encaging the nut 602. Prior to encaging the nut 602, the cage 604 has generally planar upper and lower surfaces 624, 626. The cage 604 includes a base portion 628 and bendable first and second arm portions 630, 632 extending from opposite ends of the base portion 628. The first and second arm portions 630, 632 are preferably integrally formed with the base portion 628.

An aperture (not shown) is provided through the base portion 628 of the cage 604 and the first and second arm portions 630, 632 have generally semicircular cutouts 634, 636 at their free ends 638, 640.

The cage 604 is preferably formed of material which is softer than the material of the nut 602.

In operation, and as best illustrated in FIGS. 33–37, the nut 602 is positioned on the upper surface 624 of the base portion 628 such that the points 622 of the stand-offs 620 are the only parts of the nut 602 which are in contact with the upper surface 624 of the base portion 628. Thus, a gap 642 is provided between the upper surface 624 of the base portion 628 of the cage 604 and the lower surface 610 of the nut 602.

Figure 33:
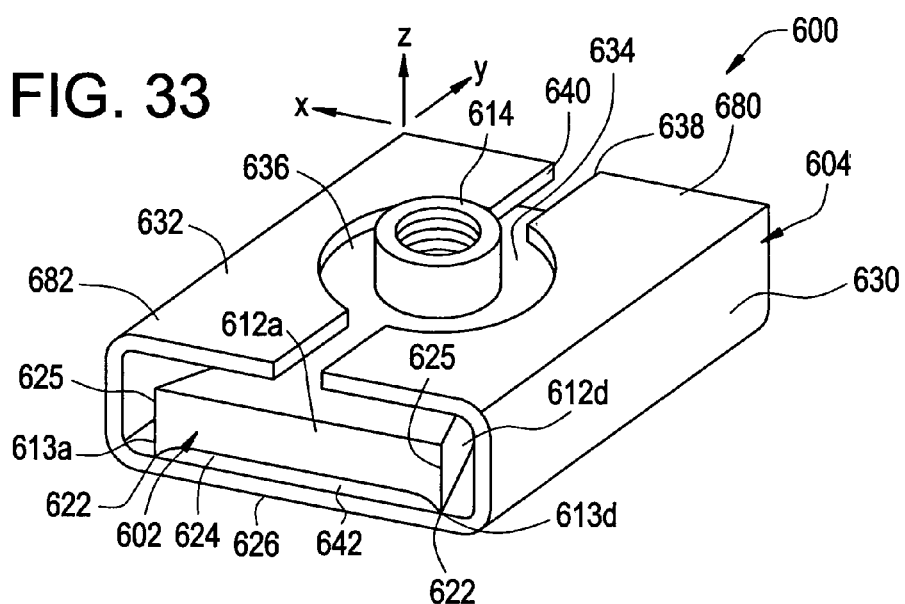
FIG. 33 is a perspective view of a cage nut assembly of the sixth embodiment of the invention.
Figure 34:
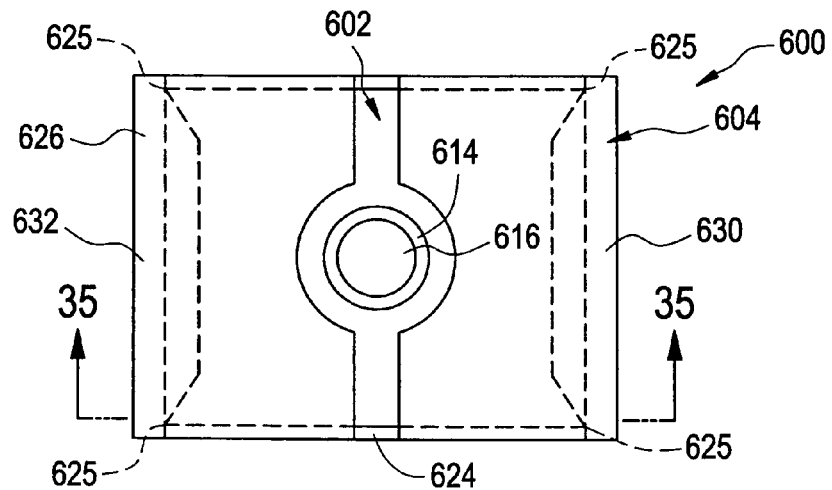
FIG. 34 is a top plan view of the cage nut assembly of the sixth embodiment of the invention.
Figure 35:
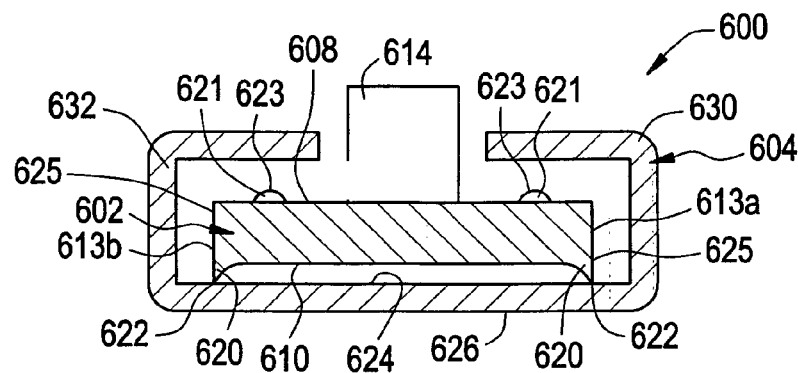
FIG. 35 is a cross-sectional side elevational view of the cage nut assembly of the sixth embodiment of the invention taken along line 35—35 of FIG. 34, prior to the nut being torqued into place and prior to the cage nut assembly going through a bath in the horizontal position.
Figure 36:
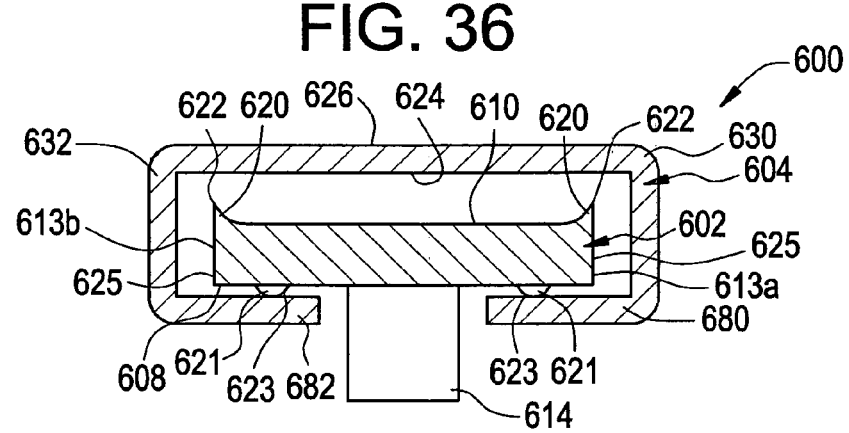
FIG. 36 is a cross-sectional side elevational view of the cage nut assembly of the sixth embodiment of the invention prior to the nut being torqued into place and prior to the cage nut assembly going through a bath in an upside down position.
Figure 37:
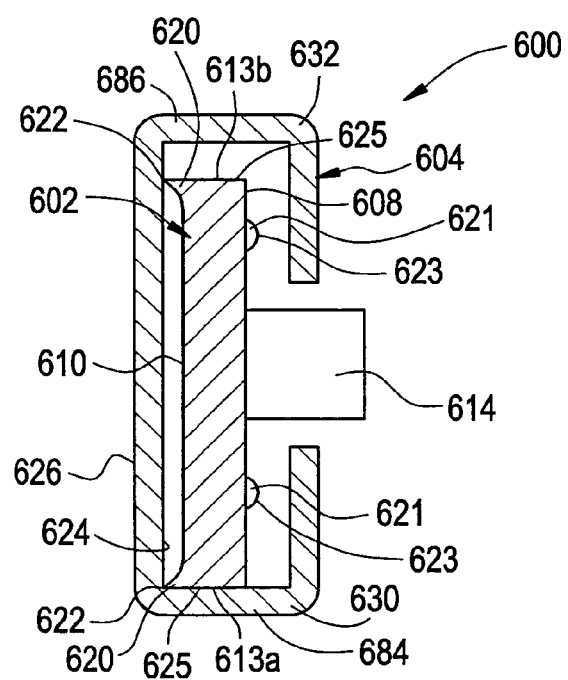
FIG. 37 is a cross-sectional side elevational view of the cage nut assembly of the sixth embodiment of the invention prior to the nut being torqued into place and prior to the cage nut assembly going through a bath in a sideways position.

The arm portion 630 is then bent around the sidewall 612d and above the upper surface 608 of the nut 602, and the arm portion 632 is then bent around the sidewall 612b and above the upper surface 608 of the nut 602. The free ends 638, 640 of the arm portions 630, 632 are typically spaced apart and the semicircular cutouts 634, 636 are in alignment with one another. The aperture provided through the base portion 628 preferably has a diameter which is greater than or equal to a diameter of the semicircular cutouts 634, 636. The cylindrical member 614 of the nut 602 extends through the semicircular cutouts 634, 636. Thus, the cage 604 effectively encages the nut 602 to form the cage nut assembly 600, which is best illustrated in FIGS. 33–37. The cage 604 is sized so that the nut 602 has a limited range of movement in at least one direction, and preferably in three dimensions, for example the "X", "Y" and "Z" axes as illustrated in FIG. 33.

The lower surface 626 of the base portion 628 of the cage 604 is then welded to a mating surface or structural member (not shown), such as an automobile frame. The structural member has an aperture (not shown) therethrough which is in alignment with the aperture provided through the base portion 628 of the cage 604. The aperture of the structural member preferably has a diameter which is greater than or equal to the diameter of the aperture provided through the base portion 628. The structural member and the cage 604 are then typically sent through a bath that is meant to add a corrosion or paint coating to the structural member, such as an e-coat or ELPO bath. When the cage 604 is sent through the bath in a horizontal position, FIG. 35, the stand-offs 620 keep the lower surface 610 of the nut 602 from sitting flat on the upper surface 624 of the base portion 628 of the cage 604, thus reducing the amount of bearing surface interface between the cage 604 and the nut 602, thus reducing the possibility that the cage 604 and the nut 602 will stick or adhere to each other after coating or welding is complete. When the cage 604 is sent through the bath in an upside down position, FIG. 36, the stand-offs 621 keep the upper surface 608 of the nut 602 from sitting flat on the upper surface 624 of the portions 680, 682 of the arm portions 630, 632 which are bent above the upper surface 608 of the nut 602, thus reducing the amount of bearing surface interface between the cage 604 and the nut 602, thus reducing the possibility that the cage 604 and the nut 602 will stick or adhere to each other after coating or welding is complete. When the cage 604 is sent through the bath in a sideways position, FIGS. 34 and 37, the stand-offs 625 keep the sidewalls 612d, 612b from sitting flat on the upper surface 624 of the portions 684, 686 of the arm portions 630, 632 which are bent over the sidewalls 612 of the nut 602, thus reducing the amount of bearing surface interface between the cage 604 and the nut 602, thus reducing the possibility that the cage 604 and the nut 602 will stick or adhere to each other after coating or welding is complete.

The nut 602 is then secured to the cage 604 in generally the same manner as described herein with regard to the nut 102 being secured to the cage 104 in the first embodiment of the invention and as illustrated in FIGS. 5 and 6 and, therefore, will not be described or illustrated herein again for brevity purposes.

Thus, the cage nut assembly 600 effectively reduces the possibility of the nut 602 sticking to the cage 604 when the cage nut assembly 600 is sent through a bath in the horizontal position, an upside down position, or a sideways position.

Attention is now directed to the seventh embodiment of a cage nut assembly 700 of the present invention, which is best illustrated in FIGS. 38–43. The cage nut assembly 700 includes a nut 702 and a cage 704.

Figure 38:
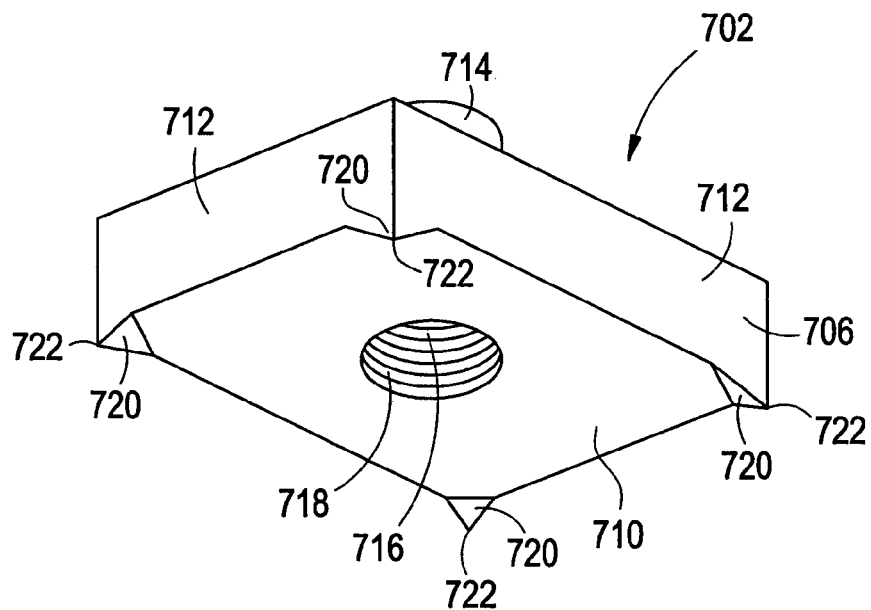
FIG. 38 is a perspective view of a nut of a seventh embodiment of the invention.

The nut 702 is best illustrated in FIG. 38 and includes a rectangular plate 706 having a generally planar upper surface 708, a generally planar lower surface 710 and sidewalls 712 which connect the upper and lower surfaces 708, 710. The nut 702 also includes a cylindrical member 714 which extends outwardly from the upper surface 708 of the nut 702. The cylindrical member 714 is preferably in the form of a right circular cylinder. An aperture 716 extends through the nut member 702 from the plate 706 into the cylindrical member 714. The aperture 716 may be closed at the lower surface 710 of the plate 706 or it may extend all the way through the plate 706. The aperture 716 defines an aperture wall 718 which is preferably threaded and is capable of receiving a bolt or screw (not shown) to be attached thereto.

The nut 702 also preferably includes four stand-offs 720 which extend outwardly from the lower surface 710 of the nut 702. Each stand-off 720 extends outwardly from one of the four corners of the lower surface 710 of the nut 702. Each stand-off 720 is also preferably in the form of a protrusion in the form of a tetrahedron such that each of the stand-offs 720 extends generally to a pointed portion 722 thereof. Of course, the stand-offs 720 may be in forms other than of a tetrahedron, such as dimples, ribs, or any other type of stand-off structure, so long as the stand-offs allow for reduced surface to surface contact between the nut 702 and the cage 704 prior to the torqueing of the nut 702.

The nut 702 may be formed by cold forming, stamping, or staking a nut member into a plate member. The nut 702 may then be heat treated, if desired, depending on the hardness of the material of the nut 702.

The cage 704 is used for encaging the nut 702. Prior to encaging the nut 702, the cage 704 has generally planar upper and lower surfaces 724, 726. The cage 704 includes a base portion 728 and bendable first and second arm portions 730, 732 extending from opposite ends of the base portion 728. The first and second arm portions 730, 732 are preferably integrally formed with the base portion 728. The first arm portion 730 has a portion 780 and a portion 784. The second arm portion 732 has a portion 782 and a portion 786.

The cage 704 preferably includes stand-offs 721 which extend outwardly from the upper surface 724 of the portions 780, 782 of the first and second arm portions 730, 732, respectively, of the cage 704. Each stand-off 721 is also preferably in the form of a protrusion in the form of a rounded dimple. Of course, the stand-offs 721 may be in forms other than dimples, such as rounded beads, ribs, or any other type of stand-off structure, so long as the stand-offs allow for reduced surface to surface contact between the nut 702 and the cage 704 prior to the torqueing of the nut 702.

The cage 704 preferably includes stand-offs 725 which extend outwardly from the upper surface 724 of the portions 784, 786 of the first and second arm portions 730, 732, respectively, of the cage 704. Each stand-off 725 is also preferably in the form of a protrusion in the form of a rounded dimple. Of course, the stand-offs 725 may be in forms other than dimples, such as rounded beads, ribs, or any other type of stand-off structure, so long as the stand-offs allow for reduced surface to surface contact between the nut 702 and the cage 704 prior to the torqueing of the nut 702.

An aperture (not shown) is provided through the base portion 728 of the cage 704 and the first and second arm portions 730, 732 have generally semicircular cutouts 734, 736 at their free ends 738, 740.

The cage 704 is formed of a material which is softer than the material of the nut 702.

In operation, and as best illustrated in FIGS. 39–43, the nut 702 is positioned on the upper surface 724 of the base portion 728 such that the points 722 of the stand-offs 720 are the only parts of the nut 702 which are in contact with the upper surface 724 of the base portion 728. Thus, a gap 742 is provided between the upper surface 724 of the base portion 728 of the cage 704 and the lower surface 710 of the nut 702.

Figure 39:
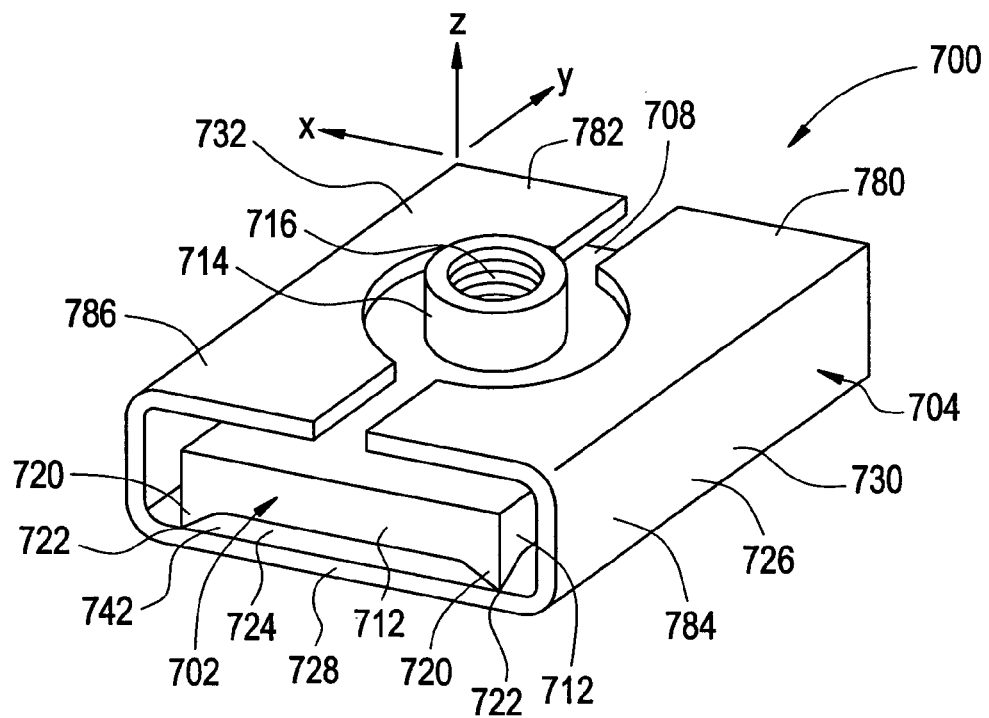
FIG. 39 is a perspective view of a cage nut assembly of the seventh embodiment of the invention.
Figure 40:
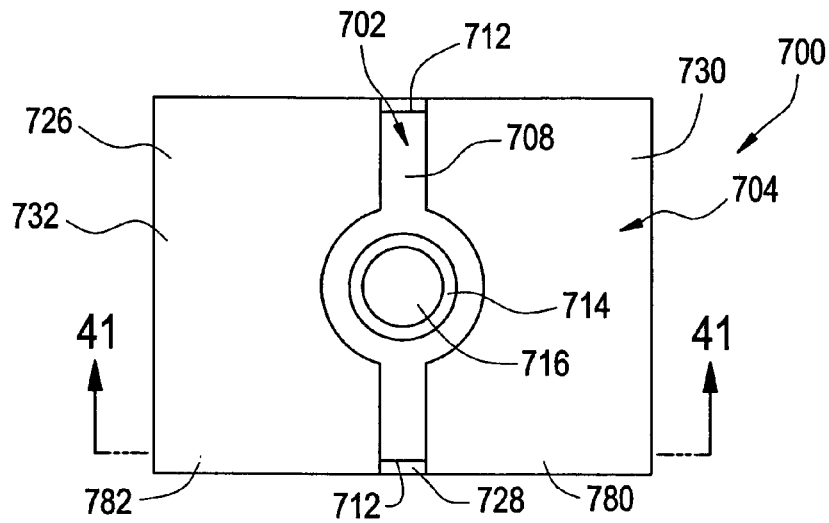
FIG. 40 is a top plan view of the cage nut assembly of the seventh embodiment of the invention.
Figure 41:
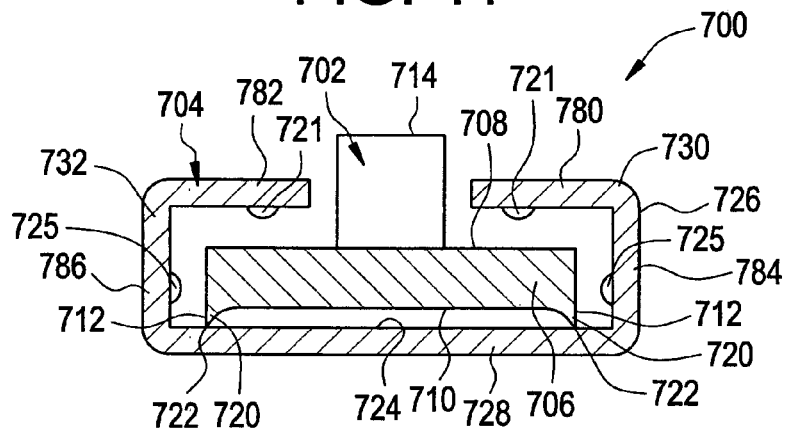
FIG. 41 is a cross-sectional side elevational view of the cage nut assembly of the seventh embodiment of the invention taken along line 41—41 of FIG. 40, prior to the nut being torqued into place and prior to the cage nut assembly going through a bath in horizontal position.
Figure 42:
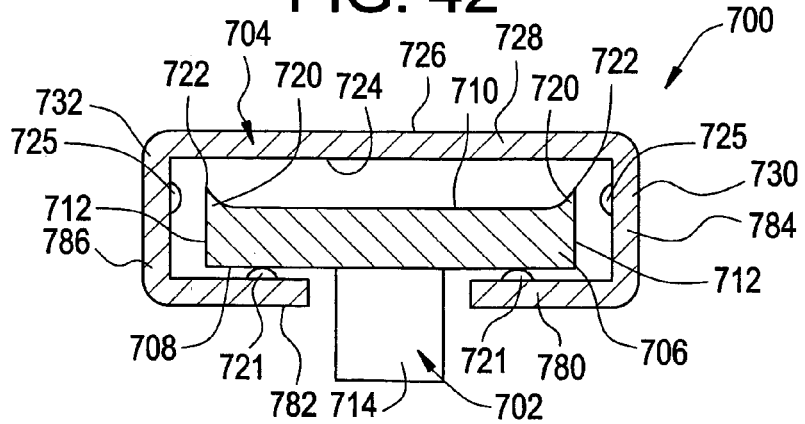
FIG. 42 is a cross-sectional side elevational view of the cage nut assembly of the seventh embodiment of the invention prior to the nut being torqued into place and prior to the cage nut assembly going through a bath in an upside down position.
Figure 43:
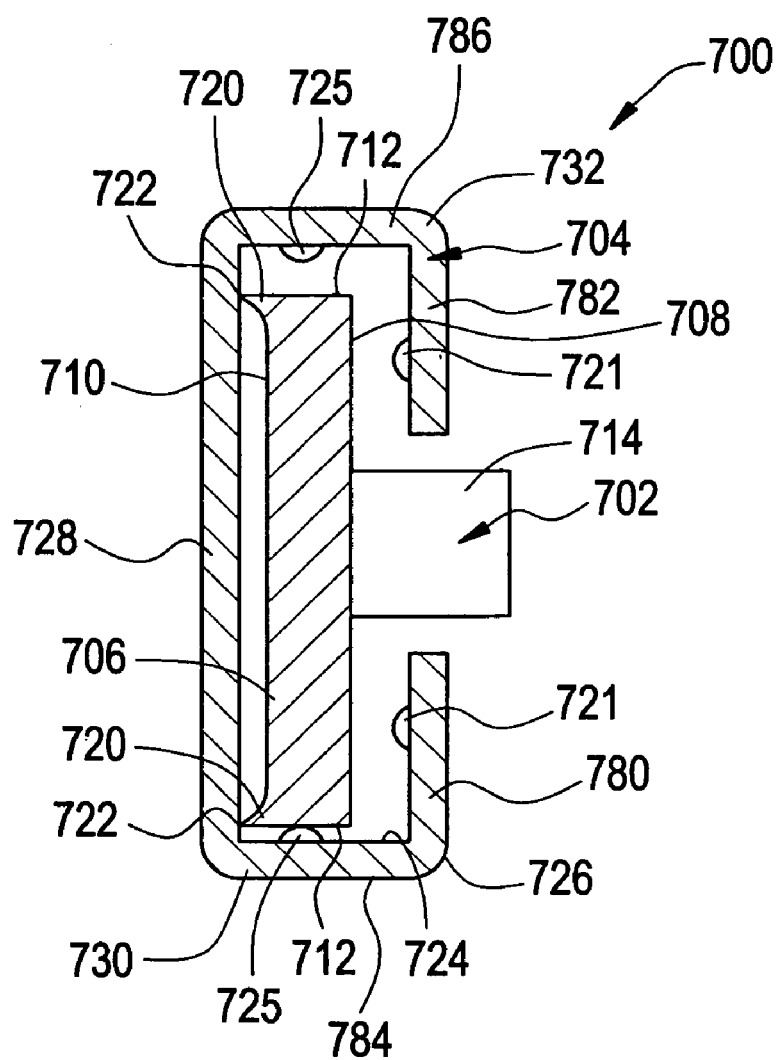
FIG. 43 is a cross-sectional side elevational view of the cage nut assembly of the seventh embodiment of the invention prior to the nut being torqued into place and prior to the cage nut assembly going through a bath in a sideways position.

Each portion 784, 786 of the arm portions 730, 732 is then bent around one of the sidewalls 712 of the nut 702 and each portion 780, 782 of the arm portions 730, 732 is then bent above the upper surface 708 of the nut 702. The free ends 738, 740 of the arm portions 730, 732 are typically spaced apart and the semicircular cutouts 734, 736 are in alignment with one another. The aperture provided through the base portion 728 has a diameter which is greater than or equal to a diameter of the semicircular cutouts 734, 736. The cylindrical member 714 of the nut 702 extends through the semicircular cutouts 734, 736. Thus, the cage 704 effectively encages the nut 702 to form the cage nut assembly 700, which is best illustrated in FIGS. 39–43. The cage 704 is sized so that the nut 702 has a limited range of movement in at least one dimension, and preferably in three dimension, for example the "X", "Y" and "Z" axes as illustrated in FIG. 39.

The lower surface 726 of the base portion 728 of the cage 704 is then welded to a mating surface or structural member (not shown), such as an automobile frame. The structural member has an aperture (not shown) therethrough which is in alignment with the aperture provided through the base portion 728 of the cage 704. The aperture of the structural member preferably has a diameter which is greater than or equal to the diameter of the aperture provided through the base portion 728 of the cage 704. The structural member and the cage 704 are then typically sent through a bath that is meant to add a corrosion or paint coating to the structural member, such as an e-coat or ELPO bath. When the cage 704 is sent through the bath in a horizontal position, FIG. 41, the stand-offs 720 keep the lower surface 710 of the nut 702 from sitting flat on the upper surface 724 of the base portion 728 of the cage 704, thus reducing the amount of bearing surface interface between the cage 704 and the nut 702, thus reducing the possibility that the cage 704 and the nut 702 will stick or adhere to each other after coating or welding is complete. When the cage 704 is sent through the bath in an upside down position, FIG. 42, the stand-offs 721 keep the upper surface 708 of the nut 702 from sitting flat on the upper surface 724 of the portions 780, 782 of the arm portions 730, 732 which are bent over the upper surface 708 of the nut 702, thus reducing the amount of bearing surface interface between the cage 704 and the nut 702, thus reducing the possibility that the cage 704 and the nut 702 will stick or adhere to each other after coating or welding is complete. When the cage 704 is sent through the bath in a sideways position, FIG. 43, the stand-offs 725 keep the sidewalls 712 of the nut 702 from sitting flat on the upper surface 724 of the portions 784, 786 of the arm portions 730, 732 which are bent over the sidewalls 712 of the nut 702, thus reducing the amount of bearing surface interface between the cage 704 and the nut 702, thus reducing the possibility that the cage 704 and the nut 702 will stick or adhere to each other after coating or welding is complete.

The nut 702 is then secured to the cage 704 in generally the same manner as described herein with regard to the nut 102 being secured to the cage 104 in the first embodiment of the invention and as illustrated in FIGS. 5 and 6 and, therefore, will not be described or illustrated herein again for brevity purposes.

Thus, the cage nut assembly 700 effectively reduces the possibility of the nut 702 sticking to the cage 704 when the cage nut assembly 700 is sent through a bath in a horizontal position, an upside down position, or a sideways position.

Attention is now directed to the eighth embodiment of a cage nut assembly 800 of the present invention, which is best illustrated in FIGS. 44–49. The cage nut assembly 800 includes a nut 802 and a cage 804.

Figure 44:
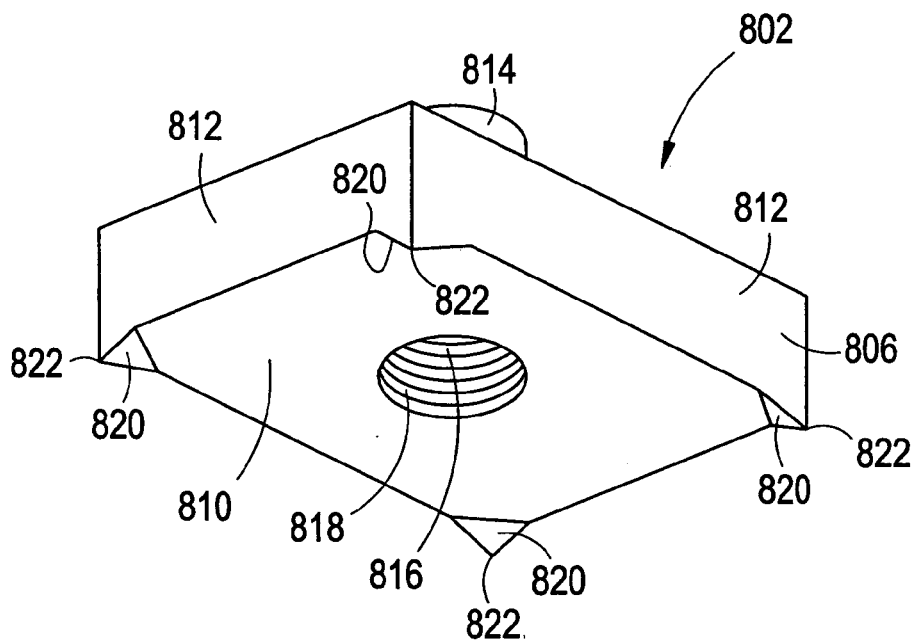
FIG. 44 is a perspective view of a nut of an eighth embodiment of the invention.

The nut 802 is best illustrated in FIG. 44 and includes a rectangular plate 806 having a generally planar upper surface 808, a generally planar lower surface 810 and sidewalls 812 which connect the upper and lower surfaces 808, 810. The nut 802 also includes a cylindrical member 814 which extends outwardly from the upper surface 808 of the nut 802. The cylindrical member 814 is preferably in the form of a right circular cylinder. An aperture 816 extends through the nut member 802 from the plate 806 into the cylindrical member 814. The aperture 816 may be closed at the lower surface 810 of the plate 806 or it may extend all the way through the plate 806. The aperture 816 defines an aperture wall 818 which is preferably threaded and is capable of receiving a bolt or screw (not shown) to be attached thereto.

The nut 802 also preferably includes four stand-offs 820 which extend outwardly from the lower surface 810 of the nut 802. Each stand-off 820 extends outwardly from one of the four corners of the lower surface 810 of the nut 802. Each stand-off 820 is also preferably in the form of a protrusion in the form of a tetrahedron such that each of the stand-offs 820 extends generally to a pointed portion 822 thereof. Of course, the stand-offs 820 may be in forms other than of a tetrahedron, such as dimples, ribs, or any other type of stand-off structure, so long as the stand-offs allow for reduced surface to surface contact between the nut 802 and the cage 804 prior to the torqueing of the nut 802.

The nut 802 may be formed by cold forming, stamping, or staking a nut member into a plate member. The nut 802 may then be heat treated, if desired, depending on the hardness of the material of the nut 802.

Figure 45:
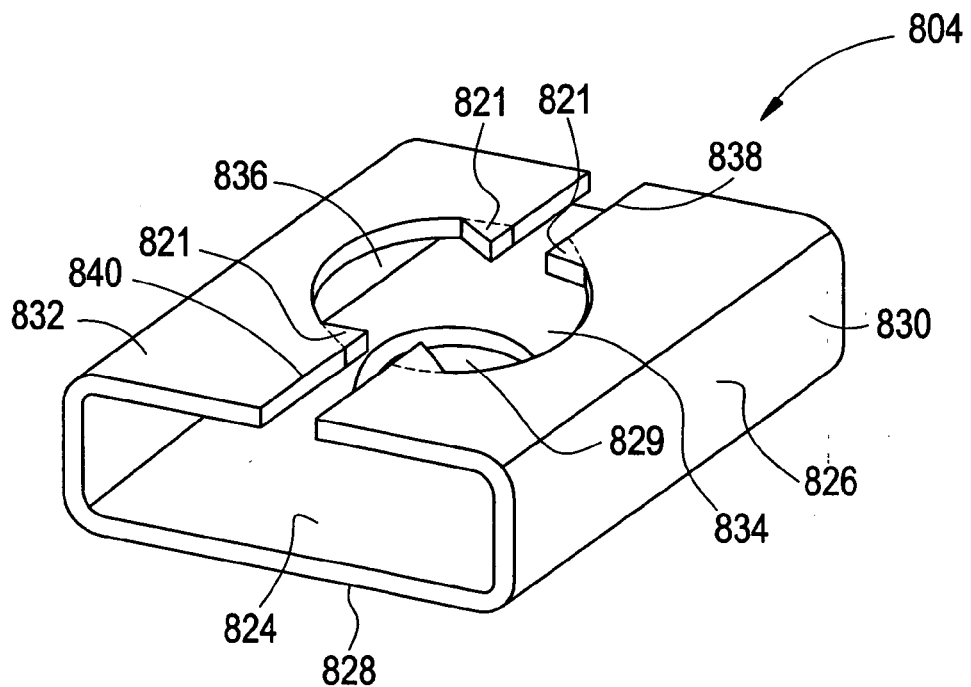
FIG. 45 is a perspective view of a cage of the eighth embodiment of the invention.

The cage 804 is best illustrated in FIG. 45 and is used for encaging the nut 802. Prior to encaging the nut 802, the cage 804 has generally planar upper and lower surfaces 824, 826. The cage 804 includes a base portion 828 and bendable first and second arm portions 830, 832 extending from opposite ends of the base portion 828. The first and second arm portions 830, 832 are preferably integrally formed with the base portion 828. The first arm portion 830 has a portion 880 and a portion 884. The second arm portion 832 has a portion 882 and a portion 886.

An aperture 829 is provided through the base portion 828 of the cage 804 and the first and second arm portions 830, 832 have generally semicircular cutouts 834, 836 at their free ends 838, 840.

The cage 804 preferably includes stand-offs 821 which extend outwardly from the upper surface 824 of the portions 880, 882 of the first and second arm portions 830, 832, respectively, of the cage 804. The stand-offs 821 are preferably in the form of bendable tab members. The stand-offs 821 are provided at the free ends 838, 840 of the first and second arm portions 830, 832 where the generally semicircular cutouts 834, 836 are provided. The cage 804 preferably has four stand-offs 821 with two being provided at free end 838 on either side of semicircular cutout 834, and with two being provided at free end 840 on either side of semicircular cutout 836. Of course, the stand-offs 821 may be triangular, square, rounded, or otherwise, so long as when the stand-offs 821 are bent they allow for reduced surface to surface contact between the nut 802 and the cage 804 prior to the torqueing of the nut 802. Of course, it is to be further understood that any number of stand-offs 821 may be provided than the four which are preferably provided, for instance two stand-offs 821 could be provided, one of which is provided on free end 838 of the first arm portion 830 and one of which is provided on free end 840 of the second arm portion 832.

The cage 804 is formed of a material which is softer than the material of the nut 802.

In operation, and as best illustrated in FIGS. 46–49, the nut 802 is positioned on the upper surface 824 of the base portion 828 such that the points 822 of the stand-offs 820 are the only parts of the nut 802 which are in contact with the upper surface 824 of the base portion 828. Thus, a gap 842 is provided between the upper surface 824 of the base portion 828 of the cage 804 and the lower surface 810 of the nut 802.

Figure 46:
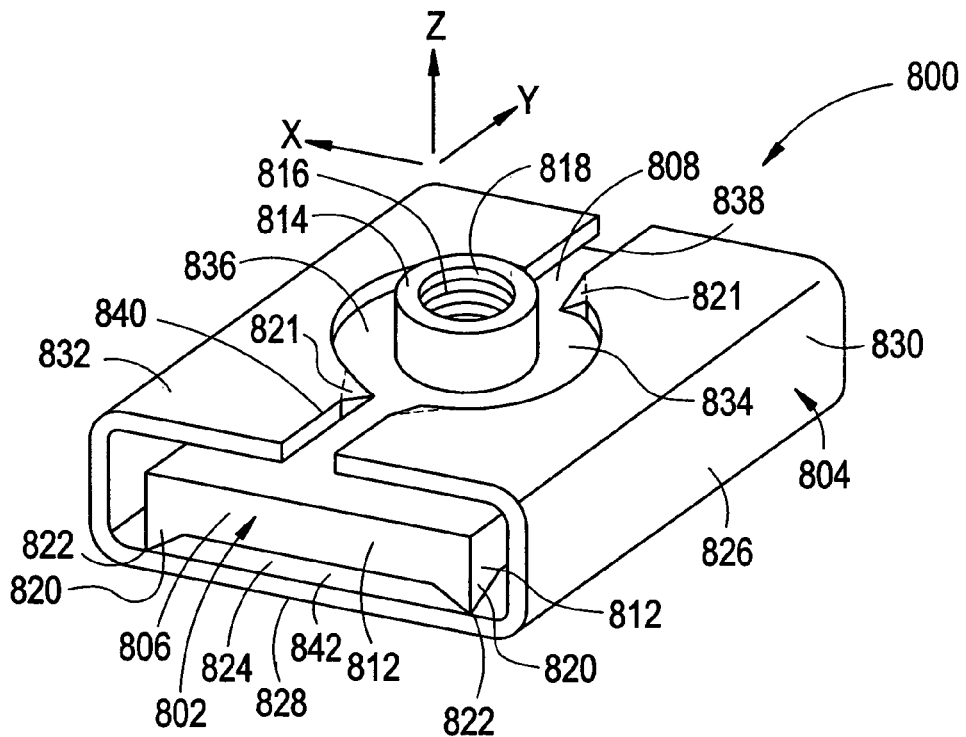
FIG. 46 is a perspective view of a cage nut assembly of the eighth embodiment of the invention.
Figure 47:
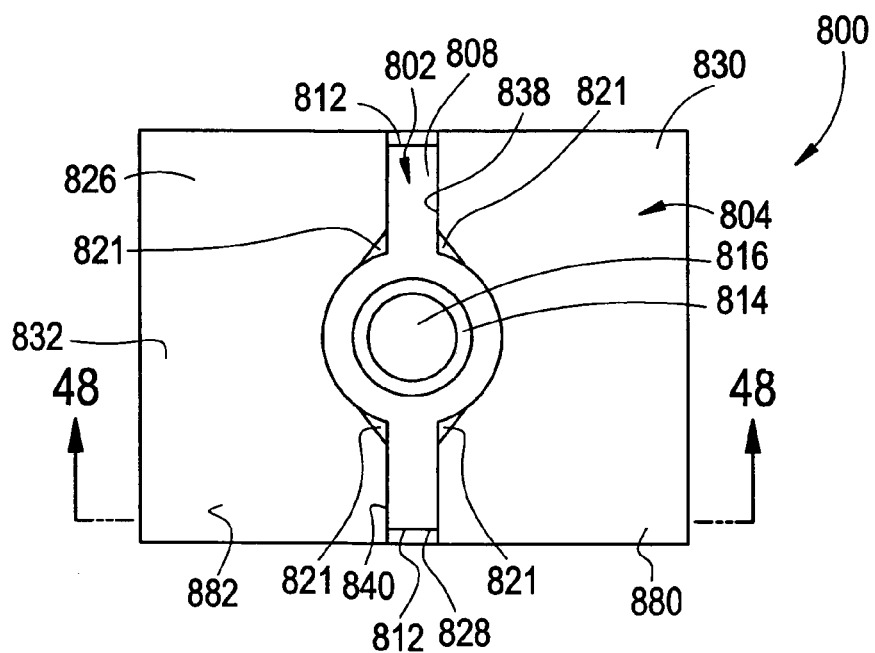
FIG. 47 is a top plan view of the cage nut assembly of the eighth embodiment of the invention.
Figure 48:
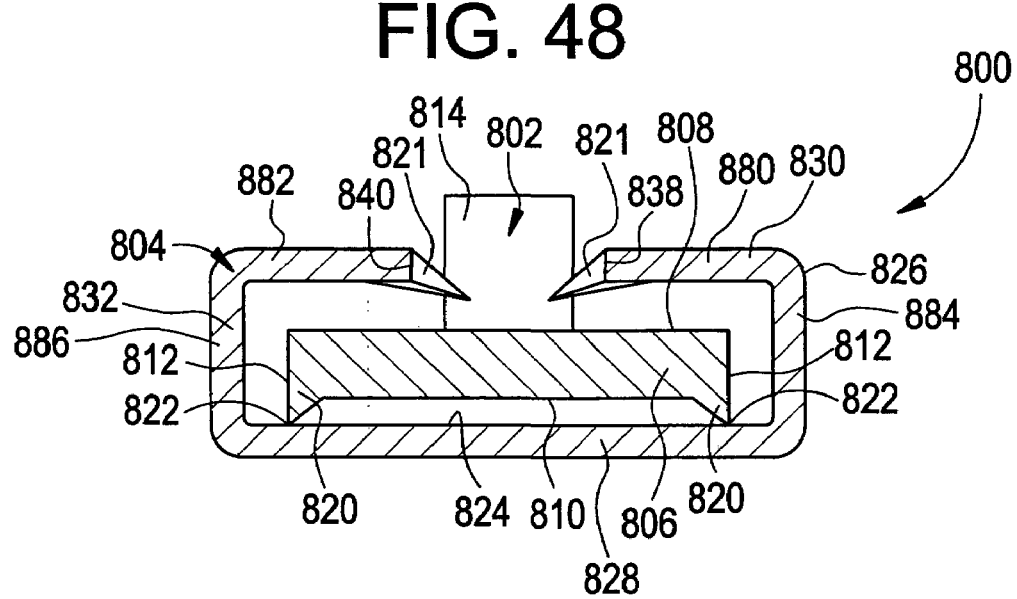
FIG. 48 is a cross-sectional side elevational view of the cage nut assembly of the eighth embodiment of the invention taken along line 48—48 of FIG. 47, prior to the nut being torqued into place and prior to the cage nut assembly going through a bath in a horizontal position.
Figure 49:
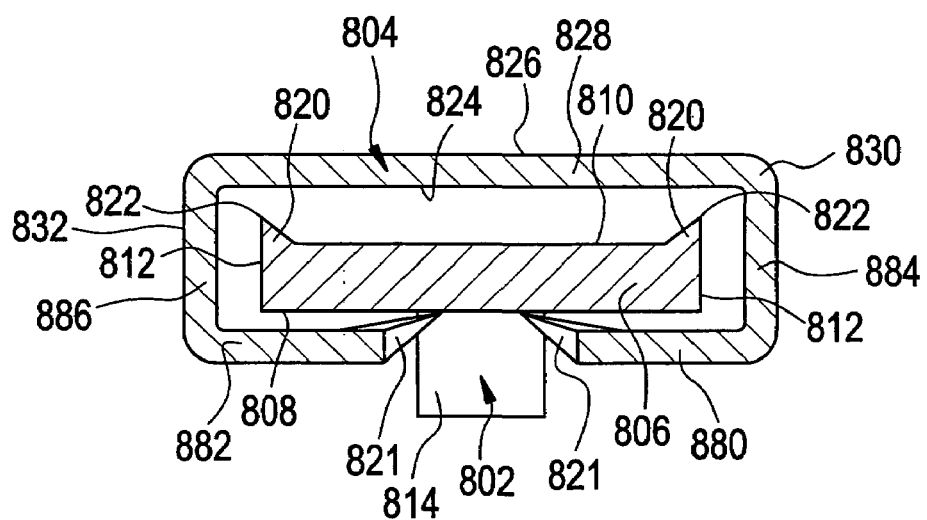
FIG. 49 is a cross-sectional side elevational view of the cage nut assembly of the eighth embodiment of the invention prior to the nut being torqued into place and prior to the cage nut assembly going through a bath in an upside down position.

Each portion 884, 886 of the arm portions 830, 832 is then bent around one of the sidewalls 812 of the nut 802 and each portion 880, 882 of the arm portions 830, 832 is then bent above the upper surface 808 of the nut 802. The free ends 838, 840 of the arm portions 830, 832 are typically spaced apart and the semicircular cutouts 834, 836 are in alignment with one another. The stand-offs 821 are bent down such that they are closer to the upper surface 808 of the nut member 802 than are the portions 880, 892 of the first and second arm portions 830, 832 of the cage member 804. The aperture provided through the base portion 828 preferably has a diameter which is greater than or equal to a diameter of the semicircular cutouts 834, 836. The cylindrical member 814 of the nut 802 extends through the semicircular cutouts 834, 836. Thus, the cage 804 effectively encages the nut 802 to form the cage nut assembly 800, which is best illustrated in FIGS. 46–49. The cage 804 is sized so that the nut 802 has a limited range of movement in at least one dimension or direction, and preferably in three dimensions, for example the "X", "Y" and "Z" axes as illustrated in FIG. 46.

The lower surface 826 of the base portion 828 of the cage 804 is then welded to a mating surface or structural member (not shown), such as an automobile frame. The structural member has an aperture (not shown) therethrough which is in alignment with the aperture provided through the base portion 828 of the cage 804. The aperture of the structural member preferably has a diameter which is greater than or equal to the diameter of the aperture provided through the base portion 828 of the cage 804. The structural member and the cage 804 are then typically sent through a bath that is meant to add a corrosion or paint coating to the structural member, such as an e-coat or ELPO bath. When the cage 804 is sent through the bath in a horizontal position, FIG. 48, the stand-offs 820 keep the lower surface 810 of the nut 802 from sitting flat on the upper surface 824 of the base portion 828 of the cage 804, thus reducing the amount of bearing surface interface between the cage 804 and the nut 802, thus reducing the possibility that the cage 804 and the nut 802 will stick or adhere to each other after coating or welding is complete. When the cage 804 is sent through the bath in an upside down position, FIG. 49, the stand-offs 821 keep the upper surface 808 of the nut 802 from sitting flat on the upper surface 824 of the portions 880, 882 of the arm portions 830, 832 which are bent over the upper surface 808 of the nut 802, thus reducing the amount of bearing surface interface between the cage 804 and the nut 802, thus reducing the possibility that the cage 804 and the nut 802 will stick or adhere to each other after coating or welding is complete.

The nut 802 is then secured to the cage 804 in generally the same manner as described herein with regard to the nut 102 being secured to the cage 104 in the first embodiment of the invention and as illustrated in FIGS. 5 and 6 and, therefore, will not be described or illustrated herein again for brevity purposes.

Thus, the cage nut assembly 800 effectively reduces the possibility of the nut 802 sticking to the cage 804 when the cage nut assembly 800 is sent through a bath in a horizontal position or an upside down position.

Attention is now directed to the ninth embodiment of a cage nut assembly 900 of the present invention, which is best illustrated in FIGS. 50–55. The cage nut assembly 900 includes a nut 902 and a cage 904.

Figure 50:
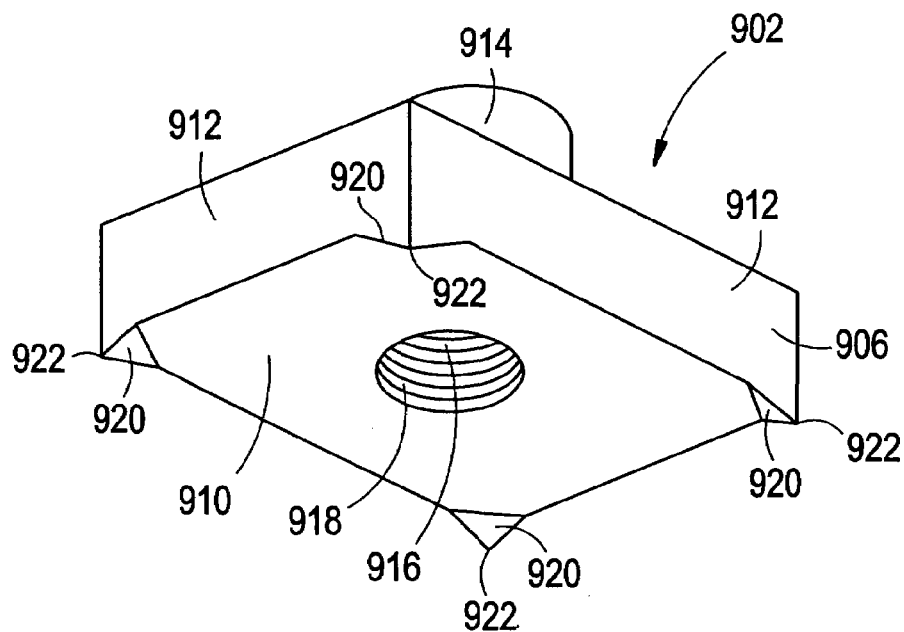
FIG. 50 is a perspective view of a nut of a ninth embodiment of the invention.

The nut 902 is best illustrated in FIG. 50 and includes a rectangular plate 906 having a generally planar upper surface 908, a generally planar lower surface 910 and sidewalls 912 which connect the upper and lower surfaces 908, 910. The nut 902 also includes a cylindrical member 914 which extends outwardly from the upper surface 908 of the nut 902. The cylindrical member 914 is preferably in the form of a right circular cylinder. An aperture 916 extends through the nut member 902 from the plate 906 into the cylindrical member 914. The aperture 916 may be closed at the lower surface 910 of the plate 906 or it may extend all the way through the plate 906. The aperture 916 defines an aperture wall 918 which is preferably threaded and is capable of receiving a bolt or screw (not shown) to be attached thereto.

The nut 902 also preferably includes four stand-offs 920 which extend outwardly from the lower surface 910 of the nut 902. Each stand-off 920 extends outwardly from one of the four corners of the lower surface 910 of the nut 902. Each stand-off 920 is also preferably in the form of a protrusion in the form of a tetrahedron such that each of the stand-offs 920 extends generally to a pointed portion 922 thereof. Of course, the stand-offs 920 may be in forms other than of a tetrahedron, such as dimples, ribs, or any other type of stand-off structure, so long as the stand-offs allow for reduced surface to surface contact between the nut 902 and the cage 904 prior to the torqueing of the nut 902.

The nut 902 may be formed by cold forming, stamping, or staking a nut member into a plate member. The nut 902 may then be heat treated, if desired, depending on the hardness of the material of the nut 902.

The cage 904 is used for encaging the nut 902. Prior to encaging the nut 902, the cage 904 has generally planar upper and lower surfaces 924, 926. The cage 904 includes a base portion 928 and bendable first and second arm portions 930, 932 extending from opposite ends of the base portion 928. The first and second arm portions 930, 932 are preferably integrally formed with the base portion 928. The first arm portion 930 has a portion 980 and a portion 984. The second arm portion 932 has a portion 982 and a portion 986.

An aperture (not shown) is provided through the base portion 928 of the cage 904 and the first and second arm portions 930, 932 have generally semicircular cutouts 934, 936 at their free ends 938, 940.

The cage 904 preferably includes stand-offs 925 which extend outwardly from the upper surface 924 of the portions 984, 986 of the first and second arm portions 930, 932, respectively, of the cage 904. The stand-offs 925 are preferably tab members which are formed by striking or shearing out the portions 984, 986 of the first and second arm portions 930, 932. The cage 904 preferably has two stand-offs 925 in the form of struck out or sheared out tab members, with one being provided on the upper surface 924 of the portion 984 of the first arm portion 930, and with another one being provided on the upper surface 924 of the portion 986 of the second arm portion 932. Of course, the stand-offs 925 may be triangular, square, rounded, or otherwise, so long as the stand-offs 925 allow for reduced surface to surface contact between the nut 902 and the cage 904 prior to the torqueing of the nut 902. Of course, it is to be further understood that any number of stand-offs 925 may be provided than the two which are preferably provided.

The cage 904 preferably includes stand-offs 921 which extend outwardly from the upper surface 924 of the portions 980, 982 of the first and second arm portions 930, 932, respectively, of the cage 904. The stand-offs 921 are preferably tab members formed by striking or shearing out the portions 980, 982 of the first and second arm portions 930, 932. The cage 904 preferably has four stand-offs 921 in the form of struck out or sheared out tab members, with two being provided on the upper surface 924 of the portion 980 of the first arm portion 930, one on either side of the semicircular cutout 934, and with another two being provided on the upper surface 924 of the portion 982 of the second arm portion 932, one on either side of the semicircular cutout 936. Of course, the stand-offs 921 may be triangular, square, rounded, or otherwise, so long as the stand-offs 921 allow for reduced surface to surface contact between the nut 902 and the cage 904 prior to the torqueing of the nut 902. Of course, it is to be further understood that any number of stand-offs 921 may be provided than the four which are preferably provided.

The cage 904 is formed of a material which is softer than the material of the nut 902.

In operation, and as best illustrated in FIGS. 51–55, the nut 902 is positioned on the upper surface 924 of the base portion 928 such that the points 922 of the stand-offs 920 are the only parts of the nut 902 which are in contact with the upper surface 924 of the base portion 928. Thus, a gap 942 is provided between the upper surface 924 of the base portion 928 of the cage 904 and the lower surface 910 of the nut 902.

Figure 51:
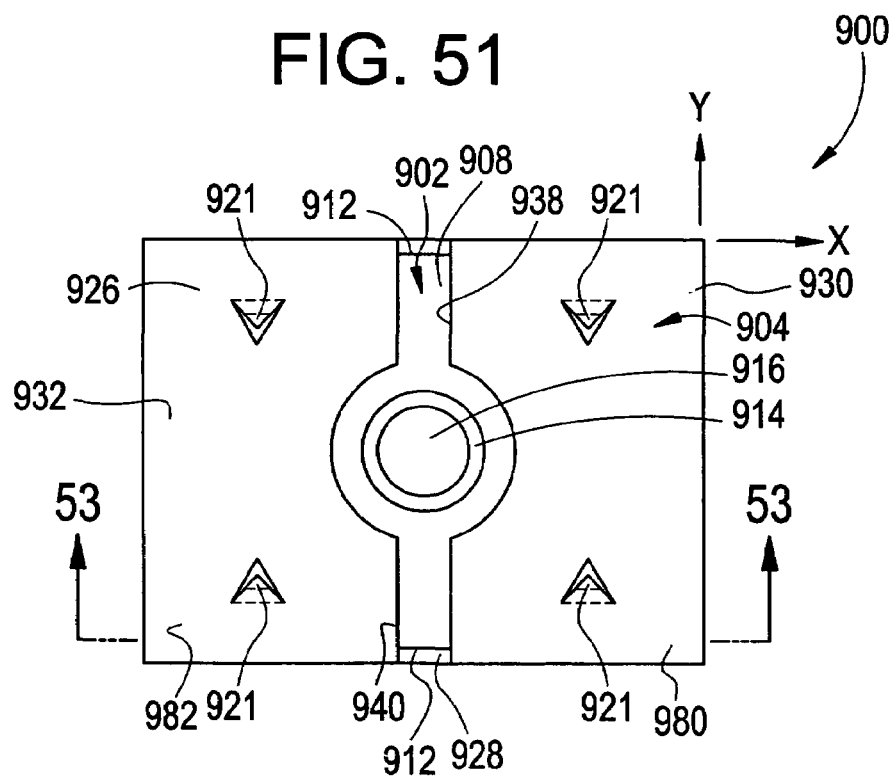
FIG. 51 is a top plan view of a cage nut assembly of the ninth embodiment of the invention.
Figure 52:
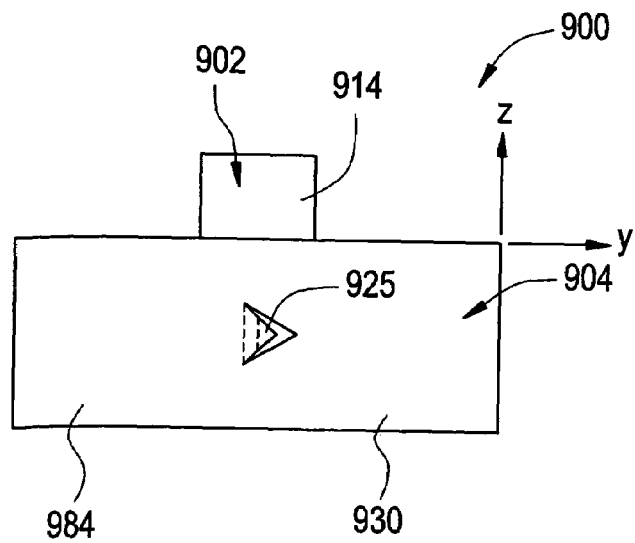
FIG. 52 is a side plan view of the cage nut assembly of the ninth embodiment of the invention.
Figure 55:
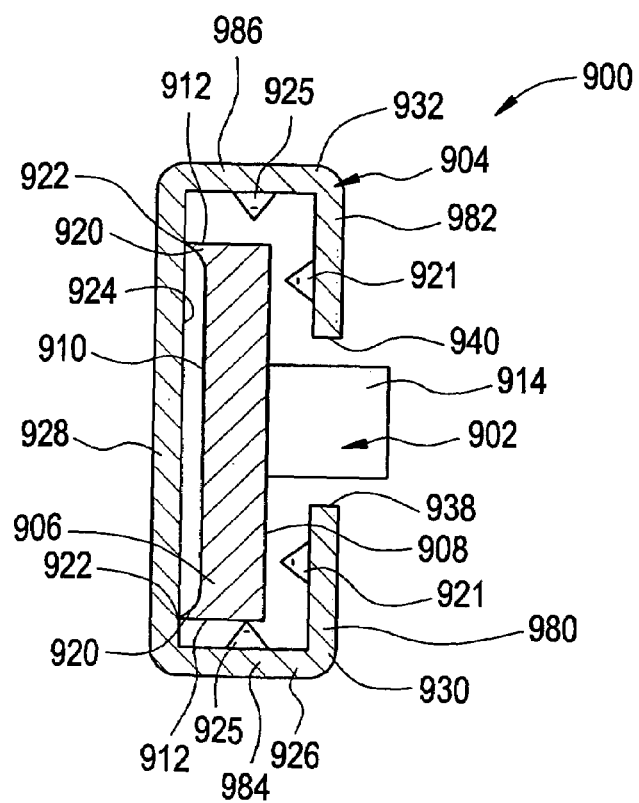
FIG. 55 is a cross-sectional side elevational view of the cage nut assembly of the ninth embodiment of the invention prior to the nut being torqued into place and prior to the cage nut assembly going through a bath in a sideways position.
Figure 53:
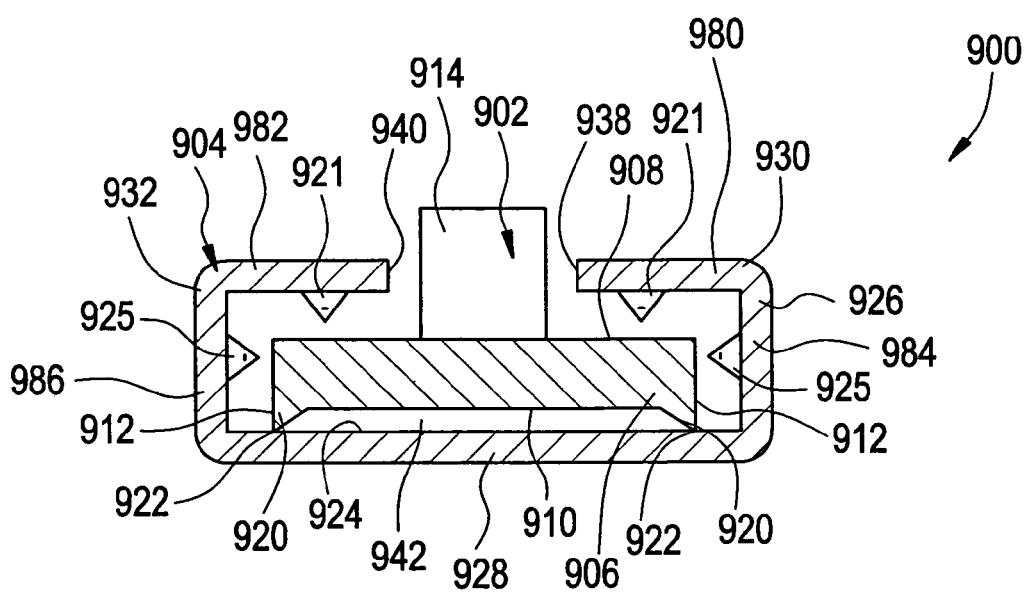
FIG. 53 is a cross-sectional side elevational view of the cage nut assembly of the ninth embodiment of the invention taken along line 53—53 of FIG. 51, prior to the nut being torqued into place and prior to the cage nut assembly going through a bath in a horizontal position.
Figure 54:
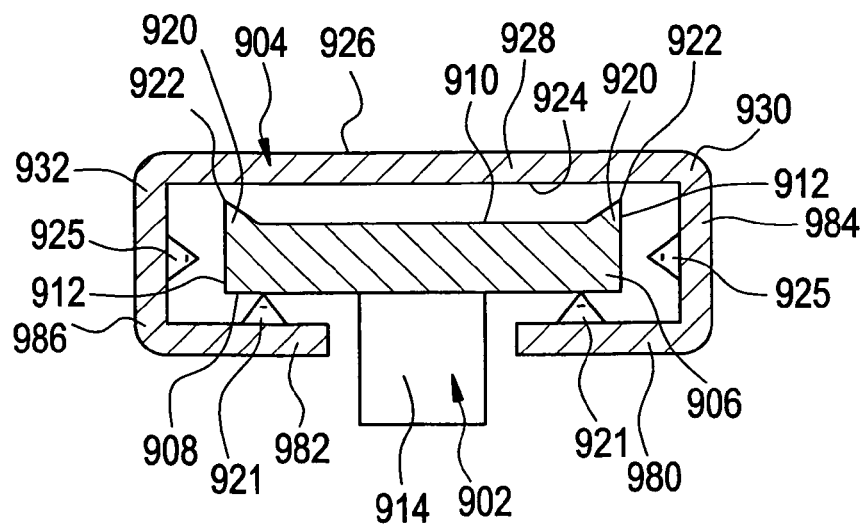
FIG. 54 is a cross-sectional side elevational view of the cage nut assembly of the ninth embodiment of the invention prior to the nut being torqued into place and prior to the cage nut assembly going through a bath in an upside down position.

Each portion 984, 986 of the arm portions 930, 932 is then bent around one of the sidewalls 912 of the nut 902 and each portion 980, 982 of the arm portions 930, 932 is then bent above the upper surface 908 of the nut 902. The free ends 938, 940 of the arm portions 930, 932 are typically spaced apart and the semicircular cutouts 934, 936 are in alignment with one another. The aperture provided through the base portion 928 has a diameter which is preferably greater than or equal to a diameter of the semicircular cutouts 934, 936. The cylindrical member 914 of the nut 902 extends through the semicircular cutouts 934, 936. Thus, the cage 904 effectively encages the nut 902 to form the cage nut assembly 900, which is best illustrated in FIGS. 51–55. The cage 904 is sized so that the nut 902 has a limited range of movement in at least one dimension or direction, and preferably in three dimensions, for example the "X", "Y" and "Z" axes as illustrated in FIGS. 51 and 52.

The lower surface 926 of the base portion 928 of the cage 904 is then welded to a mating surface or structural member (not shown), such as an automobile frame. The structural member has an aperture (not shown) therethrough which is in alignment with the aperture provided through the base portion 928 of the cage 904. The aperture of the structural member preferably has a diameter which is greater than or equal to the diameter of the aperture provided through the base portion 928 of the cage 904. The structural member and the cage 904 are then typically sent through a bath that is meant to add a corrosion or paint coating to the structural member, such as an e-coat or ELPO bath. When the cage 904 is sent through the bath in a horizontal position, FIG. 53, the stand-offs 920 keep the lower surface 910 of the nut 902 from sitting flat on the upper surface 924 of the base portion 928 of the cage 904, thus reducing the amount of bearing surface interface between the cage 904 and the nut 902, thus reducing the possibility that the cage 904 and the nut 902 will stick or adhere to each other after coating or welding is complete. When the cage 904 is sent through the bath in an upside down position, FIG. 54, the stand-offs 921 keep the upper surface 908 of the nut 902 from sitting flat on the upper surface 924 of the portions 980, 982 of the arm portions 930, 932 which are bent over the upper surface 908 of the nut 902, thus reducing the amount of bearing surface interface between the cage 904 and the nut 902, thus reducing the possibility that the cage 904 and the nut 902 will stick or adhere to each other after coating or welding is complete. When the cage 904 is sent through the bath in a sideways position, FIG. 55, the stand-offs 925 keep the sidewalls 912 of the nut 902 from sitting flat on the upper surface 924 of the portions 984, 986 of the arm portions 930, 932 which are bent over the sidewalls 912 of the nut 902, thus reducing the amount of bearing surface interface between the cage 904 and the nut 902, thus reducing the possibility that the cage 904 and the nut 902 will stick or adhere to each other after coating or welding is complete.

The nut 902 is then secured to the cage 904 in generally the same manner as described herein with regard to the nut 102 being secured to the cage 104 in the first embodiment of the invention and as illustrated in FIGS. 5 and 6 and, therefore, will not be described or illustrated herein again for brevity purposes.

Thus, the cage nut assembly 900 effectively reduces the possibility of the nut 902 sticking to the cage 904 when the cage nut assembly 900 is sent through a bath in a horizontal position, an upside down position, or a sideways position.

Attention is now directed to the tenth embodiment of a cage nut assembly 1000 of the present invention, which is best illustrated in FIGS. 56–63. The cage nut assembly 1000 includes a nut 1002 and a cage 1004.

Figure 56:
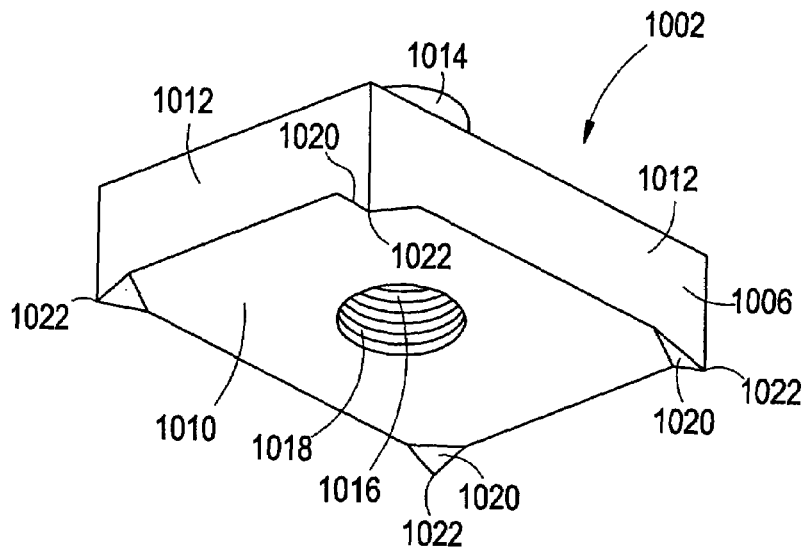
FIG. 56 is a perspective view of a nut of the tenth embodiment of the invention.

The nut 1002 is best illustrated in FIG. 56 and includes a rectangular plate 1006 having a generally planar upper surface 1008, a generally planar lower surface 1010 and sidewalls 1012 which connect the upper and lower surfaces 1008, 1010. The nut 1002 also includes a cylindrical member 1014 which extends outwardly from the upper surface 1008 of the nut 1002. The cylindrical member 1014 is preferably in the form of a right circular cylinder. An aperture 1016 extends through the nut member 1002 from the plate 1006 into the cylindrical member 1014. The aperture 1016 may be closed at the lower surface 1010 of the plate 1006 or it may extend all the way through the plate 1006. The aperture 1016 defines an aperture wall 1018 which is preferably threaded and is capable of receiving a bolt or screw (not shown) to be attached thereto.

The nut 1002 also preferably includes four stand-offs 1020 which extend outwardly from the lower surface 1010 of the nut 1002. Each stand-off 1020 extends outwardly from one of the four corners of the lower surface 1010 of the nut 1002. Each stand-off 1020 is also preferably in the form of a protrusion in the form of a tetrahedron such that each of the stand-offs 1020 extends generally to a pointed portion 1022 thereof. Of course, the stand-offs 1020 may be in forms other than of a tetrahedron, such as dimples, ribs, or any other type of stand-off structure, so long as the stand-offs allow for reduced surface to surface contact between the nut 1002 and the cage 1004 prior to the torqueing of the nut 1002.

The nut 1002 may be formed by cold forming, stamping, or staking a nut member into a plate member. The nut 1002 may then be heat treated, if desired, depending on the hardness of the material of the nut 1002.

Figure 57:
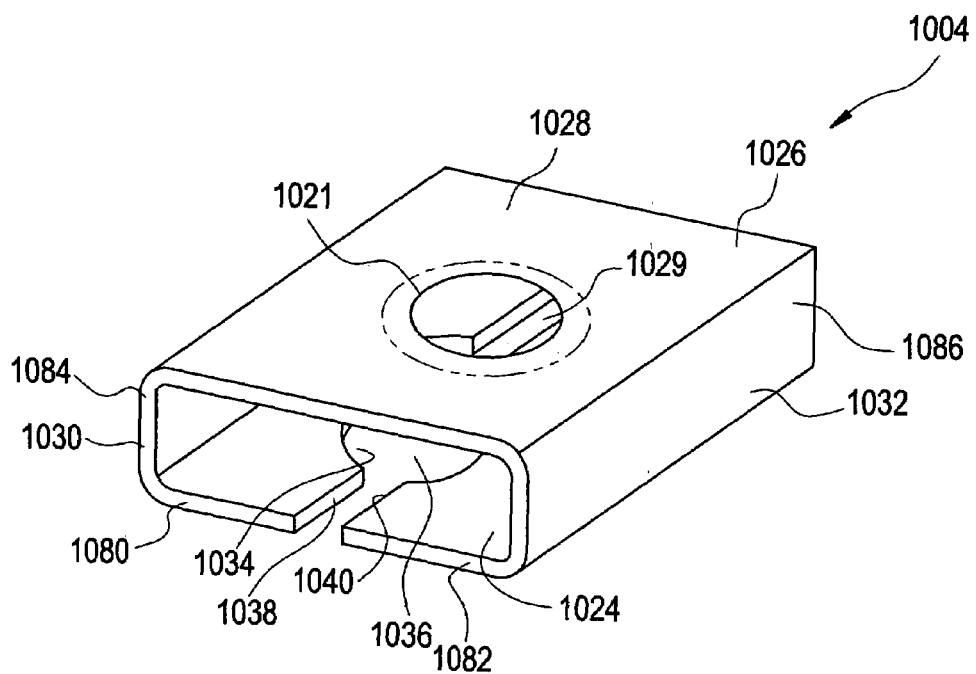
FIG. 57 is a perspective view of a cage of the tenth embodiment of the invention.
Figure 58:
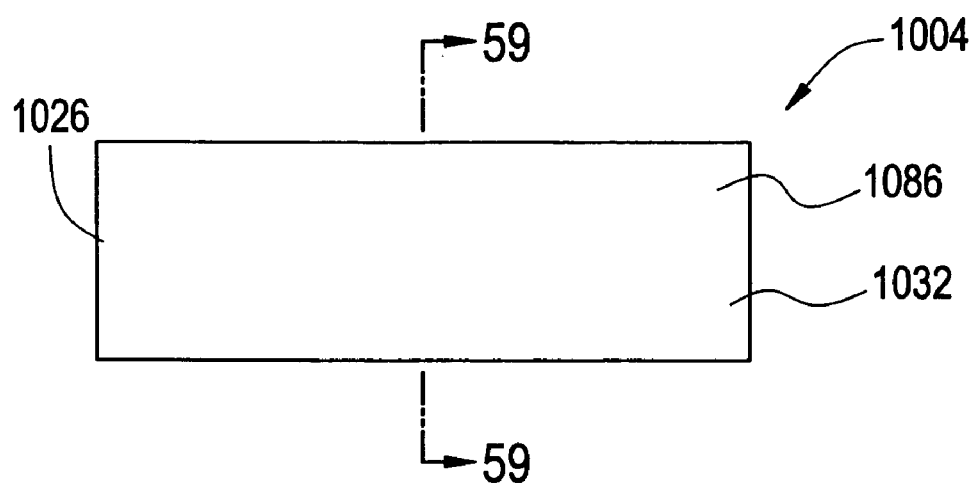
FIG. 58 is a side elevational view of the cage of the tenth embodiment of the invention.
Figure 59:
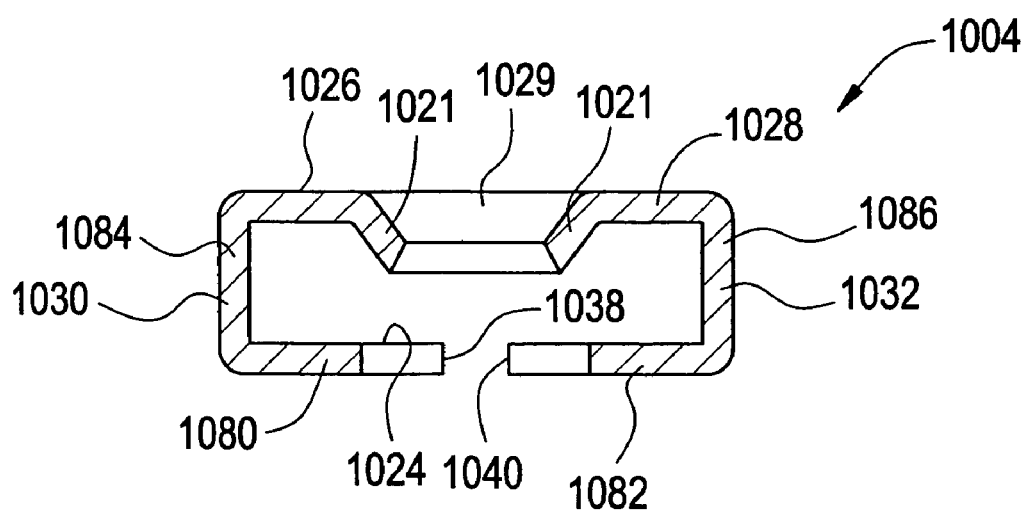
FIG. 59 is a cross-sectional view of the cage of the tenth embodiment of the invention taken along line 59—59 of FIG. 58.

The cage 1004 is best illustrated in FIGS. 57–59 and is used for encaging the nut 1002. Prior to encaging the nut 1002, the cage 1004 has generally planar upper and lower surfaces 1024, 1026. The cage 1004 includes a base portion 1028 and bendable first and second arm portions 1030, 1032 extending from opposite ends of the base portion 1028. The first and second arm portions 1030, 1032 are preferably integrally formed with the base portion 1028. The first arm portion 1030 has a portion 1080 and a portion 1084. The second arm portion 1032 has a portion 1082 and a portion 1086.

An aperture 1029 is provided through the base portion 1028 of the cage 1004 and the first and second arm portions 1030, 1032 have generally semicircular cutouts 1034, 1036 at their free ends 1038, 1040.

The cage 1004 preferably includes a stand-off 1021 which extends outwardly from the upper surface 1024 around the aperture 1029 of the base portion 1028. The stand-off 1021 is preferably an angled or curved flange which is formed by drawing down the base portion 1028 around the aperture 1029 of the base portion 1028, as is best illustrated in FIGS. 57 and 59, such that the aperture 1029 has a diameter at the lower surface 1026 of the cage 1004 which is larger than a diameter of the aperture 1029 at the free end of the stand-off 1021. Of course, the stand-off 1021 may be formed in other manners than by drawing down the base portion 1028, so long as the stand-off allows for reduced surface to surface contact between the nut 1002 and the cage 1004 prior to the torqueing of the nut 1002. Of course, it is to be understood that any number of stand-offs 1021 may be provided than the one which is preferably provided.

The cage 1004 is formed of a material which is softer than the material of the nut 1002.

In operation, and as best illustrated in FIGS. 60–63, the cylindrical member 1014 of the nut 1002 is positioned through the aperture 1029 of the base portion 1028 of the cage 1004, such that the upper surface 1008 of the nut 1002 faces the upper surface 1024 of the base portion 1028 of the cage 1004.

Figure 60:
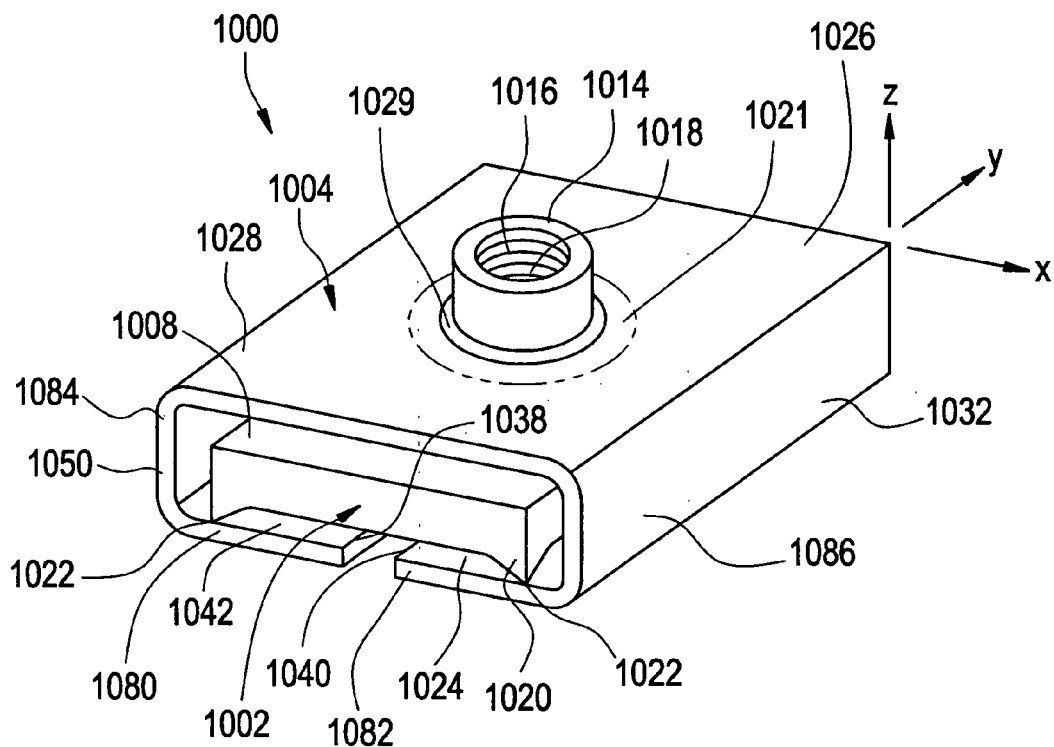
FIG. 60 is a perspective view of a cage nut assembly of the tenth embodiment of the invention.
Figure 61:
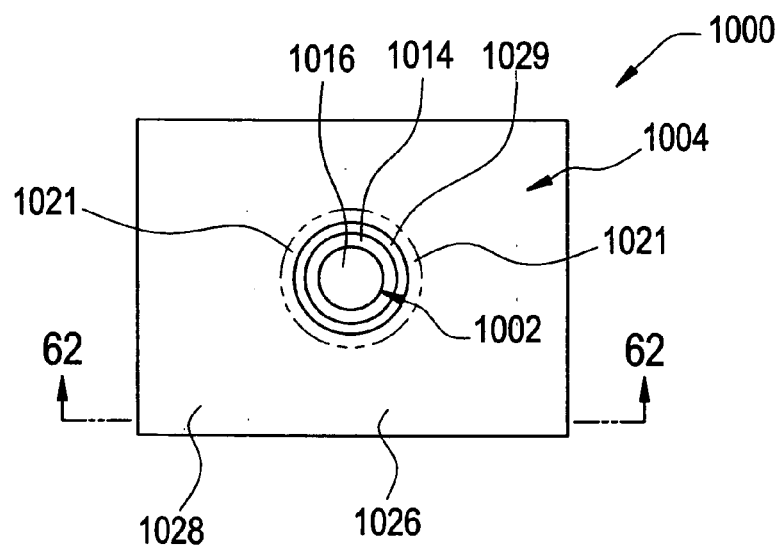
FIG. 61 is a top plan view of the cage nut assembly of the tenth embodiment of the invention.
Figure 62:
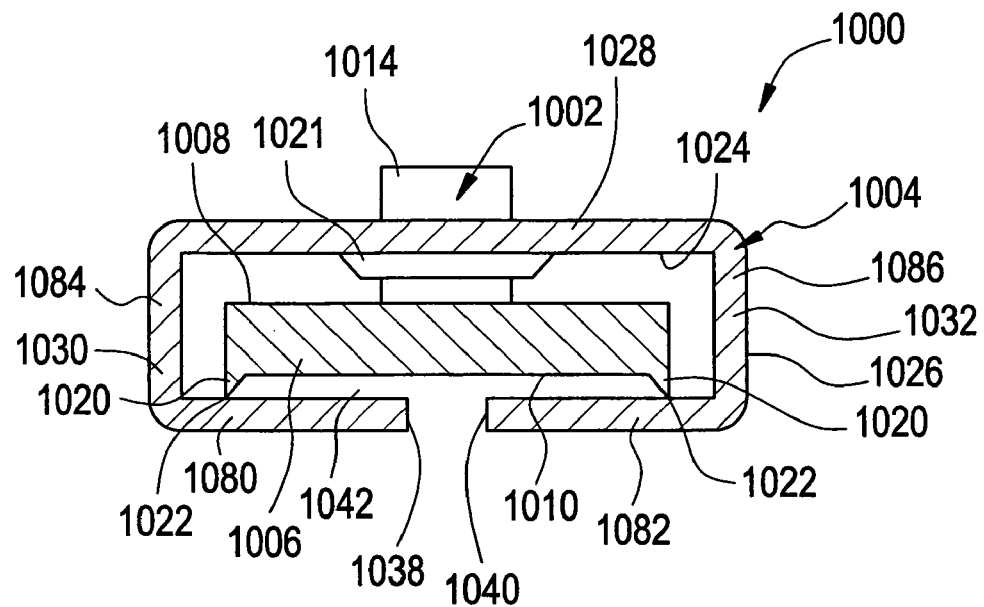
FIG. 62 is a cross-sectional side elevational view of the cage nut assembly of the tenth embodiment of the invention taken along line 62—62 of FIG. 61, prior to the nut being torqued into place and prior to the cage nut assembly going through a bath in a horizontal position.
Figure 63:
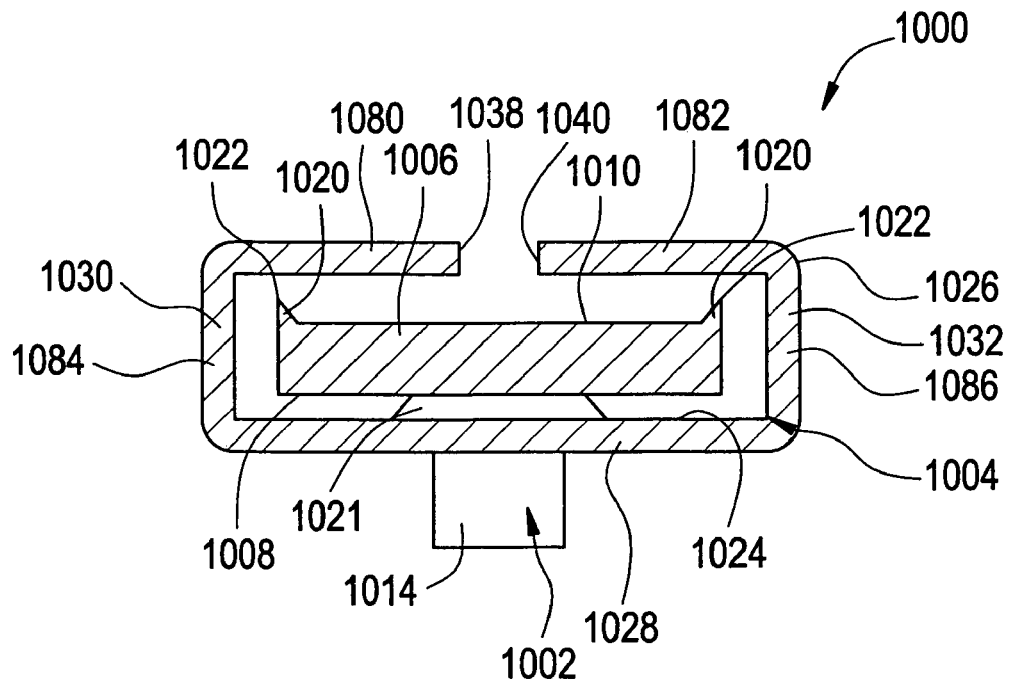
FIG. 63 is a cross-sectional side elevational view of the cage nut assembly of the tenth embodiment of the invention prior to the nut being torqued into place and prior to the cage nut assembly going through a bath in an upside down position.

Each portion 1084, 1086 of the arm portions 1030, 1032 is then bent around one of the sidewalls 1012 of the nut 1002 and each portion 1080, 1082 of the arm portions 1030, 1032 is then bent under the lower surface 1010 of the nut 1002. The free ends 1038, 1040 of the arm portions 1030, 1032 are typically spaced apart and the semicircular cutouts 1034, 1036 are in alignment with one another. Thus, the cage 1004 effectively encages the nut 1002 to form the cage nut assembly 1000, which is best illustrated in FIGS. 60–63. The cage 1004 is sized so that the nut 1002 has a limited range of movement in at least one dimension or direction, and preferably in three dimensions, for example the "X", "Y" and "Z" axes as illustrated in FIG. 60.

When the cage 1004 encages the nut 1002, the nut is positioned on the upper surface 1024 of the portion 1080 of the first arm portion 1030 and on the upper surface 1024 of the portion 1082 of the second arm portion 1032, such that the points 1022 of the stand-offs 1020 are the only parts of the nut 1002 which are in contact with the upper surface 1024 of the first and second arm portions 1030, 1032. Thus, a gap 1042 is provided between the upper surface 1024 of the first and second arm portions 1030, 1032 of the cage 1004 and the lower surface 1010 of the nut 1002.

The lower surface 1026 of the portions 1080, 1082 of the first and second arm portions 1030, 1032, respectively, of the cage 1004 is then welded to a mating surface or structural member (not shown), such as an automobile frame. The structural member has an aperture (not shown) therethrough which is in alignment with the semicircular cutouts 1034, 1036 of the first and second arm portions 1030, 1032 of the cage 1004. The structural member and the cage 1004 are then typically sent through a bath that is meant to add a corrosion or paint coating to the structural member, such as an e-coat or ELPO bath. When the cage 1004 is sent through the bath in a horizontal position, FIG. 62, the stand-offs 1020 keep the lower surface 1010 of the nut 1002 from sitting flat on the upper surface 1024 of the portions 1080, 1082 of the first and second arm portions 1030, 1032, respectively, of the cage 1004, thus reducing the amount of bearing surface interface between the cage 1004 and the nut 1002, thus reducing the possibility that the cage 1004 and the nut 1002 will stick or adhere to each other after coating or welding is complete. When the cage 1004 is sent through the bath in an upside down position, FIG. 63, the stand-off 1021 keeps the upper surface 1008 of the nut 1002 from sitting flat on the upper surface 1024 of the base portion 1028 of the cage 1004, thus reducing the amount of bearing surface interface between the cage 1004 and the nut 1002, thus reducing the possibility that the cage 1004 and the nut 1002 will stick or adhere to each other after coating or welding is complete.

The nut 1002 is then secured to the cage 1004 in generally the same manner as described herein with regard to the nut 102 being secured to the cage 104 in the first embodiment of the invention and as illustrated in FIGS. 5 and 6 and, therefore, will not be described or illustrated again for brevity purposes.

Thus, the cage nut assembly 1000 effectively reduces the possibility of the nut 1002 sticking to the cage 1004 when the cage nut assembly 1000 is sent through a bath in a horizontal position or an upside down position.

Attention is now directed to the eleventh embodiment of a cage nut assembly 1100 of the present invention, which is best illustrated in FIGS. 64–68. The cage nut assembly 1100 includes a nut 1102 and a cage 1104.

Figure 64:
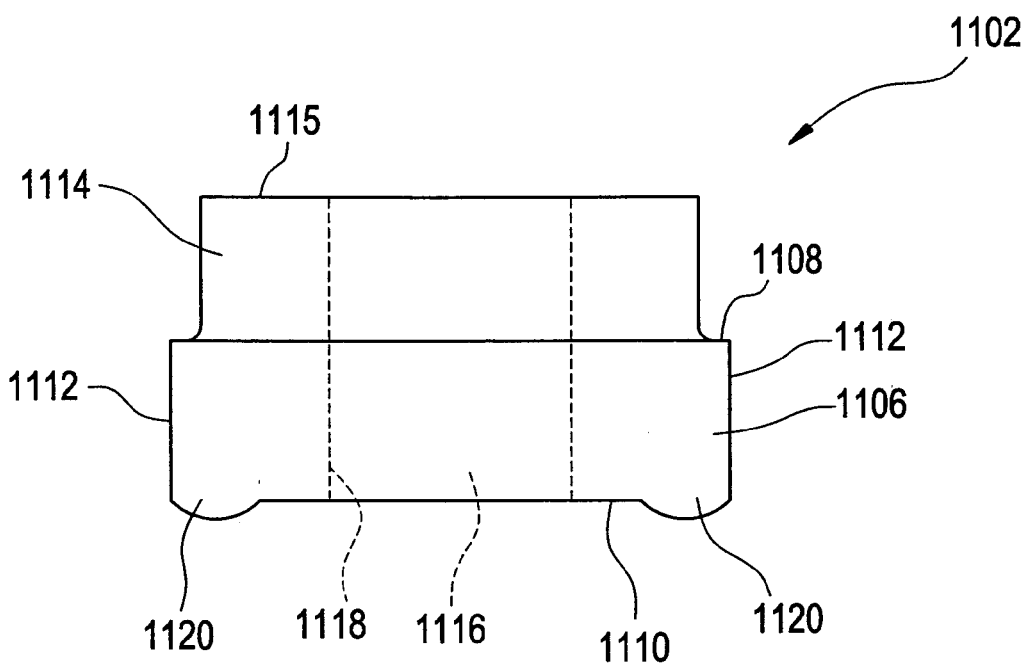
FIG. 64 is a side elevational view of a nut of an eleventh embodiment of the invention.

The nut 1102 is best illustrated in FIG. 64 and includes a rectangular plate 1106 having a generally planar upper surface 1108, a generally planar lower surface 1101 and sidewalls 1112 which connect the upper and lower surfaces 1108, 1110. The nut 1102 also includes a member 1114 which extends outwardly from the upper surface 1108 of the nut 1102 and which has an upper surface 1115. An aperture 1116 extends through the nut member 1102 from the plate 1106 into the member 1114. The aperture 1116 may be closed at the lower surface 1110 of the plate 1106 or it may extend all the way through the plate 1106. The aperture 1116 defines an aperture wall 1118 which is preferably threaded and is capable of receiving a bolt or screw (not shown) to be attached thereto.

The nut 1102 also preferably includes stand-offs 1120 which extend outwardly from the lower surface 1110 of the nut 1102. Each stand-off 1120 extends outwardly, preferably from one of the four corners of the lower surface 1110 of the nut 1102. The stand-offs 1120 may be in any form so long as the stand-offs allow for reduced surface to surface contact between the nut 1102 and the cage 1104 prior to the torqueing of the nut 1102.

The nut 1102 may be formed by cold forming, stamping, or staking a nut member into a plate member. The nut 1102 may then be heat treated, if desired, depending on the hardness of the material of the nut 1102.

Figure 65:
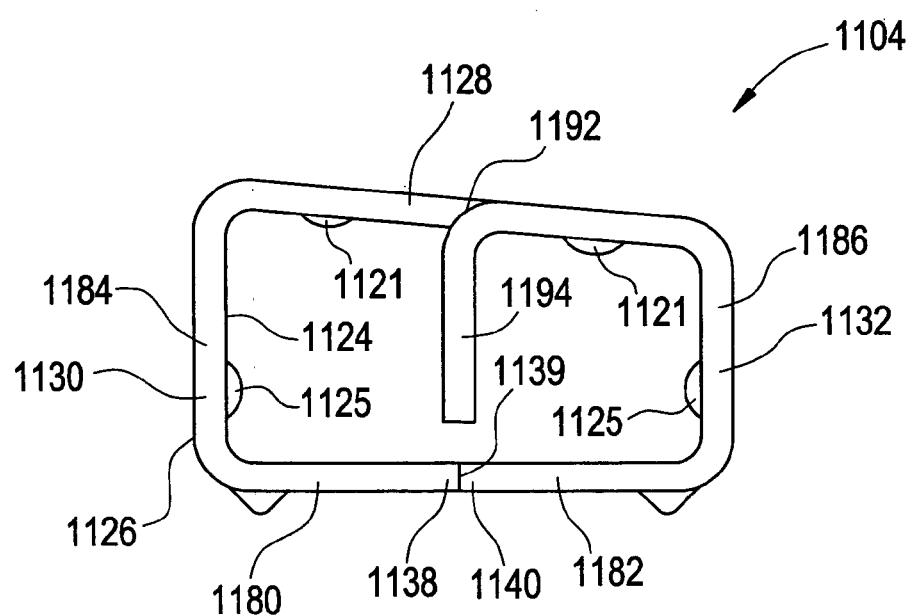
FIG. 65 is a side elevational view of a cage of the eleventh embodiment of the invention.

The cage 1104 is best illustrated in FIG. 65 and is used for encaging the nut 1102. The cage 1104 has inner and outer surfaces 1124, 1126. The cage 1104 includes a base portion 1128 and first and second arm portions 1130, 1132 extending from opposite ends of the base portion 1128. The base portion 1128 preferably has at least one notch 1192 formed therein such that at least one arm portion 1194 is formed in the base portion 1128. The first and second arm portions 1130, 1132 are preferably integrally formed with the base portion 1128. The first arm portion 1130 has a portion 1180 and a portion 1184. The second arm portion 1132 has a portion 1182 and a portion 1186. The portions 1184, 1186 are angled from the base portion 1128 and the portions 1180, 1182 are generally perpendicular to the portions 1184, 1186 respectively.

Free ends 1138, 1140 of the portions 1180, 1182 of the arm portions 1130, 1132, respectively, are positioned proximate to one another, and preferably abut against one another, to form a seam 1139 there between. An aperture (not shown) is provided through the base portion 1138 of the cage 1104 and the first and second arm portions 1130, 1132 have generally semicircular cutouts (not shown) at their free ends 1138, 1140 which come together to form a generally circular opening when the free ends 1138, 1140 of the arm portions 1130, 1132 are positioned proximate to one another or abut against one another.

The cage 1104 preferably includes stand-offs 1121 which extend outwardly from the inner surface 1124 of the base portion 1128 of the cage 1104. Each stand-off 1121 is also preferably in the form of a protrusion in the form of a rounded dimple. Of course, the stand-offs 1121 may be in forms other than dimples, such as rounded beads, ribs, or any other type of stand-off structure, so long as the stand-offs allow for reduced surface to surface contact between the nut 1102 and the cage 1104 prior to the torqueing of the nut 1102.

The cage 1104 preferably includes stand-offs 1125 which extend outwardly from the inner surface 1124 of the portions 1184, 1186 of the first and second arm portions 1130, 1132, respectively, of the cage 1104. Each stand-off 1125 is also preferably in the form of a protrusion in the form of a rounded dimple. Of course, the stand-offs 1125 may be in forms other than dimples, such as rounded beads, ribs, or any other type of stand-off structure, so long as the stand-offs allow for reduced surface to surface contact between the nut 1102 and the cage 1104 prior to the torqueing of the nut 1102.

The cage 1104 is formed of a material which is softer than the material of the nut 1102.

Figure 66:
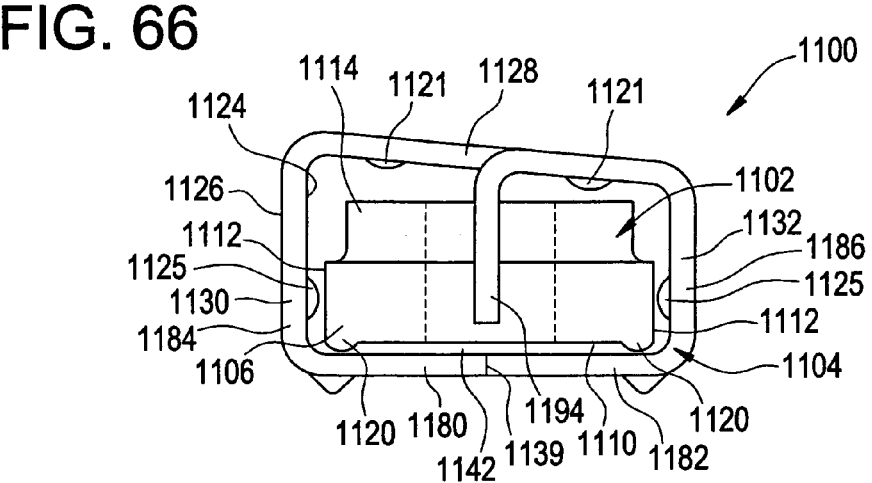
FIG. 66 is a side elevational view of the cage nut assembly of the eleventh embodiment of the invention prior to the nut being torqued into place and prior to the cage nut assembly going through a bath in horizontal position.
Figure 67:
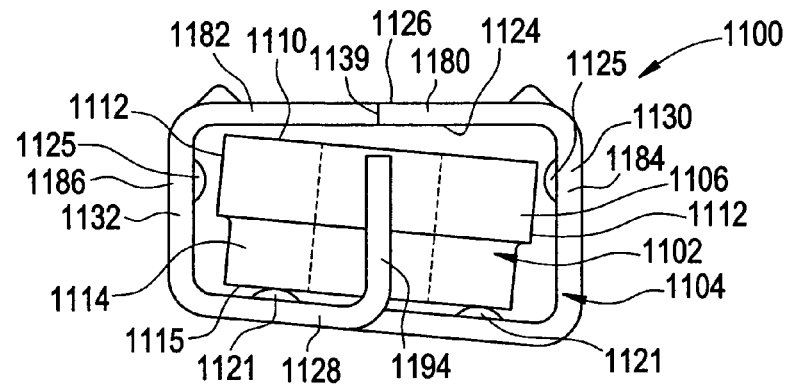
FIG. 67 is a side elevational view of the cage nut assembly of the eleventh embodiment of the invention prior to the nut being torqued into place and prior to the cage nut assembly going through a bath in an upside down position.
Figure 68:
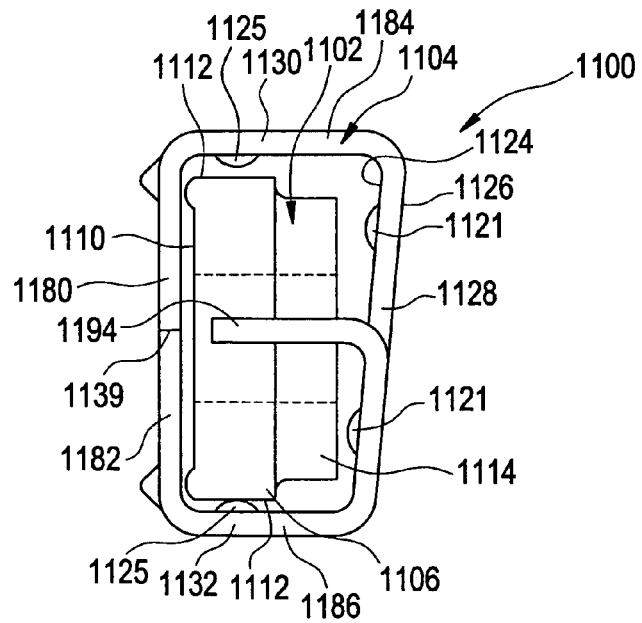
FIG. 68 is a side elevational view of the cage nut assembly of the eleventh embodiment of the invention prior to the nut being torqued into place and prior to the cage nut assembly going through a bath in a sideways position.

In operation, and as best illustrated in FIGS. 66–68, the nut 1102 is slid into the cage 1104 between the base portion 1128 and the arm portions 1130, 1132 such that the lower surface 1108 of the nut 1102 faces the inner surface 1124 of the portions 1180, 1182 of the arm portions 1130, 1132, respectively. The stand-offs 1120 on the nut 1102 provide minimal surface to surface contact between the nut 1102 and the inner surface 1124 of the portions 1180, 1182 of the arm portions 1130, 1132, respectively, such that a gap 1142 is provided between the inner surface 1124 of the arm portions 1180, 1182 of the arm portions 1130, 1132, respectively, and the lower surface 1110 of the nut 1102.

The at least one arm portion 1194 of the base portion 1128 is then bent down toward the portions 1180, 1182 of the arm portions 1130, 1132, respectively, in order to retain the nut 1102 within the cage 1104. It should be noted that if desired, the arm portion 1194 can be bent back into place to allow for the nut 1102 to be removed from the cage 1104. Thus, the cage 1104 effectively encages the nut 1102 to form the cage nut assembly 1100, which is best illustrated in FIGS. 66–68. The cage 1104 is sized so that the nut 1102 has a limited range of movement in at least one dimension, and preferably in three dimensions.

The outer surface 1126 of the portions 1180, 1182 of the arm portions 1130, 1132, respectively, of the cage 1104 are then welded to a mating surface or structural member (not shown), such as an automobile frame, such that the seam 1139 provided between the portions 1180, 1182 of the arm portions 1130, 1132, respectively, is also welded together. The structural member has an aperture (not shown) therethrough which is in alignment with the opening formed by the semicircular cutouts of the cage 1104. The structural member and the cage 1104 are then typically sent through a bath that is meant to add a corrosion or paint coating to the structural member, such as an e-coat or ELPO bath. When the cage 1104 is sent through the bath in a horizontal position, FIG. 66, the stand-offs 1120 keep the lower surface 1110 of the nut 1102 from sitting flat on the inner surface 1124 of the portions 1180, 1182 of the arm portions 1130, 1132 of the cage 1104, thus reducing the amount of bearing surface interface between the cage 1104 and the nut 1102, thus reducing the possibility that the cage 1104 and the nut 1102 will stick or adhere to each other after coating or welding is complete. When the cage 1104 is sent through the bath in an upside down position, FIG. 67, the stand-offs 1121 keep the upper surface 1115 of the nut 1102 from sitting flat on the inner surface 1124 of the base portion 1128, thus reducing the amount of bearing surface interface between the cage 1104 and the nut 1102, thus reducing the possibility that the cage 1104 and the nut 1102 will stick or adhere to each other after coating or welding is complete. When the cage 1104 is sent through the bath in a sideways position, FIG. 68, the stand-offs 1125 keep the sidewalls 1112 of the nut 1102 from sitting flat on the inner surface 1124 of the portions 1184, 1186 of the arm portions 1130, 1132, thus reducing the amount of bearing surface interface between the cage 1104 and the nut 1102, thus reducing the possibility that the cage 1104 and the nut 1102 will stick or adhere to each other after coating or welding is complete.

The nut 1102 may then be secured to the cage 1104 is generally the same manner as described herein with regard to the nut 102 being secured to the cage 104 in the first embodiment of the invention and as illustrated in FIGS. 5 and 6 and, therefore, will not be described or illustrated herein again for brevity purposes.

Thus, the cage nut assembly 1100 effectively reduces the possibility of the nut 1102 sticking to the cage 1104 when the cage nut assembly 1100 is sent through a bath in a horizontal position, an upside down position, or a sideways position.

It should be noted that the general structure of the cage 1104 and the nut 1102 of the cage nut assembly 1100 can, if desired, also be used in the cage nut assemblies 100, 200, 300, 400, 500, 600, 700, 800, 900, 1000 so long as they still effectively reduce the possibility of the nuts 102, 202, 302, 402, 502, 602, 702, 802, 902, 1002 becoming stuck to the cages 104, 204, 304, 404, 504, 604, 704, 804, 904, 1004 when the cage nut assemblies 100, 200, 300, 400, 500, 600, 700, 800, 900, 1000 are sent through the baths in any position.

Thus, the cage nut assemblies 100, 200, 300, 400, 500, 600, 700, 800, 900, 1000, 1100 provide stronger joints between the nuts 102, 202, 302, 402, 502, 602, 702, 802, 902, 1002, 1102 and the cages 104, 204, 304, 404, 504, 604, 704, 804, 904, 1004, 1104 than cage nut assemblies of the prior art after the nuts 102, 202, 302, 402, 502, 602, 702, 802, 902, 1002, 1102 are torqued into place. The cage nut assemblies 100, 200, 300, 400, 500, 600, 700, 800, 900, 1000, 1100 also require less manufacturing and provide for fewer parts than cage nut assemblies of the prior art, thus making the cage nut assemblies 100, 200, 300, 400, 500, 600, 700, 800, 900, 1000, 1100 of the present invention cheaper to make. The cage nut assemblies 100, 200, 300, 400, 500, 600, 700, 800, 900, 1000, 1100 also effectively reduce the possibility of the nuts 102, 202, 302, 402, 502, 602, 702, 802, 902, 1002, 1102 sticking to the cages 104, 204, 304, 404, 504, 604, 704, 804, 904, 1004, 1104 once a bath is applied.

It should be noted that any of the configurations of the stand-offs provided hereinabove can be mixed and matched with other configurations of the stand-offs as desired, the number of stand-offs provided on any surface of the nuts or cages can also be varied as desired, and stand-offs can be removed from any one surface, so long as the configuration of the stand-offs provided on the nuts and/or cages effectively reduce the possibility of the nuts sticking to the cages once a bath is applied.

It should further be noted that the configuration of the nuts and/or the cages can be different from that as illustrated and described herein, so long as the cage is configured to retain the nut therein and allow the nut to move in at least one direction to accommodate tolerance variations and enable engagement thereof by a male threaded fastener.

While preferred embodiments of the invention are shown and described, it is envisioned that those skilled in the art may devise various modifications without departing from the spirit and scope of the foregoing description and the appended claims.

The invention is claimed as:

1. An assembly configured to receive a fastener, said assembly comprising:
    a nut member having a base portion having an upper surface, a lower surface, and at least one sidewall which connects said upper surface to said lower surface, said nut member configured to be engaged by the fastener;
    a cage member for encaging said nut member, said cage member configured to provide a limited range of movement of said nut member in at least one direction, said cage member configured to allow access to said nut member within the limited range of movement of said nut member, said lower surface of said nut member being configured to be positioned against said cage member upon the fastener being fully engaged and secured to said nut member; and
    at least one stand-off for reducing an amount of bearing surface interface between said at least one sidewall of said nut member and said cage member in order to reduce a possibility of said nut member sticking to said cage member when said assembly is run through a bath in a sideways position, said at least one stand-off is associated with said nut member, and wherein said nut member has a plurality of sidewalls which connect said upper surface to said lower surface, each said sidewall of said base portion being connected to an adjacent sidewall along an edge of said base portion, and wherein at least two opposite sidewalls extend inwardly toward one another such that said at least one stand-off is one of said edges of said base portion of said nut member.

2. An assembly as defined in claim 1, further including means for reducing an amount of bearing surface interface between said upper surface of said nut member and said cage member in order to reduce a possibility of said nut member sticking to said cage member when said assembly is run through said bath in an upside down position.

3. An assembly as defined in claim 2, wherein said reducing means is associated with said upper surface of said nut member.

4. An assembly configured to receive a fastener, said assembly comprising:
   a nut member having a base portion having an upper surface, a lower surface, and at least one sidewall which connects said upper surface to said lower surface, said nut member configured to be engaged by the fastener;
   a cage member for encaging said nut member, said cage member configured to provide a limited range of movement of said nut member in at least one direction, said cage member configured to allow access to said nut member within the limited range of movement of said nut member, said lower surface of said nut member being configured to be positioned against said cage member upon the fastener being fully engaged and secured to said nut member;
   at least one stand-off for reducing an amount of bearing surface interface between said at least one sidewall of said nut member and said cage member in order to reduce a possibility of said nut member sticking to said cage member when said assembly is run through a bath in a sideways position; and
   means for reducing an amount of bearing surface interface between said lower surface of said nut member and said cage member in order to reduce a possibility of said nut member sticking to said cage member when said assembly is run through said bath in a horizontal position.

5. An assembly as defined in claim 4, wherein said reducing means is associated with said lower surface of said nut member.

6. An assembly as defined in claim 5, wherein said reducing means are further configured to be embedded into said cage member upon the fastener being fully engaged and secured to said nut member.

7. An assembly as defined in claim 4, wherein said cage member provides at least one arm portion which is configured to be bent to prevent said nut member from being removed from said cage member.

8. An assembly as defined in claim 7, wherein said at least one arm portion is further configured to be rebent to allow said nut member to be removed from said cage member.

9. An assembly configured to receive a fastener, said assembly comprising:
   a nut member having a base portion having an upper surface, a lower surface, and at least one sidewall which connects said upper surface to said lower surface, said out member configured to be engaged by the fastener;
   a cage member for encaging said nut member, said cage member configured to provide a limited range of movement of said nut member in at least one direction, said cage member configured to allow the fastener to engage said nut member within the limited range of movement of said nut member, said lower surface of said nut member being configured to be positioned against said cage member upon the fastener being fully engaged and secured to said nut member;
   at least one stand-off for reducing an amount of bearing surface interface between said upper surface of said nut member and said cage member in order to reduce a possibility of said nut member sticking to said cage member when said assembly is run through a type of bath in an upside down position; and
   means for reducing an amount of bearing surface interface between said at least one sidewall of said nut member and said cage member in order to reduce a possibility of said nut member sticking to said cage member when said assembly is run through said bath in a sideways position.

10. An assembly as defined in claim 9, wherein said reducing means is associated with said at least one sidewall of said nut member.

11. An assembly as defined in claim 9, wherein said second reducing means is associated with said cage member.

12. An assembly configured to receive a fastener, said assembly comprising:
   a nut member having a base portion having an upper surface, a lower surface, and at least one sidewall which connects said upper surface to said lower surface, said nut member configured to be engaged by the fastener;
   a cage member for engaging said nut member, said cage member configured to provide a limited range of movement of said nut member in at least one direction, said cage member configured to allow the fastener to engage said nut member within the limited range of movement of said nut member, said lower surface of said nut member being configured to be positioned against said cage member upon die fastener being fully engaged and secured to said nut member;
   at least one stand-off for reducing an amount of bearing surface interface between said upper surface of said nut member and said cage member in order to reduce a possibility of said nut member sticking to said cage member when said assembly is run through a type of bath in an upside down position; and
   means for reducing an amount of bearing surface interface between said lower surface of said nut member and said cage member in order to reduce a possibility of said nut member sticking to said cage member when said assembly is run through said bath in a horizontal position.

13. An assembly as defined in claim 12, wherein said reducing means is associated with said lower surface of said nut member.

14. An assembly as defined in claim 13, wherein said reducing means are further configured to be embedded into said cage member upon the fastener being fully engaged and secured to the fastener.

15. A nut member configured to be encaged within a cage member as part of a cage nut assembly and configured to receive a fastener, said nut member comprising:
   a base portion having an upper surface, a lower surface, and at least one sidewall which connects said upper surface to said lower surface, said lower surface of said nut member being configured to be positioned against the cage member upon the fastener being fully engaged and secured to said nut member, at least one stand-off for reducing an amount of bearing surface interface between said at least one sidewall of said nut member and the cage member in order to reduce a possibility of said nut member sticking to the cage member when the cage nut assembly is run through a bath in a sideways position;

said nut member has a plurality of sidewalls which connect said upper surface to said lower surface, each said sidewall of said base portion being connected to an adjacent sidewall along an edge of said base portion, and wherein at least two opposite sidewalls extend inwardly toward one another such that said at least one stand-off is one of said edges of said base portion of said nut member.

16. A nut member as defined in claim 15, further including means for reducing an amount of bearing surface interface between said upper surface of said nut member and the cage member in order to reduce a possibility of said nut member sticking to the cage member when the cage nut assembly is run through said bath in an upside down position.

17. A nut member as defined in claim 16, wherein said reducing means is associated with said upper surface of said nut member.

18. A nut member configured to be encaged within a cage member as part of a cage nut assembly and configured to receive a fastener, said nut member comprising:

a base portion having an upper surface, a lower surface, and at least one sidewall which connects said upper surface to said lower surface, said lower surface of said nut member being configured to be positioned against the cage member upon the fastener being fully engaged and secured to said nut member;

at least one stand-off for reducing an amount of beaming surface interface between said at least one sidewall of said nut member and the cage member in order to reduce a possibility of said nut member sticking to the cage member when the cage nut assembly is run through a bath in a sideways position; and means for reducing an amount of bearing surface interface between said lower surface of said nut member and the cage member in order to reduce a possibility of said nut member sticking to the cage member when the cage nut assembly is run through said bath in a horizontal position.

19. A nut member as defined in claim 18, wherein said reducing means is associated with said lower surface of said nut member.

20. A nut member as defined in claim 19, wherein said reducing means is further configured to be embedded into the cage member upon the fastener being fully engaged and secured to said nut member.

* * * * *

UNITED STATES PATENT AND TRADEMARK OFFICE
CERTIFICATE OF CORRECTION

| | | |
|---|---|---|
| PATENT NO. | : 7,156,599 B2 | Page 1 of 1 |
| APPLICATION NO. | : 10/875031 | |
| DATED | : January 2, 2007 | |
| INVENTOR(S) | : James Patrick Clinch and Paul Douglas Purdy | |

It is certified that error appears in the above-identified patent and that said Letters Patent is hereby corrected as shown below:

Title Page; please insert;
   (56)    References Cited
      U.S. Patent Documents (2nd page)
  "2002/0135517   A1   9/2002   Imahigashi" should be
  --2002/0136617   A1   9/2002   Imahigashi --

Column 34, Line 5 "amount of beaming" should be
              --amount of bearing --

Signed and Sealed this

Seventeenth Day of July, 2007

JON W. DUDAS
*Director of the United States Patent and Trademark Office*